（12) United States Patent
Wu et al.

(10) Patent No.: US 10,736,081 B2
(45) Date of Patent: Aug. 4, 2020

(54) NON-ORTHOGONAL MULTIPLE ACCESS TRANSMISSION

(71) Applicant: Huawei Technologies Co., Ltd., Shenzhen (CN)

(72) Inventors: Yiqun Wu, Shanghai (CN); Alireza Bayesteh, Ottawa (CA); Yan Chen, Shanghai (CN); Jianglei Ma, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/701,035

(22) Filed: Sep. 11, 2017

(65) Prior Publication Data
US 2018/0077685 A1 Mar. 15, 2018

Related U.S. Application Data

(60) Provisional application No. 62/407,999, filed on Oct. 13, 2016, provisional application No. 62/394,454, filed on Sep. 14, 2016.

(51) Int. Cl.
H04W 72/02 (2009.01)
H04L 5/00 (2006.01)
(Continued)

(52) U.S. Cl.
CPC ........... *H04W 72/02* (2013.01); *H04L 5/0046* (2013.01); *H04L 5/0094* (2013.01);
(Continued)

(58) Field of Classification Search
CPC ............ H04W 88/02; H04W 72/0446; H04W 72/0406; H04W 72/0413; H04W 72/04;
(Continued)

(56) References Cited

U.S. PATENT DOCUMENTS

2012/0300749 A1* 11/2012 Kondo ................ H04W 72/085
370/331
2013/0163533 A1 6/2013 Anderson et al.
(Continued)

FOREIGN PATENT DOCUMENTS

CN 104158631 A 11/2014
CN 104539411 A 4/2015
(Continued)

OTHER PUBLICATIONS

Huawei, et al., "Classification of MUST schemes", 3GPP TSG RAN WG1 Meeting #82, R1-153798, Aug. 24-28, 2015, 8 Pages, Beijing, China.
(Continued)

Primary Examiner — Daniel Lai
(74) Attorney, Agent, or Firm — Slater Matsil, LLP

(57) ABSTRACT

A method for non-orthogonal multiple access (NoMA) transmission is provided. In an embodiment, a method in a network device for transmission of a NoMA signal includes obtaining information bits. The method also includes transmitting the NoMA signal. The NoMA signal includes one or more layers. The NoMA signal is generated according to the information bits and according to a set of signal processing operations selected from a plurality of signal processing operations. At least one of the set of signal processing operations is layer-specific or UE-specific or a combination thereof.

20 Claims, 26 Drawing Sheets

(51) Int. Cl.
*H04W 72/04* (2009.01)
*H04W 72/08* (2009.01)
*H04W 74/00* (2009.01)

(52) U.S. Cl.
CPC ....... *H04W 72/0413* (2013.01); *H04L 5/0026* (2013.01); *H04W 72/048* (2013.01); *H04W 72/085* (2013.01); *H04W 74/004* (2013.01)

(58) Field of Classification Search
CPC . H04W 72/046; H04W 52/146; H04W 52/24; H04W 52/243; H04W 52/367; H04W 72/0453; H04W 72/085; H04W 72/044; H04W 72/048; H04W 76/10; H04W 88/06; H04W 16/14; H04W 72/02; H04W 72/0473; H04W 72/06; H04W 72/1284; H04W 74/002; H04W 74/004; H04W 76/15; H04W 24/02; H04W 28/0268; H04W 52/246; H04W 52/248; H04W 52/262; H04W 72/0493; H04W 72/121; H04W 80/02; H04W 80/085; H04L 5/001; H04L 5/0023; H04L 5/0057; H04L 5/0035; H04L 5/0073; H04B 7/0456; H04B 7/0639; H04B 7/0473; H04B 7/0478; H04B 7/0632
See application file for complete search history.

(56) References Cited

U.S. PATENT DOCUMENTS

| | | | |
|---|---|---|---|
| 2014/0169408 A1* | 6/2014 | Bayesteh | H04B 7/0669 375/144 |
| 2014/0362832 A1* | 12/2014 | Rudolf | H04L 1/1822 370/336 |
| 2015/0043540 A1 | 2/2015 | Nikopour et al. | |
| 2015/0171947 A1 | 6/2015 | Sun et al. | |
| 2015/0171983 A1* | 6/2015 | Kusashima | H04J 11/004 370/329 |
| 2015/0312074 A1 | 10/2015 | Zhu et al. | |
| 2016/0049999 A1 | 2/2016 | Taherzadah Boroujeni et al. | |
| 2016/0119807 A1 | 4/2016 | Sun et al. | |
| 2016/0127085 A1* | 5/2016 | Kim | H03M 13/23 370/329 |
| 2016/0270042 A1 | 9/2016 | Nikopour et al. | |
| 2017/0012687 A1 | 1/2017 | Sawahashi et al. | |
| 2017/0013628 A1 | 1/2017 | Kim et al. | |
| 2017/0230138 A1* | 8/2017 | Xiong | H04L 1/0003 |
| 2017/0244587 A1* | 8/2017 | Wild | H04W 72/04 |
| 2017/0265145 A1 | 9/2017 | Benjebbour et al. | |
| 2017/0325238 A1 | 11/2017 | Yoshizawa | |
| 2017/0331582 A1 | 11/2017 | Yoshizawa | |
| 2018/0027544 A1* | 1/2018 | Kimura | H04J 11/00 370/330 |
| 2018/0110031 A1* | 4/2018 | Yoshizawa | H04W 76/10 |
| 2018/0139762 A1* | 5/2018 | Cho | H04W 72/1284 |
| 2018/0227903 A1 | 8/2018 | Uchiyama et al. | |
| 2018/0302769 A1* | 10/2018 | Kimura | H04M 11/04 |

FOREIGN PATENT DOCUMENTS

| | | |
|---|---|---|
| CN | 105723637 A | 6/2016 |
| WO | 2015021239 A1 | 2/2015 |
| WO | 2015126115 A1 | 8/2015 |
| WO | 2015129874 A1 | 9/2015 |
| WO | 2016023517 A1 | 2/2016 |
| WO | 2016038960 A1 | 3/2016 |
| WO | 2016084460 A1 | 6/2016 |
| WO | 2016098413 A1 | 6/2016 |
| WO | 2016103831 A1 | 6/2016 |

OTHER PUBLICATIONS

Huawei et al., "Evaluation methodology for 5G non-orthogonal multiple access scheme", 3GPP TSG RAN WG1 Meeting #84bis, R1-162154, Apr. 11-15, 2016, 13 Pages, Busan, Korea.

Huawei, et al., "Overview of non-orthogonal multiple access for 5G", 3GPP TSG RAN WG1 Meeting #84bis, R1-162153, Apr. 11-15, 2016, Busan, Korea.

Huawei et al., "Sparse Code Multiple Access (SCMA) for 5G Radio Transmission", 3GPP TSG RAN WG1 Meeting #84bis, R1-162155, Apr. 11-15, 2016, 5 Pages, Busan, Korea.

Nokia, et al., "Overview of the proposed non-orthogonal MA schemes", 3GPP TSG-RAN WG1 #86, R1-167247, Aug. 22-26, 2016, 7 Pages, Gothenburg, Sweden.

ZTE, et al., "Grant-free Multiple Access Schemes for mMtc", 3GPP TSG RAN WG1 Meeting #86, R1-166403, Aug. 22-26, 2016, 5 Pages, Gothenburg, Sweden.

* cited by examiner

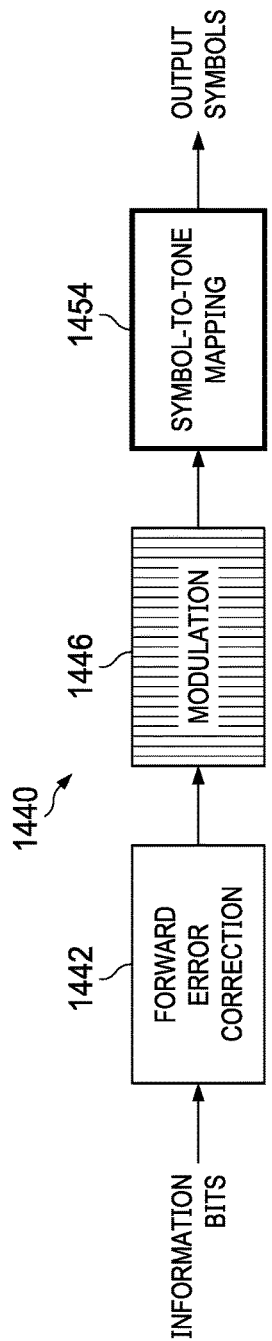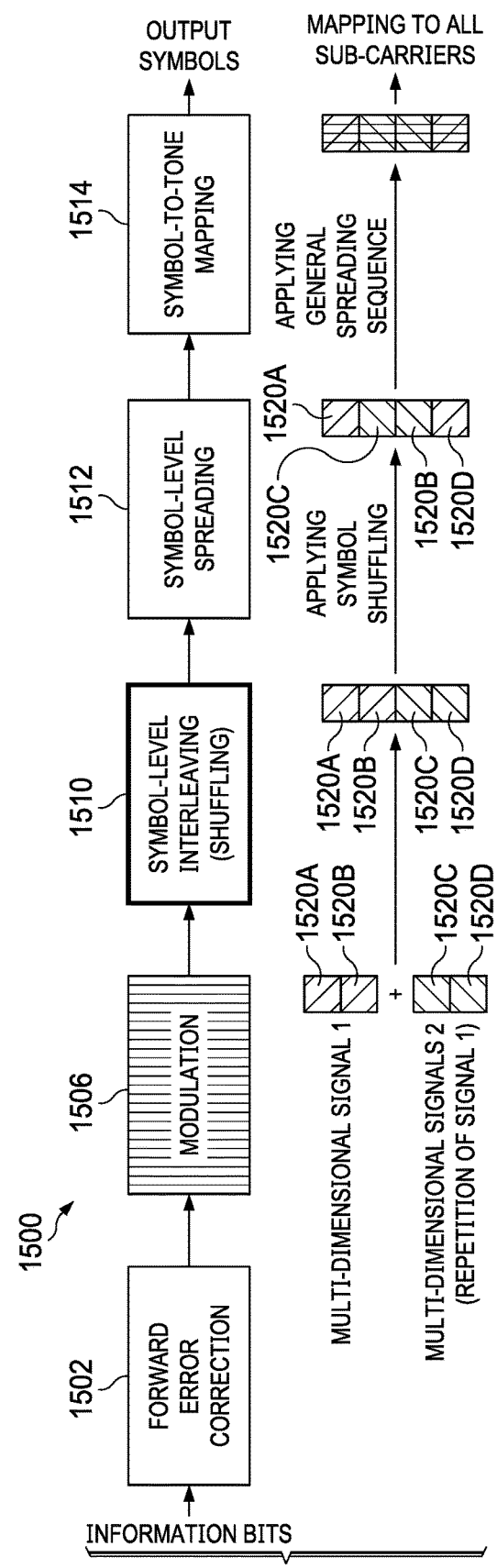

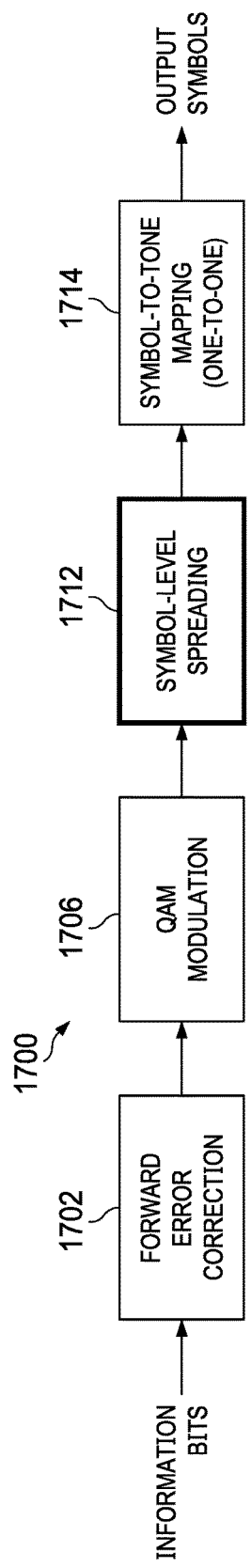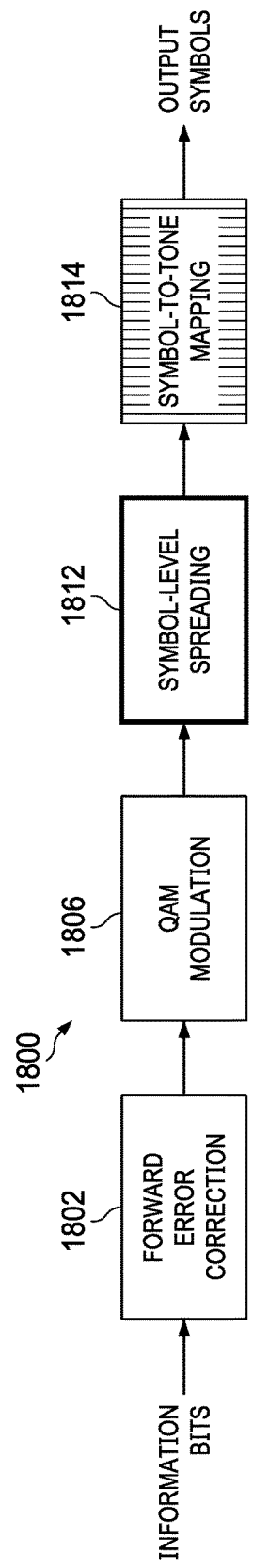

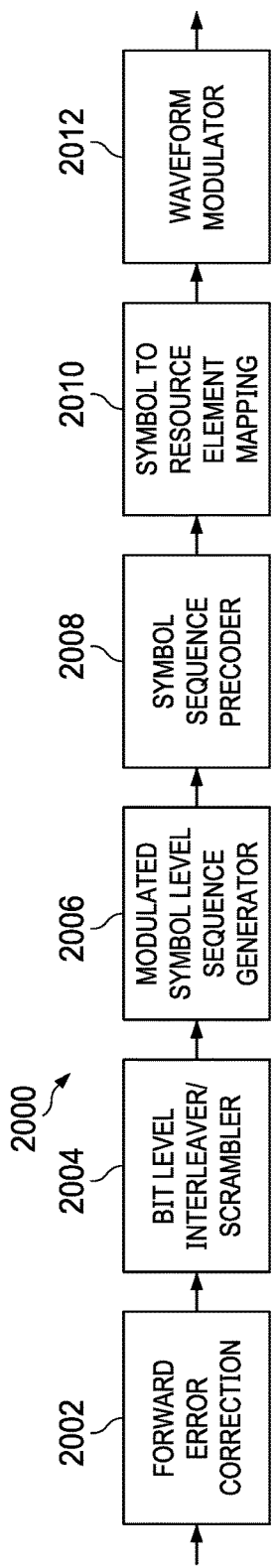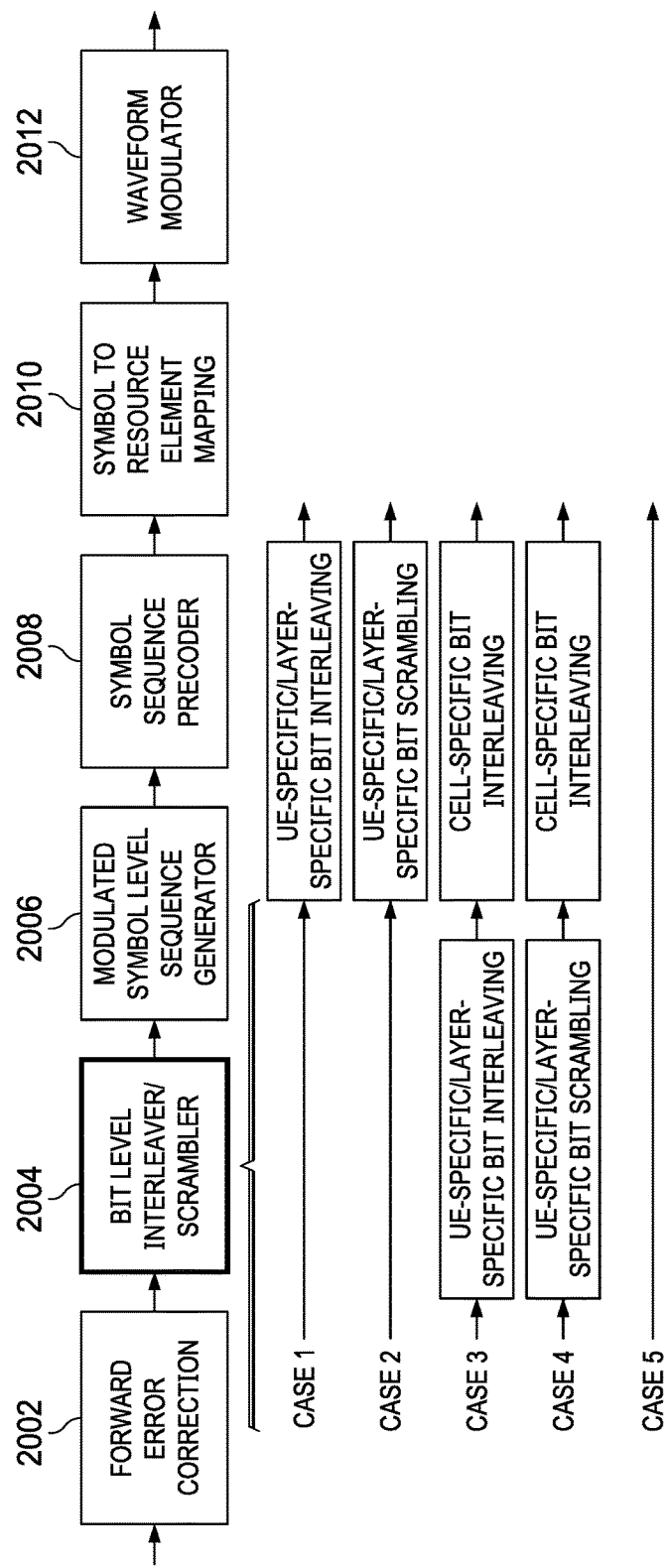

NON-ORTHOGONAL MULTIPLE ACCESS TRANSMISSION

CROSS-REFERENCE TO RELATED APPLICATIONS

This application claims the benefit of U.S. Provisional Application No. 62/407,999, filed on Oct. 13, 2016 and U.S. Provisional Application No. 62/394,454, filed on Sep. 14, 2016, which applications are incorporated herein by reference.

TECHNICAL FIELD

The present disclosure relates generally to communication systems that utilize non-orthogonal multiple access (NoMA).

BACKGROUND

Non-orthogonal multiple access (NoMA) is a multiple access technique in which multiple user equipment (UEs) simultaneously share a transmission resource, which can be referred to as MA resource. Non-orthogonal multiple access (NoMA) permits multiple UEs to simultaneously share a transmission resource, without restricting the number of UEs based on the number of available orthogonal resources. A MA resource is comprised of a MA physical resource and a MA signature, where a MA signature includes at least one of the following: codebook/codeword, sequence, interleaver and/or mapping pattern, demodulation reference signal, preamble, spatial-dimension, power-dimension, etc.

NoMA is an active topic for standardization for the next generation of telecommunication technology. There are many proposed NoMA schemes. Many of the proposed NoMA schemes are particularly effective for some types of communication scenarios, but are not as effective for other types of communication scenarios.

SUMMARY

An embodiment method in a network device for transmission of a NoMA signal includes obtaining information bits. The method also includes transmitting the NoMA signal. The NoMA signal includes one or more layers. The NoMA signal is generated according to the information bits and according to a set of signal processing operations selected from a plurality of signal processing operations. At least one of the set of signal processing operations is layer-specific, UE-specific, or a combination thereof.

An embodiment user equipment (UE) configured to transmit a non-orthogonal multiple access (NoMA) signal includes at least one antenna, a processor, and a computer readable storage media having stored thereon computer executable instructions, that when executed by the processor, perform a method. The method includes obtaining information bits. The method also includes transmitting the NoMA signal. The NoMA signal includes one or more layers. The NoMA signal is generated according to the information bits and according to a set of signal processing operations selected from a plurality of signal processing operations. At least one of the set of signal processing operations is layer-specific, UE-specific, or a combination thereof.

An embodiment user equipment (UE) configured to transmit a non-orthogonal multiple access (NoMA) signal is provided. The UE is configured to receive or otherwise obtain information bits. The UE is also configured to transmit the NoMA signal. The NoMA signal includes one or more layers. The NoMA signal is generated according to the information bits and according to a set of signal processing operations selected from a plurality of signal processing operations. At least one of the set of signal processing operations being layer-specific, UE-specific, or a combination thereof.

In one or more aspects of the disclosure, at least one of the set of signal processing operations is layer-specific, user equipment (UE)-specific, network specific, or a combination thereof.

In one or more aspects of the disclosure, the set of signal processing operations used for generating the NoMA signal comprises at least one of a layer-specific or UE-specific bit level multiplexing signal processing operation and a layer-specific or UE-specific symbol level multiplexing signal processing operation.

In one or more aspects of the disclosure, the set of signal processing operations include operations that perform at least one of: a) bit-level interleaving and/or scrambling; b) symbol level spreading; c) symbol level interleaving; d) symbol-to-transmission unit mapping; e) bit-level scrambling; f) modulated symbol sequence generating; g) symbol to resource element (RE) mapping; h) symbol sequence pre-coding; and f) waveform modulation.

In one or more aspects of the disclosure, transmitting the NoMA signal comprises transmitting the NoMA signal in an uplink direction from at least one user equipment (UE) to a network receiver.

In one or more aspects of the disclosure, the at least one UE makes a decision of which signal processing operations to select without input from a network.

In one or more aspects of the disclosure, transmitting a NoMA signal, the NoMA signal generated according to a set of signal processing operations selected from a plurality of signal processing operations to generate the NoMA signal includes selecting the set of signal processing operations from the plurality of signal processing operations based on at least one of: a) an application specific scenario; b) physical layer requirements for the NoMA transmission including channel quality indicator (CQI), SNR measurement; and c) meeting key parameter indicators (KPI).

In one or more aspects of the disclosure, the physical layer requirements for the NoMA transmission include at least one of: a) spectral efficiency of the signal; b) modulation and coding scheme for the signal; c) peak-to-average power ratio (PAPR); and d) channel attributes of the signal.

In one or more aspects of the disclosure, transmitting a NoMA signal, the NoMA signal generated according to a set of signal processing operations selected from a plurality of signal processing operations to generate the NoMA signal further includes configuring one or more of the set of signal processing operations to meet one or more performance requirements.

In one or more aspects of the disclosure, the one or more performance requirements include performance requirements related to: a) signal coverage; b) system connection density; and c) spectral efficiency.

The disclosed systems and methods provide a NoMA technique that allows distinguishing the transmitted signals from the multiple UEs by applying some UE specific or layer-specific features that are unique to the UE or layer, respectively. These features may include, but are not limited to: FEC, bit-level interleaving/scrambling; modulated symbol sequence generator; and symbol to RE mapping.

Distinct multiple access schemes can be developed based on such UE-specific or layer-specific (or both) signal processing operations. These signal processing operations may include, but are not limited to: FEC, bit-level interleaving/scrambling; modulated symbol sequence generator; and symbol to RE mapping.

A framework is disclosed for generating a NoMA signal based on selection of a particular set of signal processing operations. The set of signal processing operations are then used to process information bits and generate the NoMA signal for transmission.

In some embodiments, the disclosed systems and methods have a number of advantages. For example, various NoMA schemes that each includes a different subset of the signal processing operations can be derived using the framework. Such a framework can be used by a UE to select a NoMA scheme having a set of signal processing operations that meets a desired performance or transmission requirement and/or transmission application.

Other aspects and features of embodiments of the present disclosure will become apparent to those ordinarily skilled in the art upon review of the following description.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 14B is a schematic diagram showing another example NoMA scheme derived from the framework according to an aspect of the application;

FIG. 15 is a schematic diagram showing an example NoMA scheme derived from the framework according to an aspect of the application;

FIG. 17 is a schematic diagram showing an example NoMA scheme derived from the framework according to an aspect of the application;

FIG. 18 is a schematic diagram showing an example NoMA scheme derived from the framework according to an aspect of the application;

FIG. 20 is a schematic diagram showing an example framework that may be used to define a variety of non-orthogonal multiple access (NoMA) schemes according to an aspect of the application;

FIGS. 21 and 22 are schematic diagrams showing examples of Bit level interleaver/scrambler function unit in FIG. 20 according to an aspect of the application;

DETAILED DESCRIPTION OF ILLUSTRATIVE EMBODIMENTS

Figure 1A:
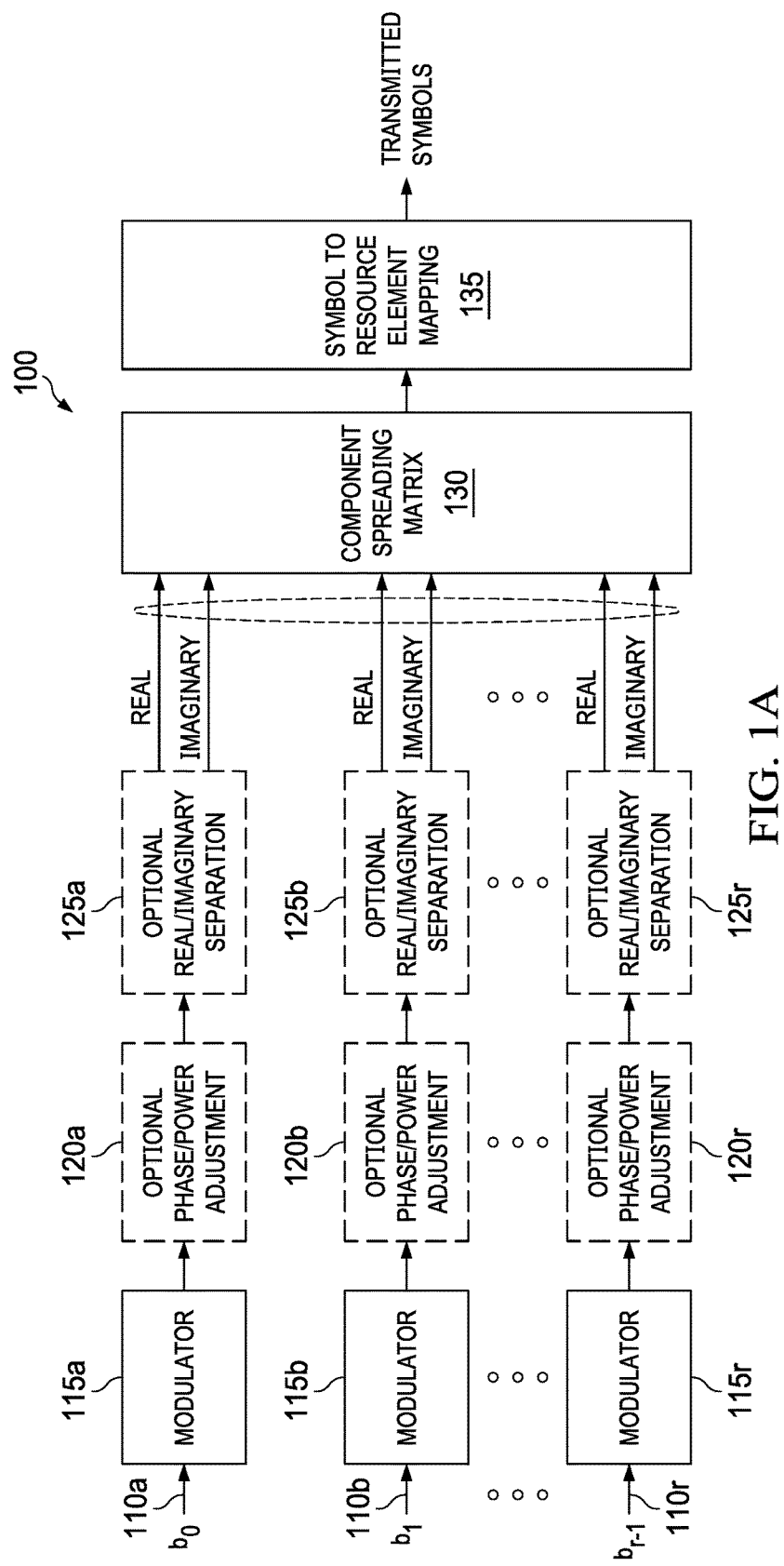
FIG. 1A is a schematic diagram showing an example framework that may be used to generate a variety of multiple access (MA) schemes according to an aspect of the application.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Non-orthogonal multiple access (NoMA) generally allows multiple signals to be transmitted from one or more transmitters to one or more receivers simultaneously on a given shared resource. The shared resource may include a time resource, a frequency resource, a space resource or some combination thereof. In a downlink (DL) scenario, a network side device can transmit to multiple separate user equipment (UE). In an uplink (UL) scenario multiple UEs can transmit to a network side receiver.

In the UL NoMA scenario, the UEs process information bits arranged in one or more layers to become symbols for transmission on multiple tones. In NoMA, there are likely to be collisions of symbols from the multiple UEs at the receiver that receives the signals. A NoMA technique may attempt to distinguish the transmitted signals from the multiple UEs by applying some UE specific or layer-specific features that are unique to the UE or layer, respectively. These features may include, but are not limited to: FEC, bit-level interleaving/scrambling; modulated symbol sequence generator; and symbol to RE mapping. In an aspect of the disclosure, the UE (or UEs) transmit an MA signal using multiple layers and each layer of the MA signal may use layer-specific and UE-specific operations to generate the MA signal.

Distinct multiple access schemes can be developed based on such UE-specific or layer-specific (or both) signal processing operations. These signal processing operations may include, but are not limited to: FEC, bit-level interleaving/scrambling; modulated symbol sequence generator; and symbol to RE mapping.

A framework is proposed for generating a NoMA signal based on selection of a particular set (e.g. one or more) of signal processing operations. The set of signal processing operations is then used to process information bits and generate the NoMA signal for transmission. In some embodiments, various NoMA schemes that each includes a different subset of the signal processing operations can be derived using the framework. Such a framework can be used by a UE to select a NoMA scheme having a set of signal processing operations that meets a desired transmission application.

Multiple access (MA) techniques generally allow multiple signals to be transmitted from one or more transmitters to one or more receivers simultaneously on a given shared resource. The shared resource may include a time resource, a frequency resource, a space resource or some combination thereof. In a downlink (DL) scenario, a network side device such as a transmit receive point (TRP), also sometimes known as a transmit point (TP), a receive point (RP), an evolved Node B (eNode B or eNB), or an access point, can transmit to multiple separate user equipment (UE). In an uplink (UL) scenario, multiple UEs can transmit to a network side receiver.

A framework is proposed for generating a MA signal based on selection of a particular set of signal processing operations. A core group of signal processing operations includes modulation, a spreading matrix, and a symbol to resource element (RE) mapping. There may be additional signal processing operations, such as, but not limited to, phase or power adjustment operations, separating real and imaginary portions, and constellation re-mapping. Various MA schemes that each includes a different subset of the signal processing operations can be derived using the framework. Such a framework can be used by a transmitter that is configured to select a MA scheme having a set of signal processing operations that meets a desired performance criterion. As used herein, the terms "MA" and "NoMA" are equivalent and used interchangeably since the transmission described herein are, by nature, non-orthogonal.

According to an aspect of the disclosure, there is provided a method for transmission of a non-orthogonal multiple access (NoMA) signal. The method involves selecting a set of signal processing operations from a plurality of signal processing operations to be used for generating the NoMA signal, at least one signal processing operation of the set of signal processing operations being a layer-specific or UE-specific operation. The method also involves processing at least one layer as a stream of information bits using the selected set of signal processing operations to generate the NoMA signal. Once generated, the NoMA signal is transmitted.

According to an aspect of the disclosure, there is provided a user equipment (UE) configured to transmit a NoMA signal. The UE is configured to select a set of signal processing operations from a plurality of signal processing operations to be used for generating the NoMA signal, at least one signal processing operation of the set of operations being a code-domain layer-specific or UE-specific operation. The UE is also configured to process at least one layer as a stream of information bits using the selected set of signal processing operations to generate the NoMA signal. Once the NoMA signal is generated, the UE transmits the NoMA signal.

According to an aspect of the disclosure, there is provided a UE configured to transmit a NoMA signal, the UE includes at least one antenna, a processor and computer readable storage media having stored thereon computer executable instructions, that when executed by the processor, perform a method. The method that is performed by the processor involves selecting a set of signal processing operations from a plurality of signal processing operations to be used for generating the NoMA signal, at least one signal processing operation of the set of operations being a layer-specific or UE-specific operation. The method further involves processing at least one layer as a stream of information bits using the selected set of signal processing operations to generate the NoMA signal. Once the NoMA signal is generated, the UE transmits the NoMA signal on the at least one antenna.

According to an aspect of the disclosure, there is provided a computer readable storage media having stored thereon computer executable instructions, that when executed by a processor, perform a method. The method that is performed by the processor involves selecting a set of signal processing operations from a plurality of signal processing operations to be used for generating a NoMA signal, at least one signal processing operation of the set of operations being a layer-specific or UE-specific operation. The method further involves processing at least one layer as a stream of information bits using the selected set of signal processing operations to generate the NoMA signal for transmission.

According to an aspect of the disclosure, there is provided a method for NoMA transmission. The method involves selecting a NoMA scheme from a plurality of NoMA schemes based on one or more criterion to meet performance requirements, each NoMA scheme of the plurality of MA schemes including a set of signal processing operations. The method also involves configuring one or more of the set of signal processing operations to meet the performance requirements.

According to an aspect of the disclosure, there is provided a UE configured for NoMA transmission. The UE is configured to select a NoMA scheme from a plurality of NoMA schemes based on one or more criterion to meet performance requirements, each NoMA scheme of the plurality of NoMA schemes including a set of signal processing operations. The UE may also configure one or more of the set of signal processing operations to meet the performance requirements.

According to an aspect of the disclosure, there is provided a computer readable storage media having stored thereon computer executable instructions, that when executed by a processor, perform a method. The method that is performed by the processor involves selecting a NoMA scheme from a plurality of NoMA schemes based on one or more criterion to meet performance requirements, each NoMA scheme of the plurality of NoMA schemes including a set of signal processing operations. The method that is performed by the processor also involves configuring one or more of the set of signal processing operations to meet the performance requirements.

FIG. 1A illustrates an example of signal processing operations that may be part of a framework 100 for generating a MA signal. A bit stream comprising bits $b_0, b_1, \ldots b_{r-1}$ for transmission as a MA signal is divided to form multiple sub-streams 110a, 110b, ..., 110r. Although three sub-streams are shown, it is to be understood that the number of sub-streams can be greater or less than three. Each sub-stream 110a, 110b, 110r is input to a respective modulator 115a, 115b, ..., 115r. The modulators may be baseline modulators, including Quadrature Amplitude Modulation (QAM), with baseline labeling, such as Gray labeling. Other labelings may also be used including natural labeling. The modulation performed by the modulators 115a, 115b, ..., 115r can be different for the different sub-streams 110a, 110b, ..., 110r.

Shown in FIG. 1A are several optional processing blocks. The optional processing blocks in FIG. 1A include power and/or phase adjustment processing blocks 120a, 120b, ..., 120r and real/imaginary separation processing blocks 125a, 125b, ..., 125r. The power and/or phase adjustment processing blocks 120a, 120b, ..., 120r allow the phase or power of the output of a respective modulator to be adjusted. The real/imaginary separation processing blocks 125a, 125b, ..., 125r allow the output of a respective modulator to be resolved into a real portion of the output and an imaginary portion of the output.

The symbols that are output from a respective stream of bits by a corresponding modulator, or from a corresponding optional post-modulator signal processing block, can be referred to as a component. (Linear) spreading can then be applied to each component separately so that the spreading may be considered component-specific (linear) spreading. The (linear) spreading is represented in the framework of FIG. 4A in the form of a component spreading matrix 130. The component spreading matrix can be considered to have n columns and m rows, where n and m can be any integer values. If n=1 and m is ≥1, the matrix may be representative of a vector, or spreading sequence having m elements. Similarly, if m=1 and n is ≥1, the matrix may be representative of a vector or spreading sequence having n elements. One skilled in the art would also understand that the matrix may be considered to be a set of n vectors or spreading sequences, each vector having m elements. The component spreading matrix may also be referred to as simply a spreading matrix. Each of the n columns of the component spreading matrix may represent a set of m elements of a spreading sequence used for spreading/mapping a group of one or more modulated symbols output from a modulator. In some aspects, the spreading/mapping operation is performed by a multiplication operation. The output of the spreading matrix spreads, or maps, each of the components (each modulated symbol) applied to the spreading matrix into a set or sequence of symbols. The sets or sequences of symbols could be from the same, or different, constellations and have the same, or different, orders.

In some implementations, the component spreading matrix can be defined in such a way that the number of columns in the component spreading matrix 130 represents the number of components. In another implementation, for a fixed number of columns, the number of columns can be mapped to properties of the transmitted signal, for example the modulation order. If there are fewer components than the number of columns in the matrix, then some of the columns in the component spreading matrix will be zero. For example, if the modulation order is 4, the number of nonzero columns can be configured to be 2.

In another implementation, the component spreading matrix can be defined based on a given fixed modulation, including but not limited to BPSK and π/2-BPSK. If the component spreading matrix is defined based on BPSK and/or π/2-BPSK, the number of columns will be equal to the modulation order.

If real/imaginary separation is not required, both real and imaginary parts of the components may use a same spreading sequence. In such a case, the component spreading sequence can be simplified to only include one spreading column for each pair of real/imaginary parts.

The output of the component spreading matrix 130 is provided to a symbol to resource element (RE) mapping processing block 135 to construct the MA signal to be transmitted.

The mapping performed by the symbol to RE mapping 135 can be a sparse mapping or a non-sparse mapping, depending on the MA scheme being used. The sparse mapping can be configured to have different sparsity levels.

It should also be noted that the component spreading matrix and/or the signal to RE mapping can be UE-specific and/or layer-specific, to simplify the decoding of signals received from multiple UEs. The component spreading matrix 130 can be implemented in a manner that is UE-specific by utilizing values in the matrix, i.e. the spreading sequences in a given column, for a given component, or input stream, that correspond to a particular UE or layer. The RE mapping processing block 135 can be implemented in a manner that is UE-specific by utilizing a particular mapping that correspond to a particular UE or layer.

The component spreading matrix 130 and symbol to RE mapping processing block 135 can be combined resulting in an extended component spreading matrix. Such a combined extended component spreading matrix may also allow for the possibility of applying a cover code as a part of the matrix. A cover code is a sequence of complex numbers. The cover code may be pseudo-random whose elements are selected randomly from a given alphabet or structured. In some aspects the elements of the cover codes have unit amplitude. UE-specific cover codes provide additional degree of freedom in separation of the signals simultaneously transmitted by multiple UEs and thus, provide better reception. In some embodiments, the cover code may be applied to the component specific matrix.

In the example of the extended component spreading matrix, the number of rows in the resulting matrix corresponds to the spreading factor.

The resulting extended component spreading matrix distinguishes different types of MA schemes. The matrix determines the type of MA scheme. The selection of the matrix may be based on at least one of required key parameter indicators (KPI), an application scenario and spectral efficiency (SE) requirements.

In some embodiments, the symbol to RE mapping 135 may utilize a component-specific mapping.

Figure 1B:
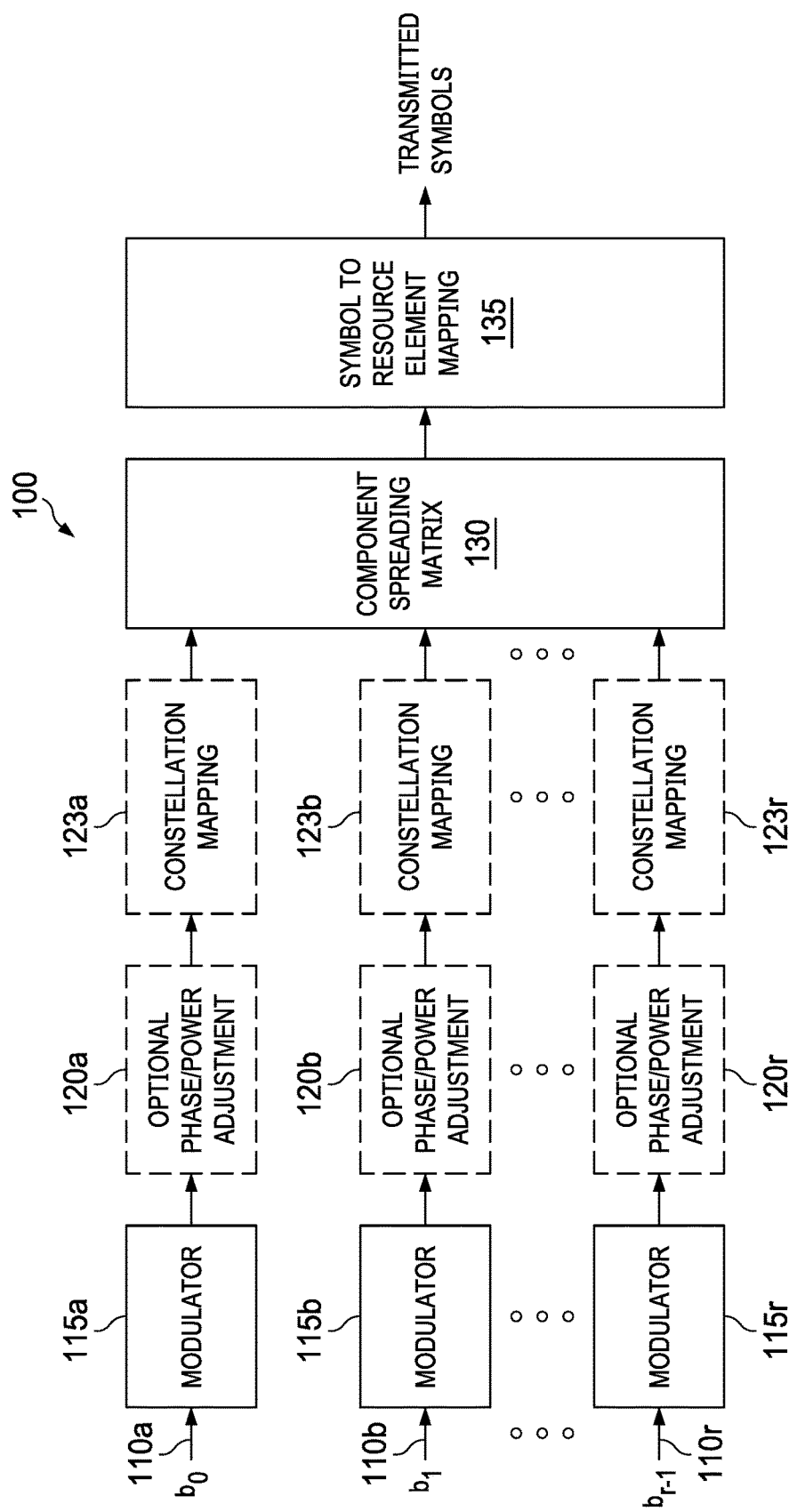
FIG. 1B is a schematic diagram showing an example alternate framework that may be used to generate a variety of MA schemes according to an aspect of the application.

FIG. 1B illustrates a further version of the framework 150 that is similar to FIG. 1A, but with constellation re-mapping processing blocks 123a, 123b, . . . , 123r. The power/phase adjustment processing blocks 120a, 120b, . . . , 120r are included in the framework 150, but are still considered to be optional additions to the framework 150.

Examples of different combinations resulting from the basic framework of FIG. 1A or FIG. 1B will be described below with reference to FIGS. 2, 3, 4, 5, 6, 7 8, 9, and 10.

Based on the disclosed framework, proposed MA schemes may be categorized as multi-component spreading or single-component spreading, which is also referred to as linear spreading.

In some implementations, multi-component spreading may include using an arbitrary component spreading matrix, such as found in Sparse Code Multiple Access (SCMA). The multi-component spreading may include a flexible component-specific sparsity level. In some embodiments, multi-component spreading may include using an identity component spreading matrix.

In some implementations, single-component spreading may include using a layer-specific spreading sequence and/or UE-specific spreading sequence or a layer-specific sparsity pattern and/or a UE-specific sparsity pattern, or a combination thereof. The layer-specific spreading sequence and/or the UE-specific spreading sequence may be defined in a pseudo-random manner in which the elements are selected randomly from a given alphabet or defined in a structured way based on some criteria.

It is to be understood that not all of the signal processing operations illustrated in FIGS. 1A and 1B would necessarily be needed in a given MA scheme that is developed from the framework. FIGS. 1A and 1B are intended to shown examples of various signal processing operations that are included in the framework. Other signal processing operations are not precluded.

Figure 2:
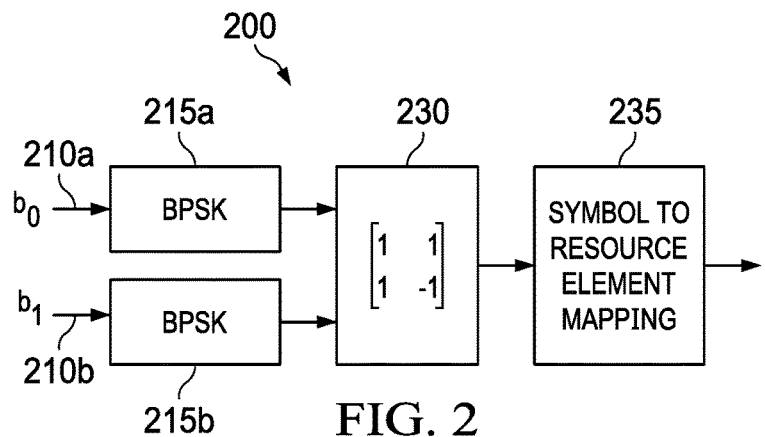
FIG. 2 is a schematic diagram showing an example MA scheme derived from the framework according to an aspect of the application.

FIG. 2 is a first example 200 of a particular arrangement of signal processing operations derived from the framework for generating a MA signal. In this first example 200, pairs of bits b0, b1 are separated into two sub-streams 210a, 210b and the individual bits are provided to two separate Binary Phase Shift Keying (BPSK) modulators 215a, 215b. The components output from each BPSK modulator 215a, 215b are multiplied by the component spreading matrix 230. The particular component spreading matrix 230 being used to spread the components is:

$$\begin{bmatrix} 1 & 1 \\ 1 & -1 \end{bmatrix}$$

The number of columns in the matrix, which equals two, equals the number of components, i.e. one from each of the BPSK modulators. In this case the number of columns also corresponds to the number of components and the modulation size.

The output of the component spreading matrix 230 is then provided to the Symbol to RE mapping processing block 235. The whole process may be used to generate the SCMA 4 point, 3 projection codebook.

In the case of combining the component spreading matrix 230 with the symbol to RE mapping 235 to generate extended component spreading matrix, it is possible to have a cover code multiplied by the component spreading matrix. The cover code can be pseudo-random or structured with a given alphabet.

Figure 3:
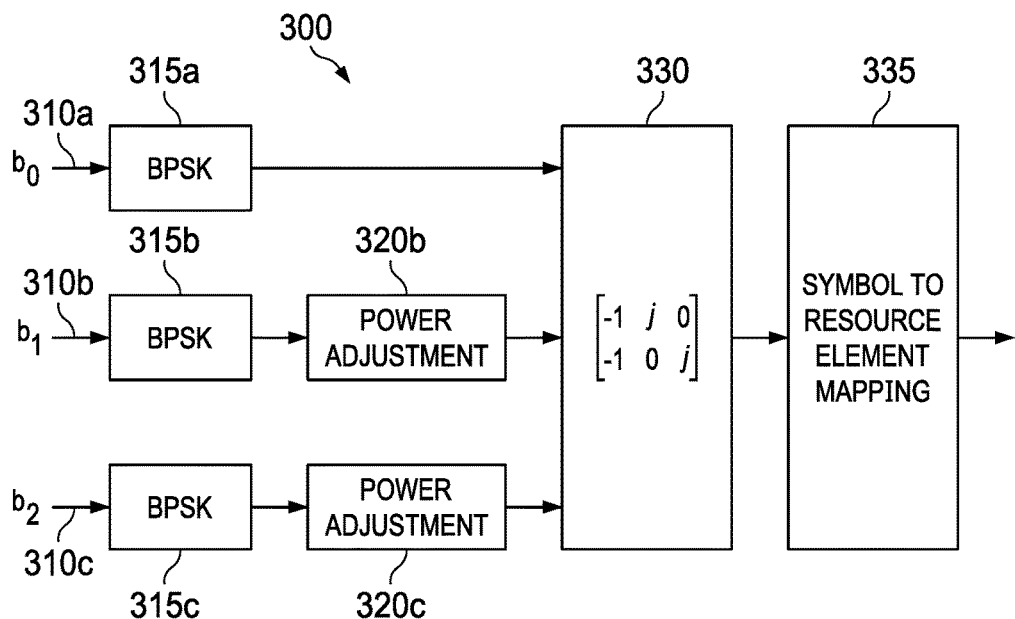
FIG. 3 is a schematic diagram showing another example MA scheme derived from the framework according to an aspect of the application.

FIG. 3 is another example 300 of a particular arrangement of signal processing operations derived from the framework for generating a MA signal. In example 300, a set of bits $b_0$, $b_1$, $b_2$ is separated to form multiple sub-streams 310a, 310b and 310c and each bit is provided to one of three BPSK modulators 315a, 315b, 315c. A component output from each of BPSK modulators 315b and 315c is provided to Power Adjustment blocks 320b and 320c, respectively. The component outputs from BPSK modulator 315a and the two Power Adjustment blocks 320b and 320c are multiplied by the component spreading matrix 330. The particular component spreading matrix 330 being used to spread the components is:

$$\begin{bmatrix} -1 & j & 0 \\ -1 & 0 & j \end{bmatrix}$$

In example 300, it is also possible that the power adjust processing blocks are included in the component spreading matrix. In this case, the component spreading matrix becomes:

$$\begin{bmatrix} -1 & \sqrt{2}\,j & 0 \\ -1 & 0 & \sqrt{2}\,j \end{bmatrix}$$

Or equivalently:

$$\begin{bmatrix} -\frac{1}{\sqrt{2}} & j & 0 \\ -\frac{1}{\sqrt{2}} & 0 & j \end{bmatrix}.$$

As can be seen, the power of the second and third spread components are amplified by a factor of 2 or equivalently, the power of the first spread component is reduced by factor of 2.

The number of columns of the component spreading matrix 330 is equal to three, which corresponds to the number of components and the modulation size.

The output of the component spreading matrix 330 is then provided to the Symbol to RE mapping processing block 335. The whole process may be used to generate the SCMA 8 point, 4 projection codebook. The number of rows indicates that the number of non-zero elements in the codebook is equal to two.

Figure 4:
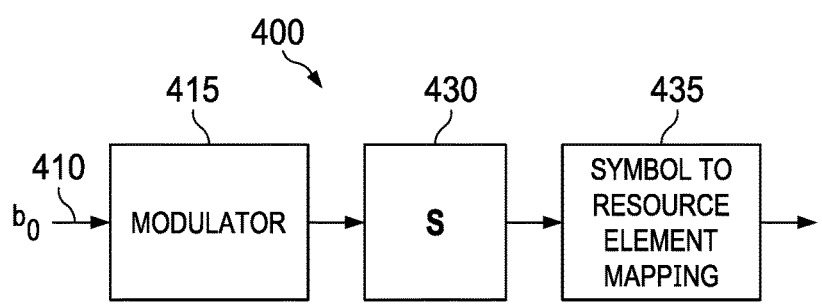
FIG. 4 is a schematic diagram showing another example MA scheme derived from the framework according to an aspect of the application.

FIG. 4 is another example 400 of a particular arrangement of signal processing operations derived from the framework for generating a MA signal. In example 400, individual bits b0 are provided in a single stream 410 to a single modulator 415. This may for example be a BPSK modulator or a Quadrature Amplitude Modulation (QAM) modulator. A component output from modulator 415 is multiplied by component spreading matrix 430. The matrix being used to spread the components may be a conventional spreading sequence, for example a type used in CDMA. In linear spreading, there is only one component, so the spreading can be referred to as single component spreading, as discussed above. The output of the component spreading matrix 430 is then provided to the Symbol to RE mapping processing block 435.

The component spreading matrix may be represented as a single-column matrix, i.e., a vector. The component spreading matrix 430 may also be represented assuming BPSK modulation. In this case, the number of columns is linked to the modulation size and the columns of the component spreading matrix can be written as:

$$S'=[\alpha_1 S | \alpha_2 S | \ldots | \alpha_r S],$$

where S represents the spreading sequence and $(\alpha_1, \ldots, \alpha_r)$ are scalar numbers used to generate the QAM symbol from the BPSK symbols and the value of subscript r is linked to the modulation size. In a particular embodiment, when the modulation is Quadrature Phase Shift Keying (QPSK), the component spreading matrix S' can be represented as a two-column matrix of $[S|jS]$.

Figure 5:
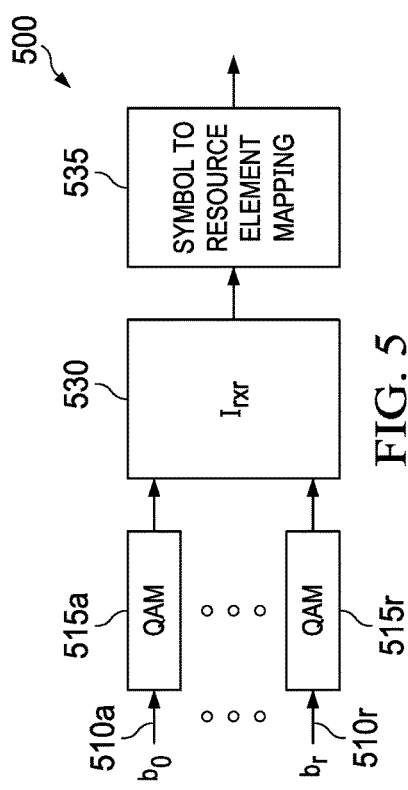
FIG. 5 is a schematic diagram showing another example MA scheme derived from the framework according to an aspect of the application.

FIG. 5 is a further example 500 of a particular arrangement of signal processing operations derived from the framework for generating a MA signal. In example 500, a stream of bits $b_0, \ldots b_r$ is divided into multiple sub-streams 510a, ..., 510r and each bit is provided to a separate modulator, which in FIG. 5 are QAM modulators 515a, ..., 515r. The components output from each of QAM modulators 515a, ..., 515r are multiplied by the component spreading matrix 530. The particular matrix being used to spread the components is an identity component spreading matrix, $I_{rxr}$. The output of the component spreading matrix 530 is then provided to the Symbol to RE mapping processing block 535.

Figure 6:
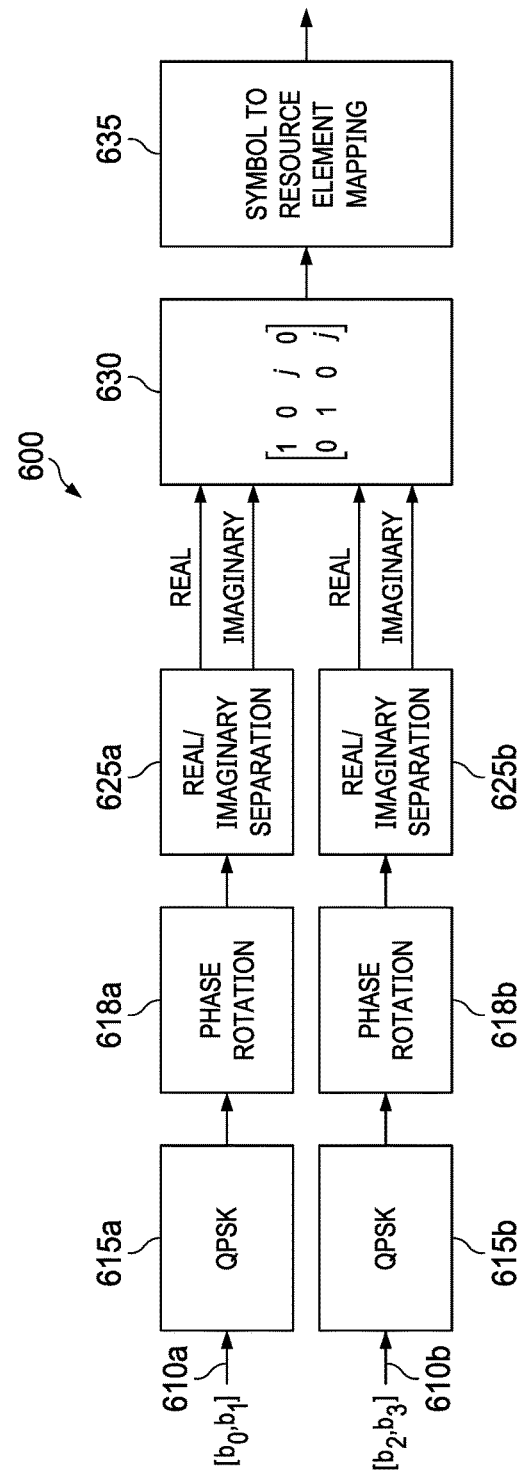
FIG. 6 is a schematic diagram showing an example MA scheme derived from the framework according to an aspect of the application.

FIG. 6 is another example 600 of a particular arrangement of signal processing operations derived from the framework for generating a MA signal. In example 600, a set of bits $b_0$, $b_1$, $b_2$, $b_3$ is divided into two sub-streams 610a, 610b, and each pair of bits is then provided to one of two separate modulators, which in FIG. 6 are Quadrature Phase Shift Keying (QPSK) modulators 615a, 615b. A component output from each of QPSK modulators 615a and 615b is provided to Phase Rotation processing blocks 618a and 618b, respectively. A component output from each of the Phase Rotation processing blocks 618a and 618b is provided to Real and Imaginary Separation processing blocks 625a and 625b, respectively. The real and imaginary portions of the component output from each of Real and Imaginary Separation processing blocks 625a and 625b are multiplied by the component spreading matrix 630. The particular component spreading matrix 630 being used to spread the components is:

$$\begin{bmatrix} 1 & 0 & j & 0 \\ 0 & 1 & 0 & j \end{bmatrix}$$

The output of the component spreading matrix 630 is then provided to the Symbol to RE mapping processing block 635. The whole process may be used to represent a 16 point constellation. If the phase rotation is chosen as 45 degrees, then a SCMA 16 point 9 projection codebook can be generated.

Figure 7:
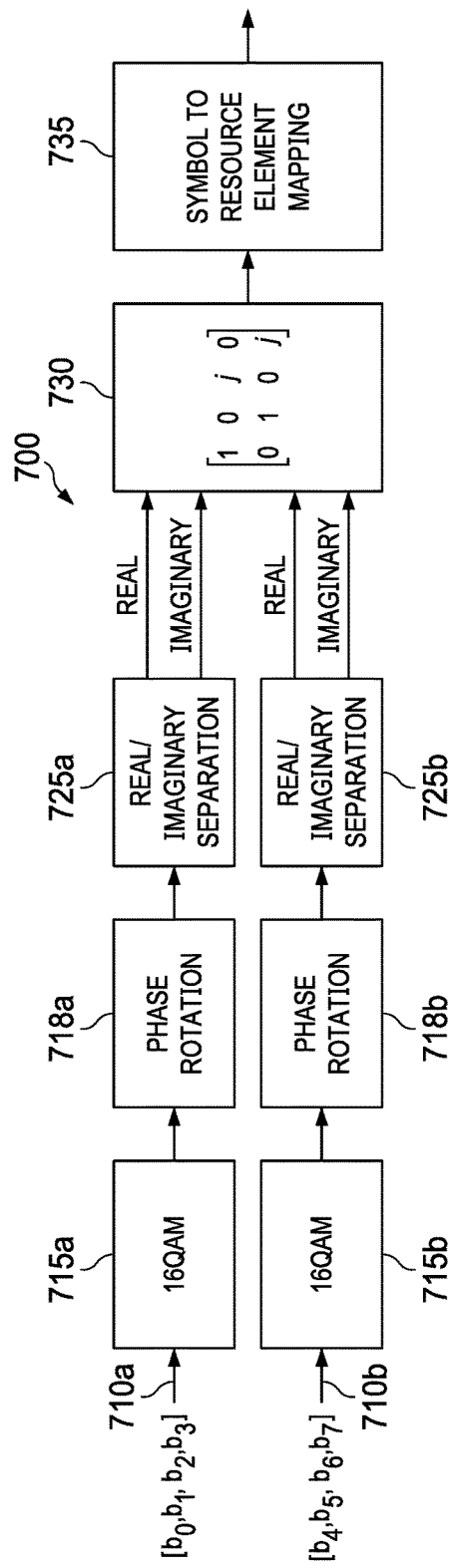
FIG. 7 is a schematic diagram showing an example MA scheme derived from the framework according to an aspect of the application.

FIG. 7 is another example 700 of a particular arrangement of signal processing operations derived from the framework for generating a MA signal. In example 700, a set of eight bits $b_0$, $b_1$, $b_2$, $b_3$, $b_4$, $b_5$, $b_6$, $b_7$ is divided into two sub-streams of four bits, which are each provided to one of two separate modulators, namely 16 point Quadrature Amplitude Modulation (16QAM) modulators 715a, 715b. A component output from each of 16QAM modulators visa and 715b is provided to Phase Rotation processing blocks 718a and 718b, respectively. A component output from each of the Phase Rotation processing blocks 718a and 718b is provided to Real and Imaginary Separation processing blocks 725a and 725b, respectively. The real and imaginary portions of the component output from each of Real and Imaginary Separation processing blocks 725a and 725b are multiplied by the component spreading matrix 730. The particular component spreading matrix 730 being used to spread the components is:

$$\begin{bmatrix} 1 & 0 & j & 0 \\ 0 & 1 & 0 & j \end{bmatrix}$$

The output of the component spreading matrix 730 is then provided to the Symbol to RE mapping processing block 735. The whole process may be used to represent a 256 point constellation. If the phase rotation is chosen as 45 degrees, then a SCMA 256 point 49 projection codebook can be generated.

Figure 8:
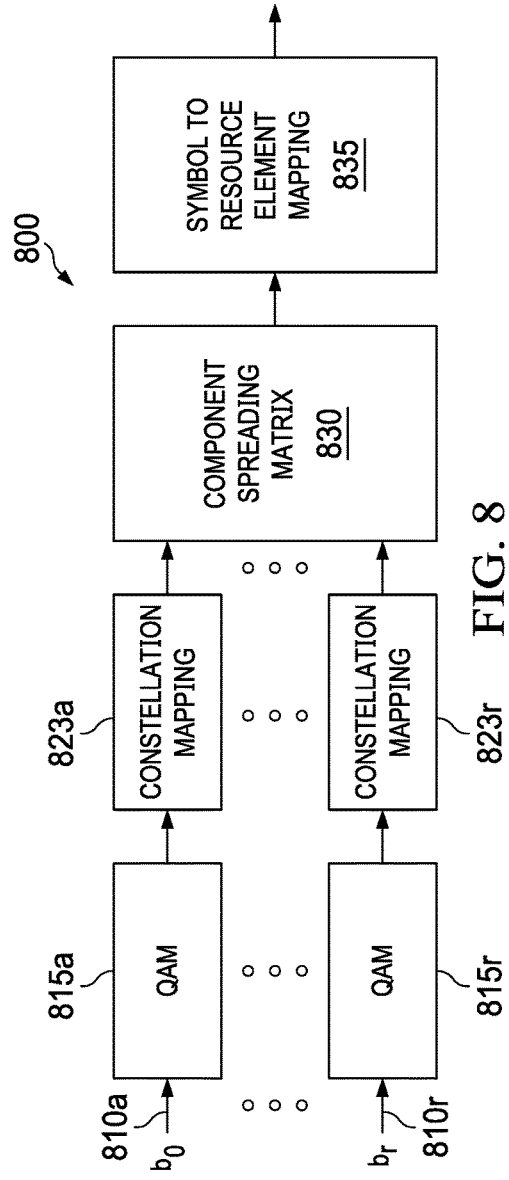
FIG. 8 is a schematic diagram showing an example MA scheme derived from the framework according to an aspect of the application.

FIG. 8 is yet another example 800 of a particular arrangement of signal processing operations derived from the framework for generating a MA signal. In example 800, a stream of bits $b_0, \ldots, b_r$ is divided into multiple one bit sub-streams 810a, ..., 810r and each bit is provided to a separate modulator, which in example 800 are QAM modulators 815a, ..., 815r. A component output from each of QAM modulators 815a, ..., 815r is provided to a respective constellation to constellation mapping block 823a, ..., 823r. The components output from constellation to constellation block 823a, ..., 823r are multiplied by component spreading matrix 830. The output of the component spreading matrix 830 is then provided to the Symbol to RE mapping processing block 835. Each constellation to constellation mapping block maps a QAM symbol having a first constellation mapping that is output from a respective QAM modulator to a second constellation mapping. In some implementations, the first and second constellation mappings have a same number of points in the constellations, but the points are labeled differently. This essentially becomes a constellation relabeling. In other implementations, the first and second constellation mappings have a different number of points in the constellations.

Figure 9:
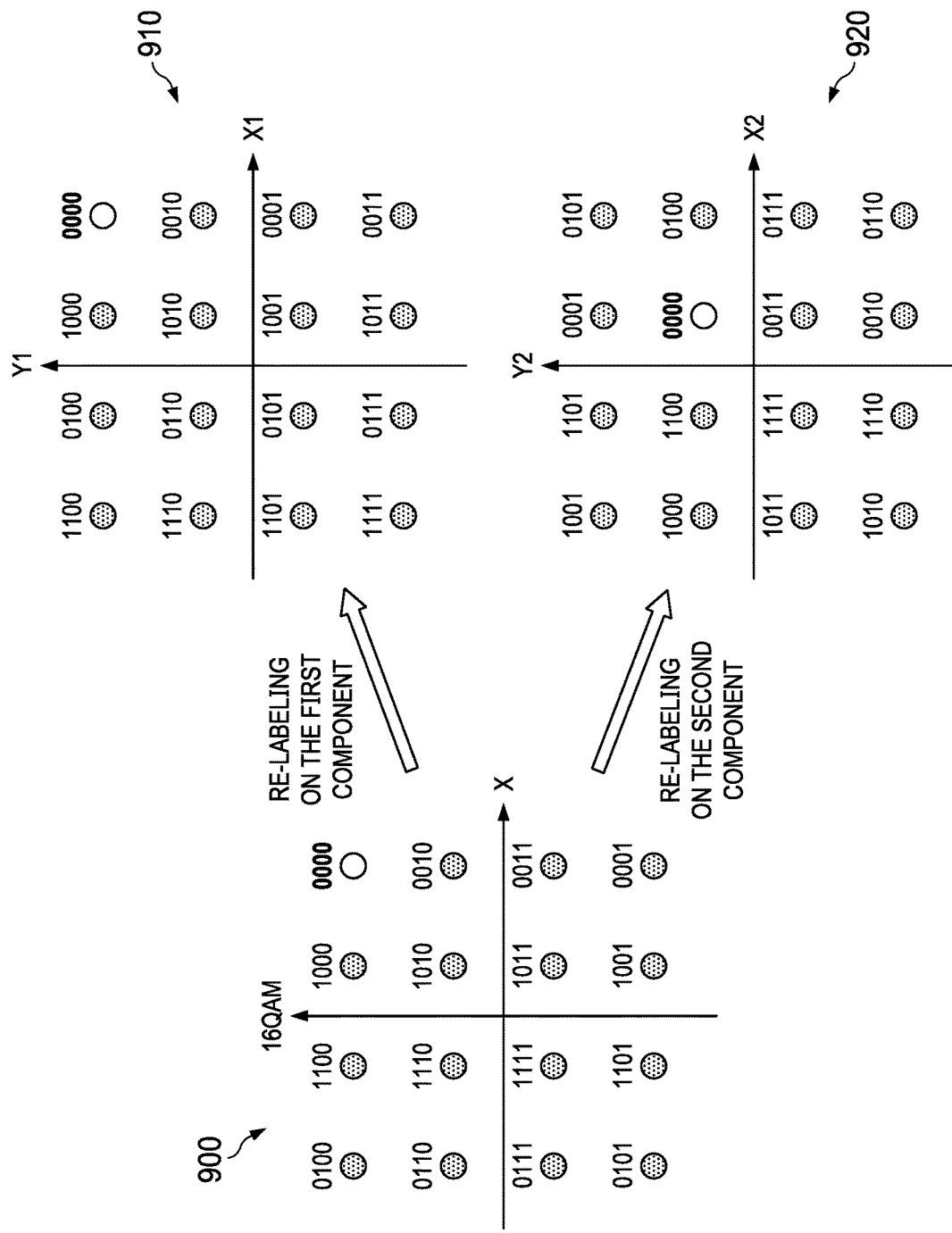
FIG. 9 is a schematic diagram showing an example of relabeling a 16QAM constellation according to an aspect of the application.

FIG. 9 illustrates a particular Gray labeling for a 16QAM constellation 900. Other labelings may also be used including natural labeling. The 16QAM constellation includes 16 points, each point defined by a set of four bits. FIG. 9 also includes two different constellation mappings 910 and 920 that have the same arrangement of the 16 points, but the labelling of the points is different.

Figure 10:
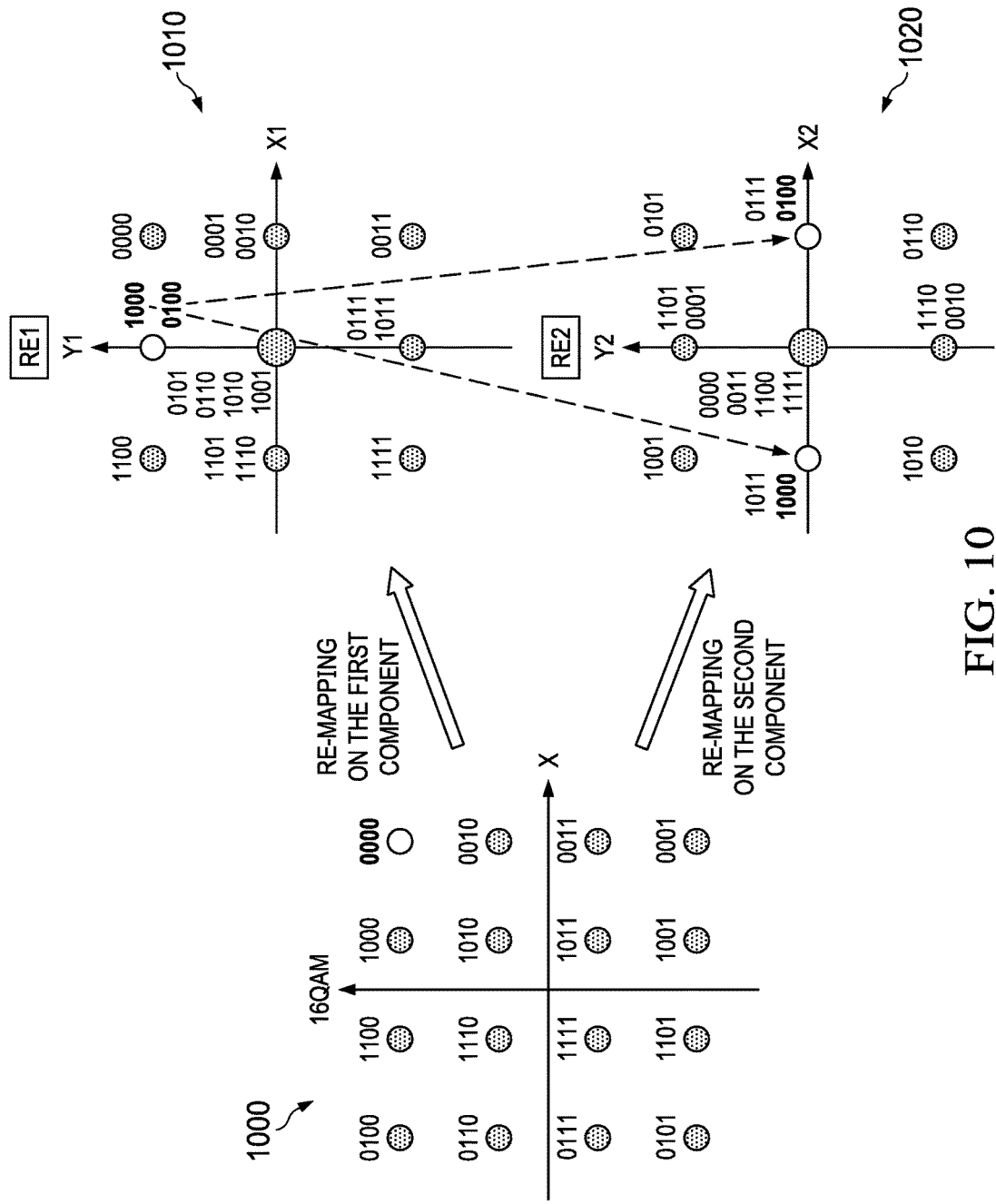
FIG. 10 is a schematic diagram showing an alternate example of remapping 16QAM constellation according to an aspect of the application.

FIG. 10 illustrates a particular Gray labeling for a 16QAM constellation 1000. Other labelings may also be used including natural labeling. The 16QAM constellation includes 16 points, each point defined by a four bit symbol value. Constellations 1010 and 1020 are examples of re-mapping to a reduced size constellation. Constellations 1010 and 1020 each include 9 points, each point defined by a four bit symbol value. Four of the constellation points of constellations 1010 and 1020 have a unique symbol value for the respective points, four of the constellation points have two symbol values for the respective points and one constellation point has four symbol values for that point. Constellations 1010 and 1020 have the same size of reduced point constellation, but the labelling is different for the two constellations. In some aspects the re-mapping may result in different bit-to-symbol labeling for each component.

Using the proposed framework, MA schemes can be described by the component spreading matrix and the symbol to RE mapping or, in some embodiments, by the extended component spreading matrix introduced above. The various MA schemes can be configured based on a desired performance (based on one or more performance-related parameters such as key performance indicators (KPI)), based on an application scenario (e.g. enhanced Mobile BroadBand (eMBB), massive Machine-Type Communications (mMTC), Ultra-Reliable Low Latency Communications (URLLC)), a traffic or transmission type (low-latency or latency-tolerant traffic, grant-based (i.e. with grant) or grant-free (i.e. without a prior grant) transmissions, etc.)—hereinafter generally referred to as "application scenario", and/or based on certain (physical layer) specifications or requirements, such as, but not limited to, spectral efficiency. Another parameter that can be specified includes the modulation order. In aspects using the same modulator for different components, the modulator order can be implicitly obtained by the modulation and coding scheme (MCS) and the number of components. In some embodiments, the modulators can use BPSK or π/2-BPSK and the component spreading matrix (or extended component spreading matrix) can be defined based on that the particular modulation being used by the modulator.

In some embodiments, the component spreading matrix can also be UE-specific. In some embodiments, the symbol to RE mapping pattern used by the symbol to RE mapping pattern processing block could be UE-specific or layer-specific. In some embodiments, phase and/or amplitude adjustment can determined based on one or more of a) an application scenario, b) physical layer requirements for the MA transmission, c) meeting key performance indicators (KPI) and UE id and/or the layer index.

Described above are features that mainly correspond to transmitters and the generation of an MA signal. Aspects of the disclosure also pertain to the receiving of MA signals and how those signals may be decoded.

Once a receiver knows the modulation and coding scheme (MCS), component spreading matrix, and the symbol to RE mapping and other pertinent signal processing methods used by a transmitter to generate the MA signal, the receiver can use this information to decode the signal. In some embodiments, the modulation size can be obtained from the component spreading matrix. In other embodiments, the component spreading matrix can be obtained or selected from the physical layer characteristic of the signal including, but not limited to, spectral efficiency, application type and QoS requirement, channel quality indicator (CQI), signal to noise ratio (SNR) measurements. Transmitter may use one or more matrix selection parameters to select a matrix. In some embodiments, the matrix can be obtained from explicit signaling by network. In some other embodiments, a pool of matrices can be generated in advance and communicated to the UE through physical layer and/or higher layer signaling in conjunction with the mapping rule between the matrix indices and UE id, layer index and other matrix selection parameters including spectral efficiency, application type and QoS requirement, channel quality indicator (CQI), signal to noise ratio (SNR) measurements. In some other embodiments, generating a pool of spreading matrices may include generating a plurality of spreading sequences to be used in construction of component spreading matrices.

The knowledge of the component spreading matrix, and the symbol to RE mapping processing block and other pertinent signal processing methods used by a transmitter to generate the MA signal by the network side receiver could be either implicit or received through explicit signaling from the UE, or a combination thereof.

In some embodiments, implicit knowledge may be based on a physical layer characteristic of the signal, such as the spectral efficiency of the transmitted signal, application type and QoS requirement. For example, there can be a one-to-one mapping between the spectral efficiency and the component spreading matrix.

In an UL situation in which a UE is transmitting to a network side receiver, the network side receiver may not know the component spreading matrix and the symbol to RE mapping and other pertinent signal processing methods that were used to generate the signal by the UE. In some embodiments, the component spreading matrix and/or the symbol to RE mapping and other pertinent signal processing methods used by a transmitter to generate the MA signal may be mapped to the UE id and/or layer index. In this case, if the network side receiver has knowledge of the UE index of the UE, this knowledge can be used to determine the component spreading matrix and symbol to RE mapping, for example by reducing the search space of potential component spreading matrices and symbol to RE mappings.

Blind detection by the receiver may also be possible, if there are sufficiently few potential component spreading matrices and symbol to RE mappings.

Figure 11:
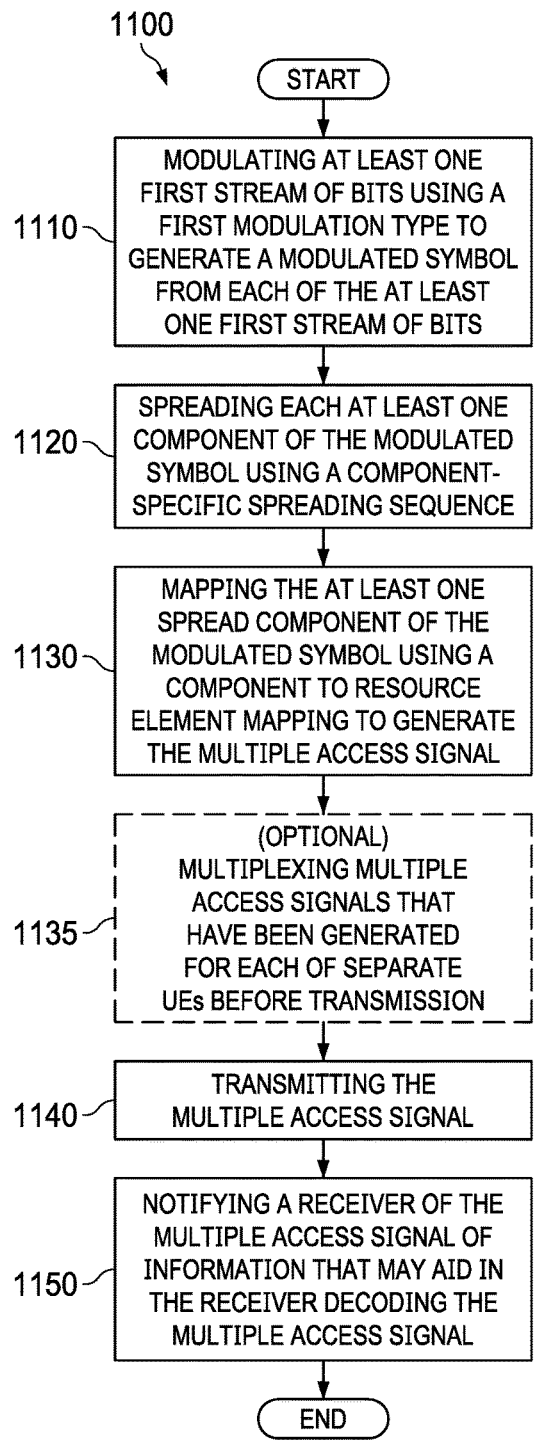
FIG. 11 is a flow diagram of an example method according to an embodiment of the application.

FIG. 11 is a flowchart 1100 that illustrates an example method for transmission of a MA signal. The steps of the method may be performed by a network side device that is transmitting to one or more UEs or by one or more UEs that are transmitting to a network side receiver.

Step 1110 involves the transmitting device modulating at least one first stream of bits using a first modulation type to generate at least one first modulated symbol from each of the at least one first stream of bits. Each first stream of bits includes at least one bit.

Step 1120 involves the transmitting device spreading each of the at least one first modulated symbol using a spreading sequence that is specific to a respective first stream of bits to generate a second set of modulated symbols.

Step 1130 involves the transmitting device mapping at least one of the second set of modulated symbols using a resource element mapping and add/multiplex the mapped symbols to generate the MA signal.

An optional step 1135 that may be performed, in particular for a DL scenario when a network side device is transmitting a signal to more than one UE, or in uplink when more than one signal layer is transmitted, involves the network side device multiplexing the mapped second sets of modulated symbols that have been generated for each of the separate UEs or layers before transmission.

Step 1140 involves the transmitting device transmitting the mapped second sets of modulated symbols as a MA signal.

A further optional step 1150 may include the transmitting device notifying a receiver of the MA signal of information that may aid in the receiver decoding the MA signal. This may include notifying the receiver of one or more of a modulation type, a component-specific spreading sequence and a symbol to resource element map for decoding the MA signal.

The example method 1100 is intended for illustrative purposes. Steps that are identified in FIG. 11 as optional in the flow chart above may or may not be performed in a given implementation of the method. Other aspects could involve performing the illustrated operations in any of various ways, performing fewer or additional operations, and/or varying the order in which operations are performed. Other variations could be or become apparent to a skilled person based on the present disclosure.

Although the UE may be responsible for selecting the signal processing operations, the UE may receive information from the network side receiver and select signal processing operations based on the received information. Also, in some embodiments, the signal processing operations to be used for each UE are pre-defined and/or pre-configured based on UE id. It makes sense for the UE to be responsible for selecting the signal operations as the UE may be capable of processing only certain types of signals. The network side receiver may propose or assign different selections of signal processing operations for different UEs based in the receiver's knowledge of the UEs.

In a UL scenario, the UEs may also signal the network side receiver to inform the network side receiver of the type of MA signal being used, i.e. the types of signal processing operations used to generate the signal by the UE.

Figure 12:
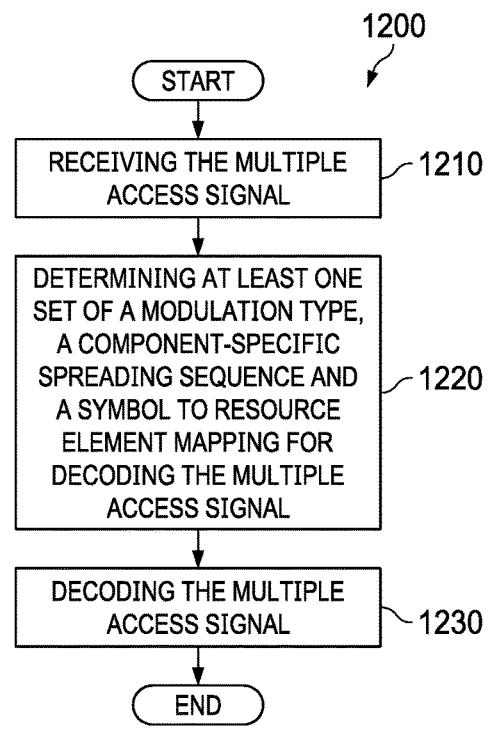
FIG. 12 is a flow diagram of an example method according to an embodiment of the application.

FIG. 12 is a flowchart 1200 that illustrates an example method for decoding a MA signal. The steps of the method may be performed by a network side device that is receiving an MA signal from one or more UEs or by one or more UEs that are receiving from a network side receiver.

1210 involves the receiving device receiving the MA signal.

Step 1220 involves the receiving device determining at least one set of variables including a modulation type, a component-specific spreading sequence, and a symbol to resource element mapping and other pertinent signal processing methods that was used to generate the signal by the UE for decoding the MA signal. In some embodiments, this determination may be based on UE id, blind detection or on signaling received from the UE, or a combination thereof.

Step 1230 involves the receiving device decoding the MA signal.

Figure 13:
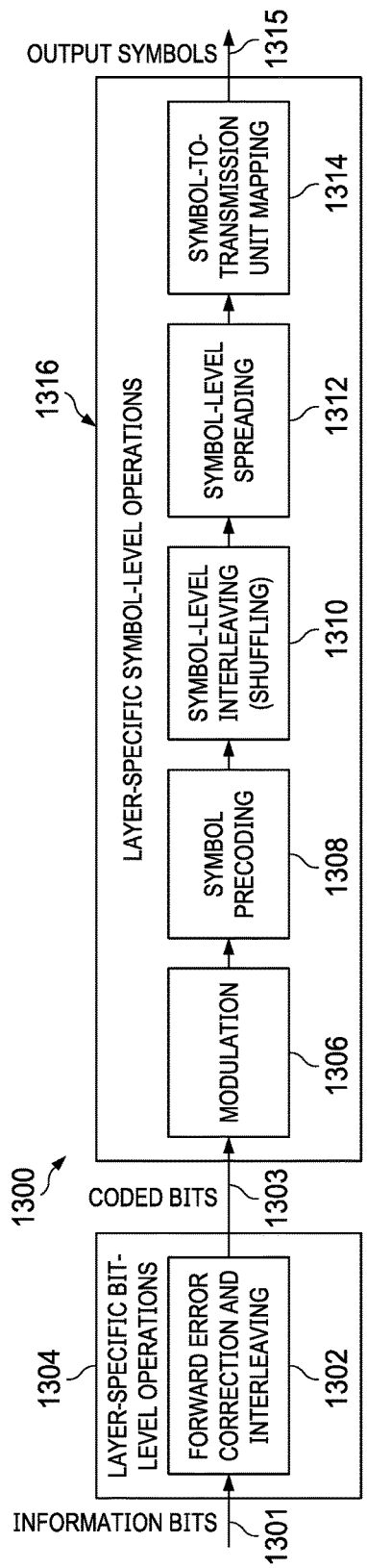
FIG. 13 is a schematic diagram showing an example framework that may be used to define a variety of non-orthogonal multiple access (NoMA) schemes according to an aspect of the application.

FIG. 13 illustrates an example of a collection of signal processing operations that may be part of a framework 100 for generating a NoMA signal. The signal processing operations can be divided into two categories. The categories are UE specific and/or layer-specific bit-level multiplexing operations 1304 and UE specific and/or layer-specific symbol-level multiplexing operations 1316. Signals transmitted by a given UE often include only a single layer, but that does not preclude that a single UE could transmit a signal generated from more than one layer.

In the bit-level multiplexing operations 1304, different functions are used by different UEs, or different layers of a same UE, to convert information bits to coded bits. The coded bits are then provided to the symbol-level multiplexing operations 1316. One common way of achieving bit-level multiplexing is bit-level interleaving and/or scrambling, but others are also contemplated.

In the symbol-level multiplexing operations 1316, different functions are used for different UEs, or different layers of the same UE, to convert the coded bits received from the bit-level operations to the output symbols to be transmitted. There are various combinations of signal processing operations which can result in symbol-level multiplexing. Examples of some combinations will be described below with reference to FIGS. 14A, 14B, 15, 16A, 16B, 17, and 18.

In FIG. 13, a stream of information bits 1301 is provided to the bit-level operation 1304. The bit-level operations 1304 include a first signal processing operation that performs forward error correction (FEC) encoding and interleaving 1302. The first signal processing operation can be considered FEC-domain multiplexing by defining UE specific and/or layer-specific FEC features, such as, but not limited to, bit-level interleaving and/or scrambling.

An output of coded bits 1303 from the bit-level operations 1304 is provided to the symbol-level operations 1316. The coded bits 1303 are provided to a second signal processing operation that performs modulation 1306 of the coded bits 1303. The modulation 1306 generates symbols from the coded bits. The second signal processing operation may include an advanced modulation, such as multi-dimensional modulation or constellation mapping. Constellation mapping basically maps a QAM symbol obtained from the first constellation to a second symbol obtained from the second constellation. In some implementations, the first and second constellations have a same number of points, but the points are labeled differently. This essentially becomes a constellation relabeling. In other implementations, the first and second constellations have a different number of points. The second signal processing operation 1306 may include one-dimensional modulation with constellation mapping across a set of tones that are to be used for transmitting the signal.

An output of the second signal processing operation is provided to a third signal processing operation that performs symbol pre-coding 1308. This type of signal processing operation is mainly used for peak-to-average power ratio (PAPR) reduction that may improve coverage of the transmitted signal.

An output of the third signal processing operation is provided to a fourth signal processing operation that performs symbol-level interleaving 1310, which may also be referred to as symbol-level shuffling. The fourth signal processing operation models interleaver-domain multiplexing at the symbol level.

An output of the fourth signal processing operation is provided to a fifth signal processing operation that performs symbol-level spreading 1312. The fifth signal processing operation models code-domain multiplexing. An example of code-domain multiplexing includes, but is not limited to, linear spreading by applying a spreading sequence.

An output of coded bits of the fifth signal processing operation is provided to a sixth signal processing operation that performs symbol-to-tone mapping or symbol-to-resource element (RE) mapping 1314. This signal processing operation models the pattern-domain multiplexing.

An output of the sixth signal processing operation is output symbols 1315 for transmission.

In some embodiments, the order of the signal processing operations may be different. For example, symbol pre-coding 1308 can be after the symbol-to-tone mapping 1314 or symbol-level interleaving can be after symbol-level spreading.

It is to be understood that not all of the signal processing operations illustrated in FIG. 1 would necessarily be needed in a given NoMA scheme that is developed from the framework. FIG. 13 is intended to shown the various signal processing operations that are included in the framework. Other signal processing operations are not precluded.

Figure 14A:
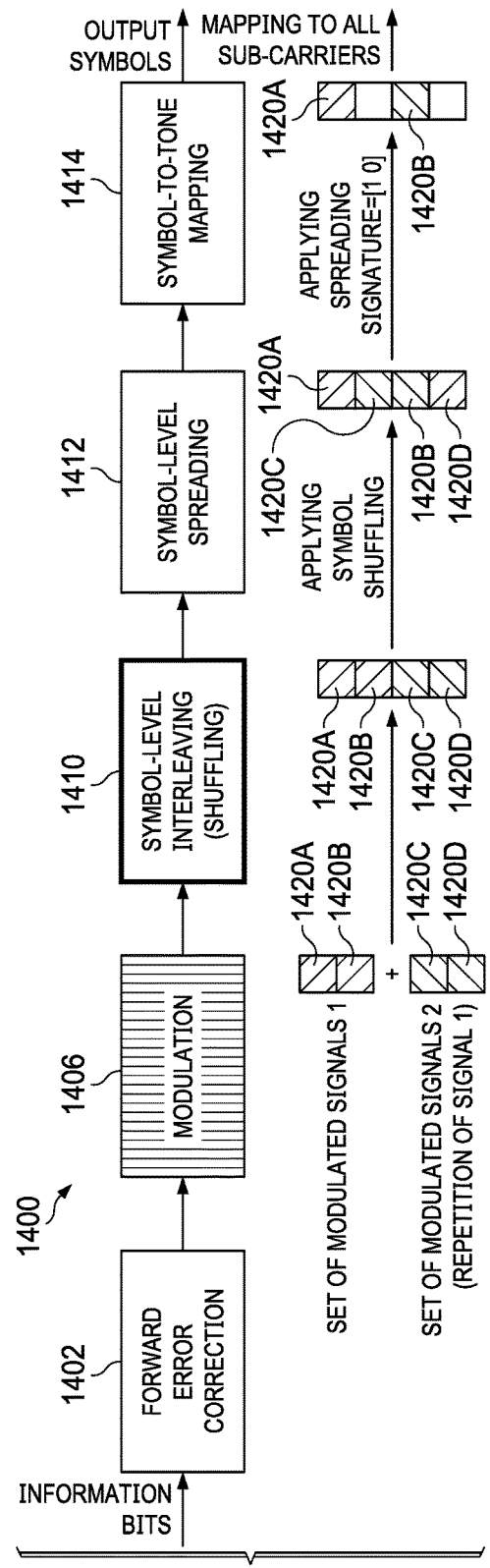
FIG. 14A is a schematic diagram showing an example NoMA scheme derived from the framework according to an aspect of the application.

FIG. 14A is a first example 1400 of a selected set of signal processing operations derived from the framework for generating a NoMA signal. In this first example 1400, the signal processing operations that are selected are FEC 1402, modulation 1406, symbol-level interleaving 1410, symbol-level spreading 1412 and symbol-to-tone mapping 1414. This set of signal processing operations may correspond to a particular implementation of Sparse Code Multiple Access (SCMA).

A representative example of how the modulation 1420 is performed is also shown in FIG. 14A below the modulation block 1306. Blocks 1420A, 1420B, 1420C and 1420D each represent a symbol to be transmitted. Blocks 1420A and 1420B represent a pair of modulated symbols and blocks 1420C and 1420D represent a duplicate version of the pair of modulated symbols of blocks 1420A and 1420B. The four blocks are combined by the modulation 1406 signal processing operation.

The symbol-level interleaving 1410 signal processing operation shuffles the symbols in the four blocks from the block arrangement of 1420A, 1420B, 1420C and 1420D to the block arrangement of 1422A, 1422C, 1422B and 1422D.

The symbol-level spreading 1412 applies a spreading signature equal to [1 0]. As a resulting of this spreading signature, the symbols in blocks 1420A, 1420B are maintained and the symbols in blocks 1420C and 1420D are removed, leaving those locations empty. Although FIG. 14A uses a particular spreading signature, this is not intended to be limiting, and other signatures are contemplated.

The symbol-to-tone mapping 1450 signal processing operation applies a one-to-one mapping of the symbols of blocks 1420A and 1420B and the two empty locations to available sub-carriers for transmission.

FIG. 14B is a second example 1440 of a selection of a set of signal processing operations derived from the framework for generating a NoMA signal. In example 1440, the signal processing operations that are selected and combined are FEC 1442, modulation 1446, and symbol-to-tone mapping 1454. In this implementation, the symbol-to-tone mapping may be realized via layer-specific and/or UE-specific sub-carrier mapping. In some embodiments, in modulation 1446, it is possible to define layer-specific and/or UE-specific modulation, such as, but not limited to, layer-specific and/or UE-specific phase rotations. This set of signal processing operations may correspond to a particular implementation of Sparse Code Multiple Access (SCMA).

FIG. 15 is a third example 1500 of a selection of a set of signal processing operations derived from the framework for generating a NoMA signal. In example 1500, the signal processing operations that are selected and combined are FEC 1502, modulation 1506, symbol-level interleaving 1510, symbol-level spreading 1512 and symbol-to-tone mapping 1514.

A representative example of how the modulation 1506 and symbol-level interleaving 1510 are performed is shown in FIG. 15. Similar to the manner in which modulation and interleaving is performed in FIG. 14A, blocks 1520A, 1520B, 1520C and 1520D in FIG. 15 are combined by the modulation 1506 signal processing operation and shuffled by the symbol-level interleaving 1510 signal processing operation.

In example 1500, the symbol-level spreading 1512 signal processing operation allows for linear spreading in addition to multi-dimensional spreading. This may be done by applying a general spreading sequence on top of the multi-dimensional signals. This is different than using a unique spreading signature, such as the signature [1 0] in example 1400 above. The transmitted signal may not be sparsely spread, as can be seen in FIG. 15, because each of the four blocks has a respective symbol. The symbol-to-tone mapping 1514 signal processing operation applies a one-to-one mapping to the available sub-carriers for transmission.

Figure 16A:
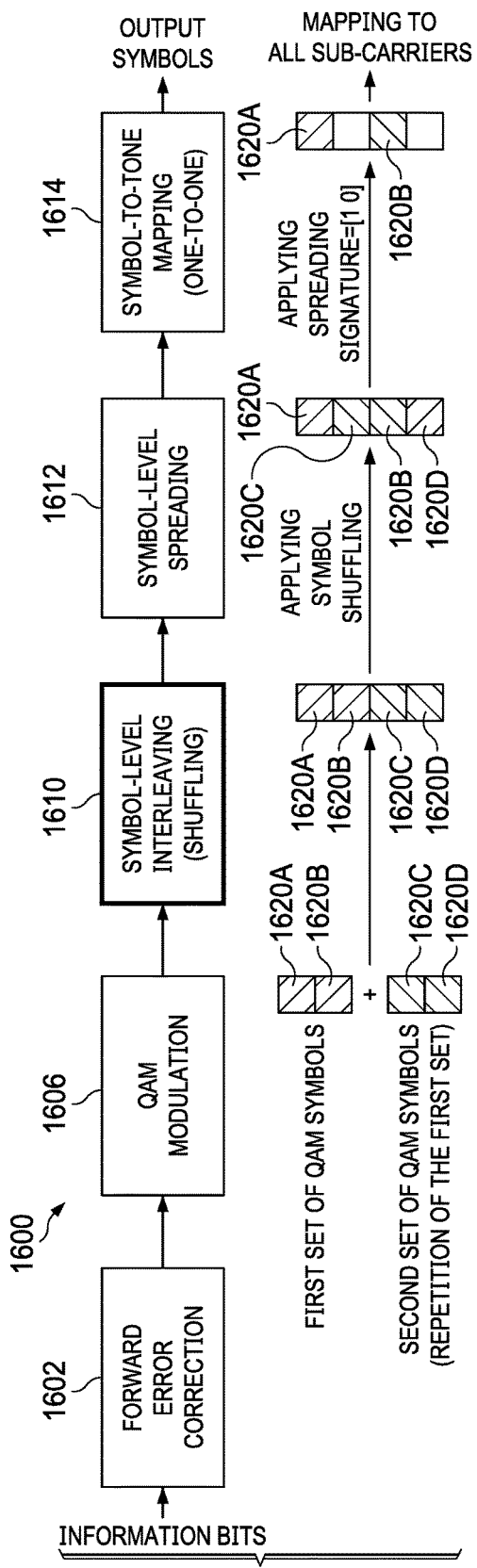
FIG. 16A is a schematic diagram showing an example NoMA scheme derived from the framework according to an aspect of the application.

FIG. 16A is a fourth example 1600 of a selection of a set of signal processing operations derived from the framework for generating a NoMA signal. In example 1600, the signal processing operations that are selected and combined are FEC 1602, Quadrature Amplitude Modulation (QAM) modulating 1606, symbol-level interleaving 1610, symbol-level spreading 1612 and symbol-to-tone mapping 1614, wherein the mapping is a one-to-one mapping.

A representative example of how the QAM modulation 1620 signal processing operation is performed is shown in FIG. 16A. Blocks 1620A, 1620B, 162C and 1620D are combined by the QAM modulation 1606 and shuffled by the symbol-level interleaving 1610 in a similar manner to that of the modulation 1606 and the symbol-level interleaving 1610 in FIG. 16A.

The symbol-level spreading 1612 applies a spreading signature equal to [1 0]. This results in the symbols in blocks 1620A, 1620B being maintained and the symbols that were in blocks 1620C, 1620D being removed, leaving those location empty.

The symbol-to-tone mapping 1614 applies a one-to-one mapping of blocks 420A, 420B and the empty locations to available sub-carriers for transmission.

Figure 16B:
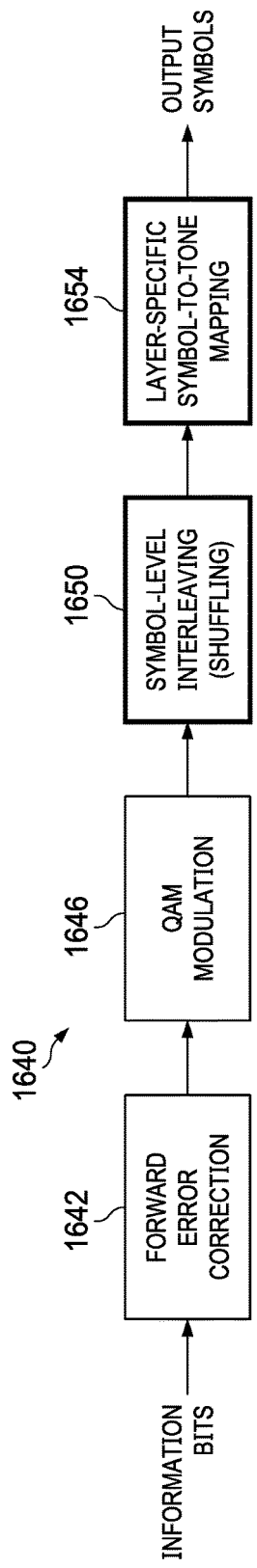
FIG. 16B is a schematic diagram showing an example NoMA scheme derived from the framework according to an aspect of the application.

FIG. 16B is a fifth example 1640 of a selection of a set of signal processing operations derived from the framework for generating a NoMA signal. In example 1640, the signal processing operations that are selected and combined are FEC 1642, QAM modulation 1646, symbol-level interleaving 1650 and layer-specific symbol-to-tone mapping 1654. In this implementation, the pattern-domain multiplexing may be realized via layer-specific sub-carrier mapping.

FIG. 17 is a sixth example 1700 of a selection of a set of signal processing operations derived from the framework for generating a NoMA signal. In example 1700, the signal processing operations that are selected and combined are FEC 1702, QAM modulation 1706, symbol-level spreading 1712 and symbol-to-tone mapping 1714. In this implementation, no symbol domain interleaving is utilized. The spreading sequence may be pre-defined or pseudo-random and the spreading sequence can be obtained from a known alphabet of symbols. The symbol-to-tone mapping maps the spread symbols to all available tones. There is no pattern multiplexing.

FIG. 18 is a seventh example 1800 of a selection of a set of signal processing operations derived from the framework for generating a NoMA signal. In example 1800, the signal processing operations that are selected and combined are FEC 1802, QAM modulation 1806, symbol-level spreading 1812 and symbol-to-tone mapping 1814. In this implementation there is no symbol domain interleaving. The spreading sequence may be pre-defined or pseudo-random and the spreading sequences can be obtained from a known alphabet of symbols. Signatures may have different sparsity levels. The symbol-to-tone mapping 1812 may be layer-specific and/or UE-specific depending on the way the symbol-spreading is defined. If the symbol-level spreading is only defined on the non-zero blocks, then the symbol-to-tone mapping can also be layer-specific and/or UE-specific.

Figure 19:
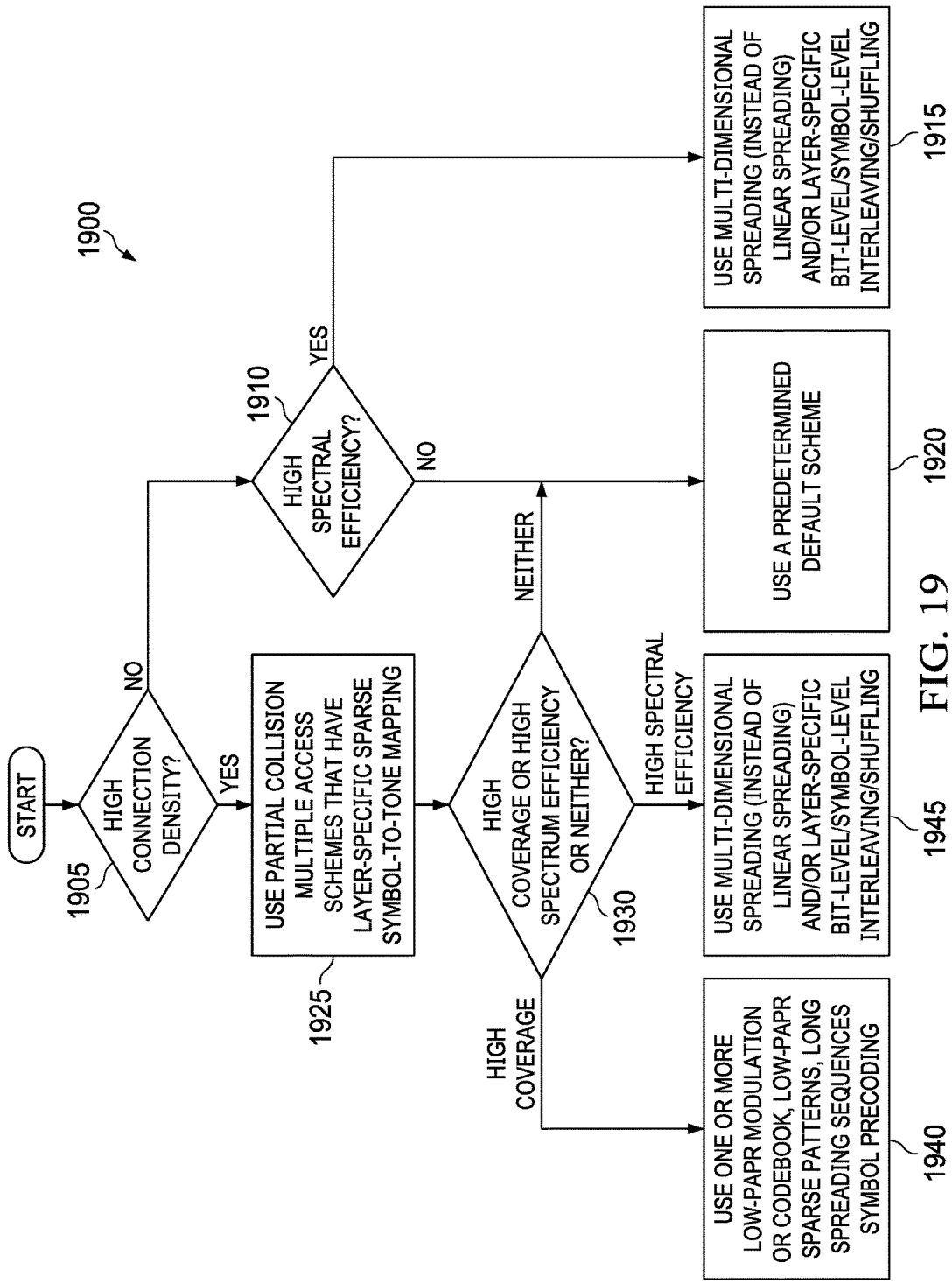
FIG. 19 is a flow diagram of an example method according to an embodiment of the application.

FIG. 19 is a flow chart 1900 that is an example of how the signal processing operations of the framework may be configured for use in generating a NoMA signal. Block 1905 is a decision point to determine if high connection density is required, i.e. receiver has to decode potentially large number of simultaneous signal transmissions. If no, there is another decision point block 1910. The decision to be determined at decision block 1910 is if the NoMA signal is to have a high spectral efficiency. If yes, block 1915 involves configuring the signal processing operations by using one or more of multi-dimensional spreading, layer-specific and/or UE-specific bit-level interleaving and layer-specific and/or UE-specific symbol-level interleaving. If no, block 1920 involves configuring the signal processing operations by using a predetermined default NoMA scheme.

If the result of decision block 1905 is yes, then block 1925 indicates that configuring the signal processing operations may involve using a partial collision multiple access scheme that includes layer-specific and/or UE-specific sparse symbol-to-tone mapping. Block 1930 is a decision point to determine if the NoMA signal is to have a high coverage area or a high spectral efficiency or neither. If neither, block 1920 involves configuring the signal processing operations by using a predetermined default NoMA scheme. If the signal is to have a high coverage area, block 1940 involves configuring the signal processing operations by using at least one of a low-PAPR modulation or codebook, low-PAPR sparse patterns, long spreading sequences, and symbol precoding. If the signal is to have a high spectral efficiency, then block 1945 involves configuring the signal processing operations by using one or more of multi-dimensional spreading, instead of linear spreading, layer-specific and/or UE-specific bit-level interleaving and layer-specific and/or UE-specific symbol-level interleaving.

The example framework described above is described with respect to UL NoMA, and it is considered that the framework is utilized by one or more UEs that are communicating with a network side receiver. Each UE may select different signal processing operations that the UE determines are best for the UE's respective application. The UEs can determine the signal processing operations based on one or more of: a) requirements imposed upon the UEs by the network, b) requirements established by the UEs c) measurements made by the UEs that define the UE environment and d) UE id or layer index.

The UE may receive information from the network that may be relevant to the decisions being made by the UE. For example, the network may indicate to the UE if the receiver is in a high density area to enable the UE to make an appropriate decision about which signal processing operations to select. Such information may be sent by the network in a high layer message. Physical conditions, such as signal density in a given area, may not change drastically over time and therefore may be less frequently updated.

Configuring the signal processing operations may include configuring spreading signatures for full spreading or partial spreading; selecting the type of modulation to be used, such as, but not limited to, QAM, PSK, multi-dimensional modulation; or selecting whether pre-coding is to be used or not.

Although the UE may be responsible for selecting the signal processing operations, the UE may receive information from the network side receiver and select signal processing operations based on the received information. The network side receiver may propose or assign different selections for different UEs based in the receiver's knowledge of the UEs.

The UEs may also signal the receiver to inform the receiver of the type of NoMA signal being used, i.e. the types of signal processing operations it is using to generate the signal.

The receiver may be capable of using different types of decoding methods that best suit a given signal. For example, the receiver may be capable of using decoding methods such as maximum likelihood (ML), message passing algorithm (MPA) and successive interference cancellation (SIC). In some embodiments, the receiver can select the best decoding method to decode the signal based on knowledge the receiver has of the UE and the environment the UE is operating within and the application scenario. The environment that the UE is operating with may refer to physical layer requirements such as spectral efficiency, coverage, peak to average power ratio (PAPR) and system connectivity. In some embodiments, the receiver can select the best decoding method to decode the signal based on information received from the UE identifying the type of NoMA scheme the UE has selected for transmission.

FIG. 20 illustrates an example of a collection of signal processing operations that may be part of a framework 100 for generating a NoMA signal, which includes units to function as FEC 2002, bit-level interleaver/scrambler 2004, modulated symbol sequence generator 2006, symbol sequence precoder 2008, symbol to RE mapping 2010, and waveform modulator 2012.

Step 1 : A stream of information bits 2001 is provided to perform forward error correction (FEC) encoding 2002. Within the FEC module, information bits are processed with FEC channel code. One example is a block of K information bits are coded and N coded bits are generated, and N>K.

Step 2 : The encoded bit is then provided to bit-level interleaver/scrambler 2104 for bit-level interleaving/scrambling process. In the bit-level interleaver/scrambler 2104, the coded bits are interleaved or scrambled, and interleaved/scrambled bits are generated. The bit-level interleaver/scrambler can be UE-specific, i.e., each UE has a specific interleaver/scrambler, layer-specific, or cell-specific, i.e., the UEs in each cell apply a specific interleaver/scrambler.

Step 3 : An output of coded bits from the bit-level interleaver/scrambler 2004 is provided to the modulated symbol level sequence generator 2006. The modulated symbol level sequence generator 2006 generates symbols from the coded bits. In the modulated symbol sequence generator 2006, the interleaved/scrambled bits are mapped to modulated symbols, with or without additional symbol-level spreading operations. The bit-to-symbol mapping can be one or multiple bits to one or multiple symbols. The symbol-level spreading is to multiply the symbols with spreading codes, which may include one or multiple stages, and the length of spreading code can be different at each stage.

Step 4 (optional): An output of the modulated symbol level sequence generator 106 is provided to symbol sequence precoder 2008 that performs symbol pre-coding 2008. The modulated symbols sequence may be applied to a symbol sequence precoder 2008. This is mainly for reducing the PAPR of the transmitted signal that may improve coverage of the transmitted signal. In the case of OFDM waveform, DFT precoding might be used.

Step 5 : An output of the symbol sequence precoder 2008 is provided to the symbol to resource element (RE) mapping 2010. The modulation symbols are mapped to the resource elements for transmission, with or without additional symbol-level interleaving/scrambling. The symbol-level interleaver/scrambler can be UE-specific, i.e., each UE has a symbol-level specific interleaver/scrambler, layer-specific, or cell-specific, i.e., the UE in each cell apply a symbol-level specific interleaver/scrambler.

It can also be noted that the order of the signal processing operations can be changed, for example, symbol sequence precoder can be put after the symbol to RE mapping.

Step 6 : waveform modulator: after generating the symbols and mapping them to the REs, the waveform generator block will generate the actual signal to be transmitted over the air.

FIG. 21 shows different aspects for the Bit level interleaver/scrambler block used in the framework in which UE/cell specific bit-level interleaver/scrambler might be used. The interleaver is applied to change the order of the bits, and the order of bits can be referred to as interleaver pattern. The coded bits can also be scrambled with a scrambler. The scrambler is applied to do exclusive or (XOR) operation to the coded bits with a scrambling sequence. Either interleaver, scrambler, or the combinations of both can be applied here. If both are applied, either one can be applied first. The interleaver pattern and scrambling sequence might be UE-specific, layer-specific, or cell-specific meaning that it depends on the UE, layer, or cell id or combination of some or all. Each of the following cases can be understood as an aspect of the disclosure for Bit level interleaver/scrambler 2004 in FIG. 20.

In one aspect of the disclosure shown as case 1 in FIG. 21, UE-specific bit interleaving is used. The coded bits are interleaved with UE-specific bit interleavers, and UEs may have different interleavers. In an embodiment, the coded bits are interleaved with layer-specific bit interleavers, and different layers may have different interleavers.

In one aspect of the disclosure shown as case 2 in FIG. 21, UE-specific bit scrambling is used. The coded bits are scrambled with UE-specific scrambler, and UEs may have different scramblers. In an embodiment, the coded bits are scrambled with a layer-specific scrambler, and different layers may have different scramblers.

In one aspect of the disclosure shown as case 3 in FIG. 21, UE-specific bit interleaving or layer-specific bit interleaving and cell-specific bit scrambling is used. The coded bits may be first interleaved with UE-specific interleaver or layer-specific interleaver, and then scrambled with cell-specific scrambler, or in the other order. The term "cell specific" may be understood as network specific, or per base station coverage specific.

In one aspect of the disclosure shown as case 4 in FIG. 21, UE-specific bit scrambling or layer-specific bit scrambling and cell-specific bit interleaving is used. The coded bits are first scrambled with a UE-specific scrambler or a layer-specific scrambler, and then interleaved with cell-specific interleaver. Again, the order for scrambling and interleaving may change.

In one aspect of the disclosure shown as case 5 in FIG. 21, neither interleaving nor scrambling operations are applied. In another words, in case 5, the bit level interleaver/scrambler 2004 in FIG. 20 is optional.

Figure 22:
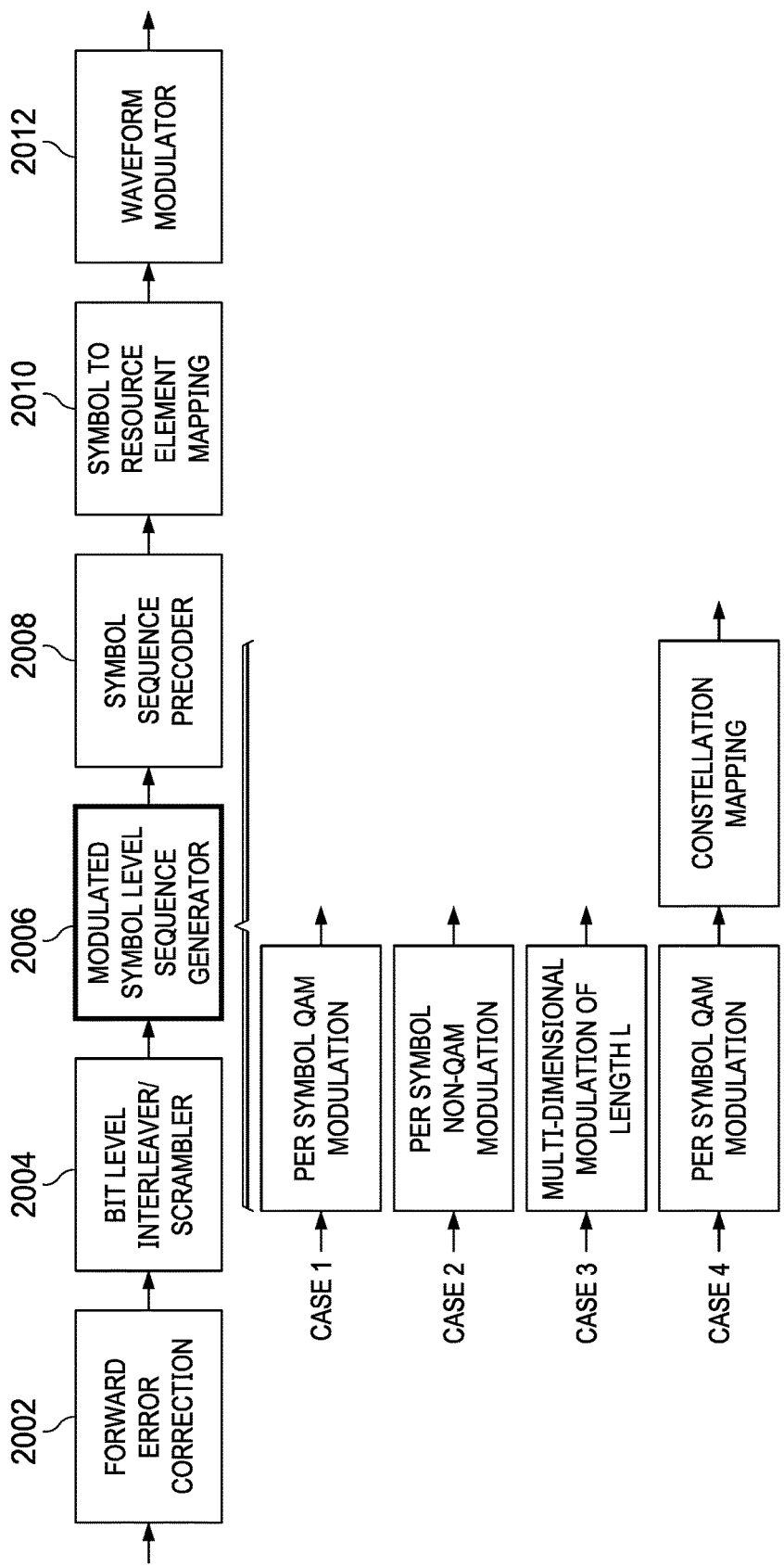

FIG. 22 shows different aspects for the modulated symbol level sequence generator block used in the framework. In some embodiments, interleaved/scrambled bits are mapped to modulated symbols. The bit-to-symbol mapping can be based on the same mapping function used for mapping of streams of bits (or a single bit) to a single symbol. The mapping can be a QAM modulation, or non-QAM modulation. In some other embodiments, the bit-to-symbol mapping can be based on the same mapping function used for mapping of streams of bits to a multiple symbols. The mapping can be a multi-dimensional modulation.

In some other embodiments, each stream of interleaved/scrambled is mapped to a symbol which may be generated using a QAM modulator, BPSK modulation, and/or $$\frac{\pi}{2} - BPSK$$

modulation. Then, this symbol is mapped to multiple modulated symbols by constellation mapping which maps the points of the original constellation to some other points for each modulated symbol. In some other schemes, the mapped constellation points are the same but the bit-to-constellation labeling are different for each modulated symbol.

Any of the above ways of bit-to-symbol mapping can be UE-specific and/or layer-specific, which means different UEs or different layers sent by the same UE apply different ways of bit-to-symbol mapping. Any of the above ways of bit-to-symbol mapping can be cell-specific, which means the UEs in each cell apply the same way of bit-to-symbol mapping, but the UEs in different cells apply different ways of bit-to-symbol mapping.

In one aspect of the disclosure shown as case 1 in FIG. 22, modulated symbol level sequence generation includes QAM modulation to map each stream of input bits to a QAM symbol. In some embodiments, BPSK modulation, and/or $$\frac{\pi}{2} - BPSK$$

modulation can be used as QAM modulation.

In one aspect of the disclosure shown as case 2 in FIG. 22, modulated symbol level sequence generation includes non-QAM modulation to map each stream of input bits to a non-QAM symbol.

In one aspect of the disclosure shown as case 3 in FIG. 22, modulated symbol level sequence generation includes by multi-dimensional Modulation of length L to map each stream of input bits to L symbols.

In one aspect of the disclosure shown as case 4 in FIG. 22, modulated symbol level sequence generation includes per symbol QAM modulation followed by constellation mapping to generate second modulated symbol. In this case, the mapped constellation points are the same as the original QAM constellation, however, the bit-to-constellation labelling are different for each second modulated symbol In some schemes, after mapping of the streams of interleaved/scrambled bits are mapped to modulated symbols, we have symbol-level spreading by multiplying each modulated symbol to a spreading code. The same spreading code may be used for each modulated symbol and therefore, the spreading can be modeled by vector multiplication. The number of rows may indicate the spreading factor or the number of non-zero elements in the spreading block.

In some schemes, interleaved/scrambled bits are mapped to modulated symbols. The bit-to-symbol mapping can be based on the same mapping function used for mapping of streams of bits (or a single bit) to a single symbol. The bit-to-symbol mapping can be UE-specific, layer-specific, cell-specific UE-specific, layer-specific, cell-specific or a combination thereof.

In some schemes, interleaved/scrambled bits are mapped to modulated symbols. The bit-to-symbol mapping can be based on the same mapping function used for mapping of streams of bits to a multiple symbols. The bit-to-symbol mapping can be UE-specific, layer-specific, cell-specific or a combination thereof.

In some schemes, each stream of interleaved/scrambled is mapped to a symbol which may be generated using a QAM modulator, BPSK modulation, and/or $$\frac{\pi}{2} - BPSK$$

modulation. Then, this symbol is mapped to multiple modulated symbols by constellation mapping which maps the points of the original constellation to some other points for each modulated symbol. In some other schemes, the mapped constellation points are the same but the bit-to-constellation labeling are different for each modulated symbol. The constellation mapping process may be symbol-specific, UE-specific, layer-specific, cell-specific or a combination thereof.

Figure 23:
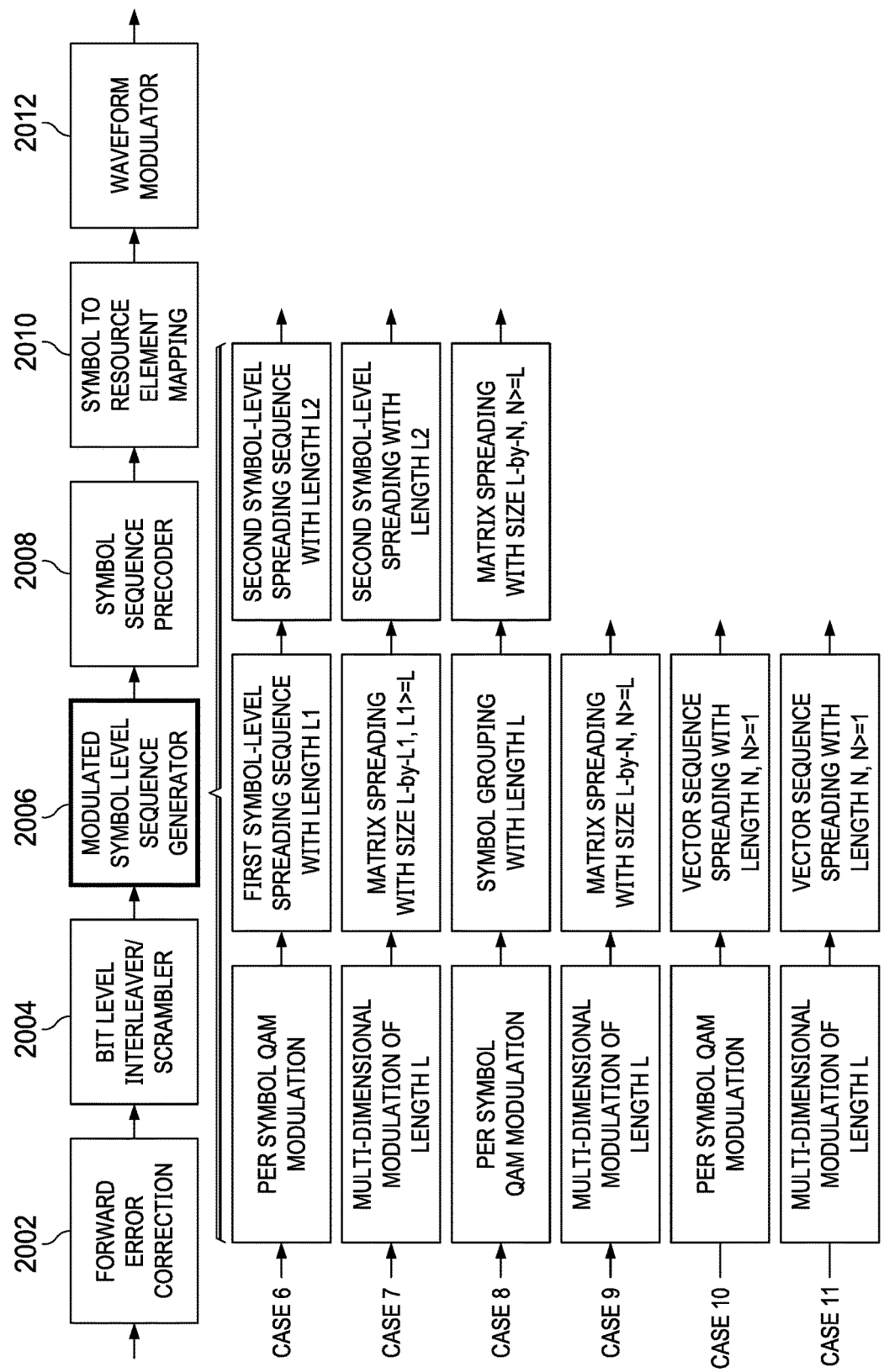
FIGS. 23 to 29 are schematic diagrams showing examples of Modulated symbol level sequence generator function unit in FIG. 20 according to an aspect of the application.

FIG. 23 shows different aspects for the modulated symbol level sequence generator block used in the framework. In some embodiments, after mapping of the streams of interleaved/scrambled bits to modulated symbols, one or multiple levels of symbol-level spreading can be applied. For example, when there are two levels of symbol-level spreading, the modulated symbols are multiplied by a first spreading code in the first stage, and the generated spread symbols can be spread again using a second spreading code. The first spreading code and second spreading code may have different lengths. The spreading codes used for each stage can be symbol-specific, UE-specific, layer-specific, cell-specific or a combination thereof.

In some other embodiments, after mapping of the streams of interleaved/scrambled bits are mapped to modulated symbols, we have symbol-level spreading by multiplying each modulated symbol to a spreading code. The spreading code used for spreading each modulated symbol can be different. In some embodiments, the spreading can be modeled by matrix multiplication. The number of columns may indicate the modulation order or number of modulated symbol, and the number of rows may indicate the spreading factor or the number of non-zero elements in the spreading block. The spreading matrix can be symbol-specific, UE-specific, layer-specific, cell-specific or a combination thereof.

In some other embodiments, after mapping of the streams of interleaved/scrambled bits are mapped to modulated symbols, we have symbol-level spreading by multiplying each modulated symbol to a spreading code. The same spreading code may be used for each modulated symbol. In some embodiments, the spreading can be modeled by vector multiplication. The number of rows may indicate the spreading factor or the number of non-zero elements in the spreading block. The spreading code can be symbol-specific, UE-specific, layer-specific, cell-specific or a combination thereof.

In one aspect of the disclosure shown as case 6 in FIG. 23, modulated symbol level sequence generation is performed by QAM modulation, BPSK modulation, and/or $$\frac{\pi}{2} - BPSK$$

modulation to map each stream of input bits to a QAM and/or BPSK symbol followed by first symbol-level spreading with length L1 to generate the first modulated symbol sequence.

In some other aspects shown in case 6, the first modulated symbol sequence is further spread using the second symbol-level spreading with length L2.

In one aspect of the disclosure shown as case 7 in FIG. 23, modulated symbol level sequence generation is performed by Multi-dimensional Modulation of length L to map each stream of input bits to each stream of input bits to L symbols followed by first matrix spreading with size L-by-L1, L1>=L to generate the first modulated symbol sequence.

In some other aspects shown in case 7, the first modulated symbol sequence is further spread using the second symbol-level spreading with length L2.

In one aspect of the disclosure shown as case 8 in FIG. 23, modulated symbol level sequence generation is performed by per symbol QAM modulation, BPSK modulation, and/or $$\frac{\pi}{2} - BPSK$$

modulation followed by grouping of the symbols in groups of size L. Then, the symbol groups are multiplied by matrix spreading with size L-by-N, N>=L where N denotes the spreading length.

In one aspect of the disclosure shown as case 9 in FIG. 23, modulated symbol level sequence generation is performed by multi-dimensional Modulation of length L to map each stream of input bits to L symbols and followed by matrix spreading with size L-by-N, N>=L where N denotes the spreading length.

In one aspect of the disclosure shown as case 10 in FIG. 23, modulated symbol level sequence generation is performed by QAM modulation, BPSK modulation, and/or $$\frac{\pi}{2} - BPSK$$

modulation to map each stream of input bits to a QAM and/or BPSK symbol followed by vector sequence spreading with length N, N>=1.

In one aspect of the disclosure shown as case 11 in FIG. 23, modulated symbol level sequence generation is performed by multi-dimensional Modulation of length L to map each stream of input bits to L symbols followed by vector sequence spreading with length N, N>=1.

Figure 24:
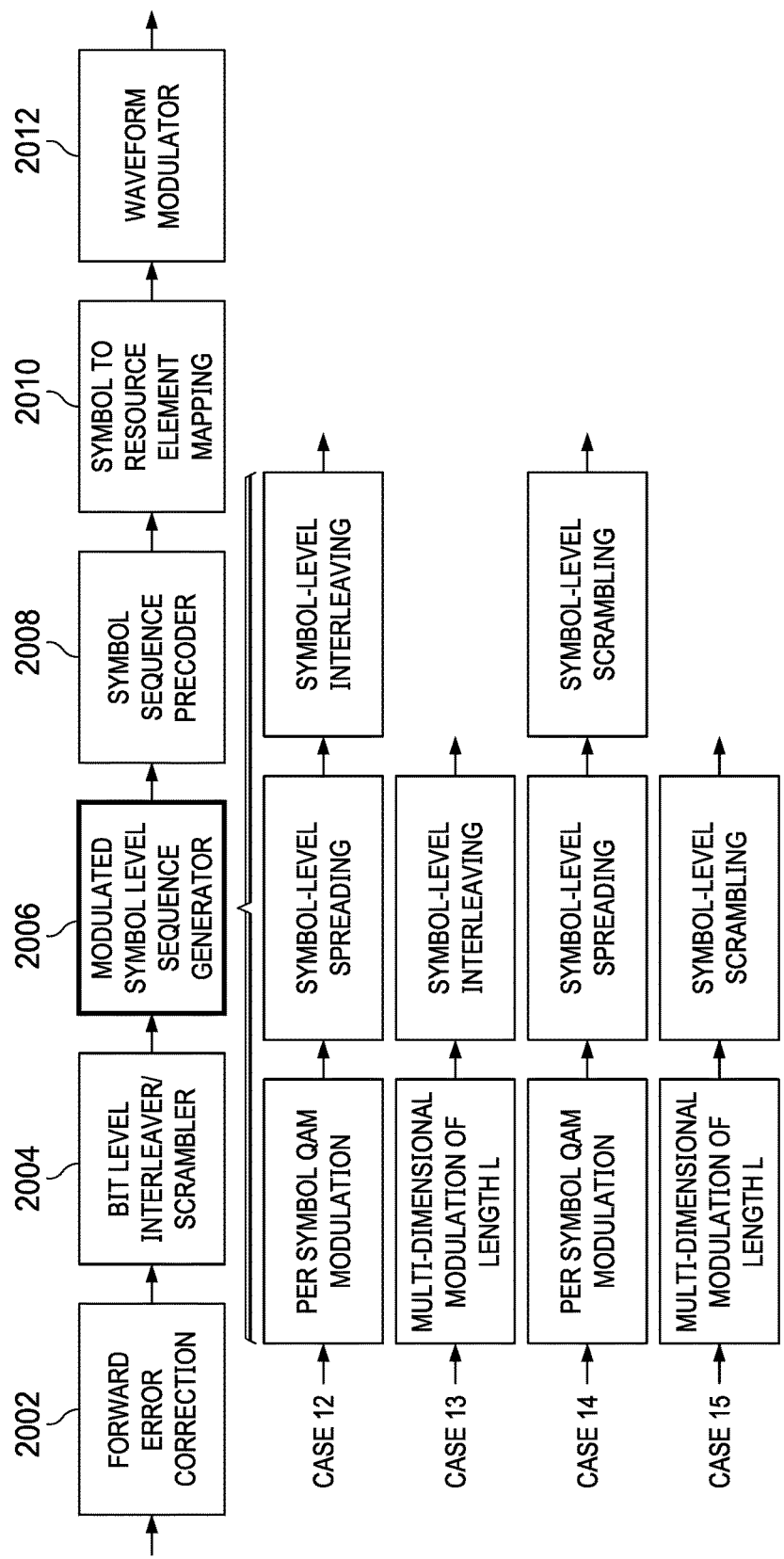

FIG. 24 shows different aspects for the modulated symbol level sequence generator block used in the framework. In some embodiments, the modulated symbols, with or without spreading, can go through a symbol-level interleaver for better interference randomization. The role of symbol-level interleaver is to change the order of the symbols which can be referred to as interleaver pattern. The modulated symbols, with or without spreading, can go through a symbol-level scrambler for better interference randomization. The scrambler is to multiple the symbols with a scrambling sequence. The interleaver pattern and scrambling sequence might be UE-specific, layer-specific, cell-specific or a combination thereof.

In one aspect of the disclosure shown as case 12 in FIG. 24, modulated symbol level sequence generation is performed by QAM modulation, BPSK modulation, and/or $$\frac{\pi}{2} - BPSK$$

modulation to map each stream of input bits to a QAM symbol and/or BPSK symbol followed by vector sequence spreading with length N, N>=1. Then, symbol-level interleaving might also be applied to the output modulated symbol sequence.

In one aspect of the disclosure shown as case 13 in FIG. 24, modulated symbol level sequence generation is performed by multi-dimensional Modulation of length L to map each stream of input bits to L symbols followed by symbol-level interleaving.

In one aspect of the disclosure shown as case 14 in FIG. 24, modulated symbol level sequence generation is performed by QAM modulation, BPSK modulation, and/or $$\frac{\pi}{2} - BPSK$$

modulation to map each stream of input bits to a QAM and/or BPSK symbol followed by vector sequence spreading with length N, N>=1. Then, symbol-level scrambling might also be applied to the output modulated symbol sequence.

In one aspect of the disclosure shown as case 15 in FIG. 24, modulated symbol level sequence generation is performed by multi-dimensional Modulation of length L to map each stream of input bits to L symbols followed by symbol-level scrambling.

Figure 25:
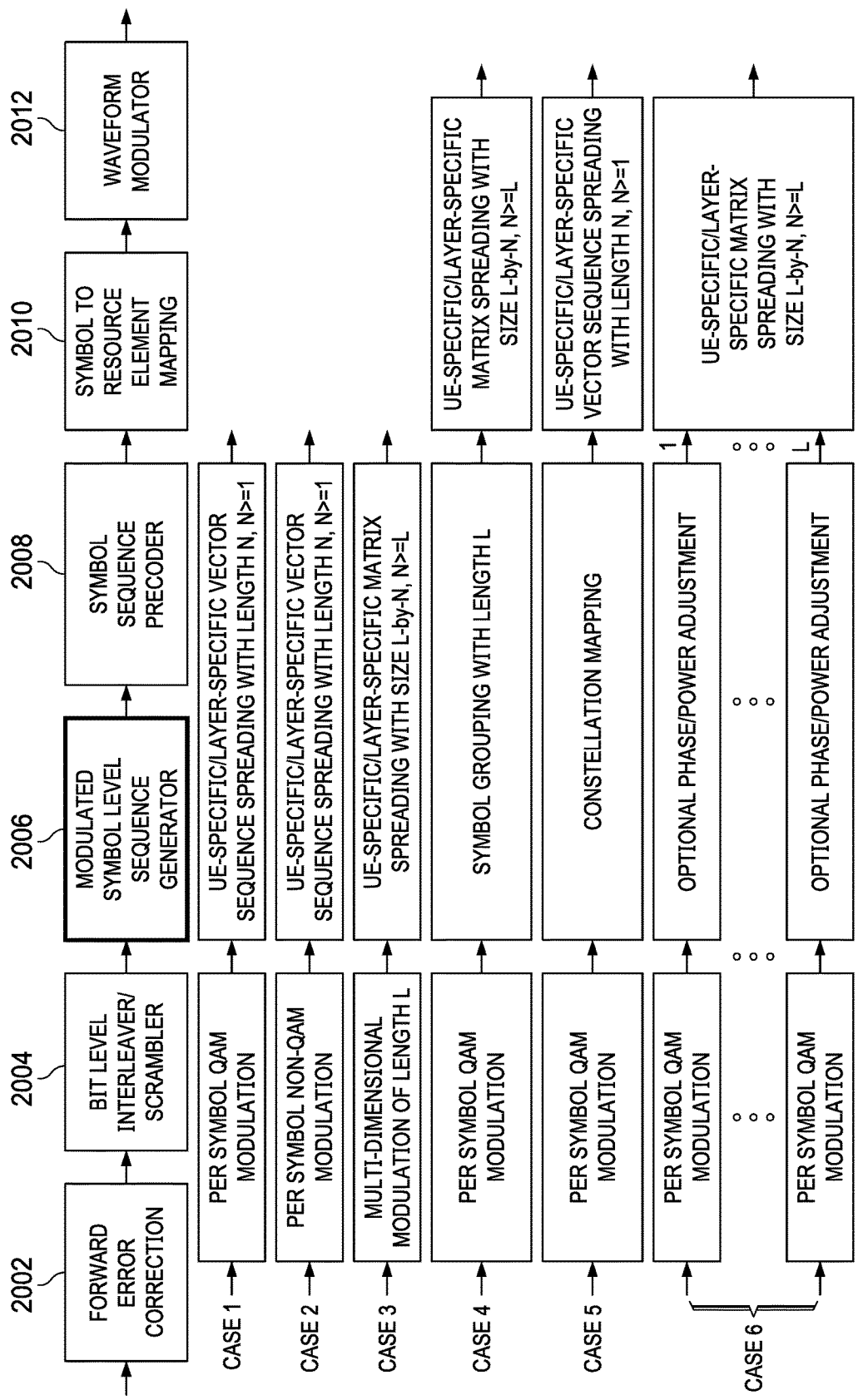

FIG. 25 shows different aspects for the modulated symbol level sequence generator block used in the framework.

In one aspect of the disclosure shown as case 1 in FIG. 25, modulated symbol level sequence generation is performed by QAM modulation, BPSK modulation, and/or $$\frac{\pi}{2} - BPSK$$

modulation to map each stream of input bits to a QAM and/or BPSK symbol followed by UE-specific vector sequence spreading with length N, N>=1.

In one aspect of the disclosure shown as case 2 in FIG. 25, modulated symbol level sequence generation is performed by non-QAM modulation, BPSK modulation, and/or $$\frac{\pi}{2} - BPSK$$

modulation to map each stream of input bits to a symbol followed by UE-specific vector sequence spreading with length N, N>=1.

In one aspect of the disclosure shown as case 3 in FIG. 25, modulated symbol level sequence generation is performed by multi-dimensional Modulation of length L to map each stream of input bits to L symbols and followed by UE-specific matrix spreading with size L-by-N, N>=L where N denotes the spreading length.

In one aspect of the disclosure shown as case 4 in FIG. 25, modulated symbol level sequence generation is performed by per symbol QAM modulation, BPSK modulation, and/or $$\frac{\pi}{2} - BPSK$$

modulation followed by grouping of the symbols in groups of size L. Then, the symbol groups are multiplied by UE-specific matrix spreading with size L-by-N, N>=L where N denotes the spreading length.

In one aspect of the disclosure shown as case 5 in FIG. 25, modulated symbol level sequence generation is performed by per symbol QAM modulation, BPSK modulation, and/or $$\frac{\pi}{2} - BPSK$$

modulation followed by constellation mapping to generate second modulated symbols. Then, the second modulated symbol is spread by UE-specific vector sequence spreading with length N, N>=1.

In one aspect of the disclosure shown as case 6 in FIG. 25, modulated symbol level sequence generation is performed by per symbol QAM modulation, BPSK modulation, and/or $$\frac{\pi}{2} - BPSK$$

modulation followed by applying optional phase and/or amplitude adjustment to each modulated symbol and then grouping of the symbols in groups of size L. Then, the symbol groups are multiplied by UE-specific matrix spreading with size L-by-N, N>=L where N denotes the spreading length.

Figure 26:
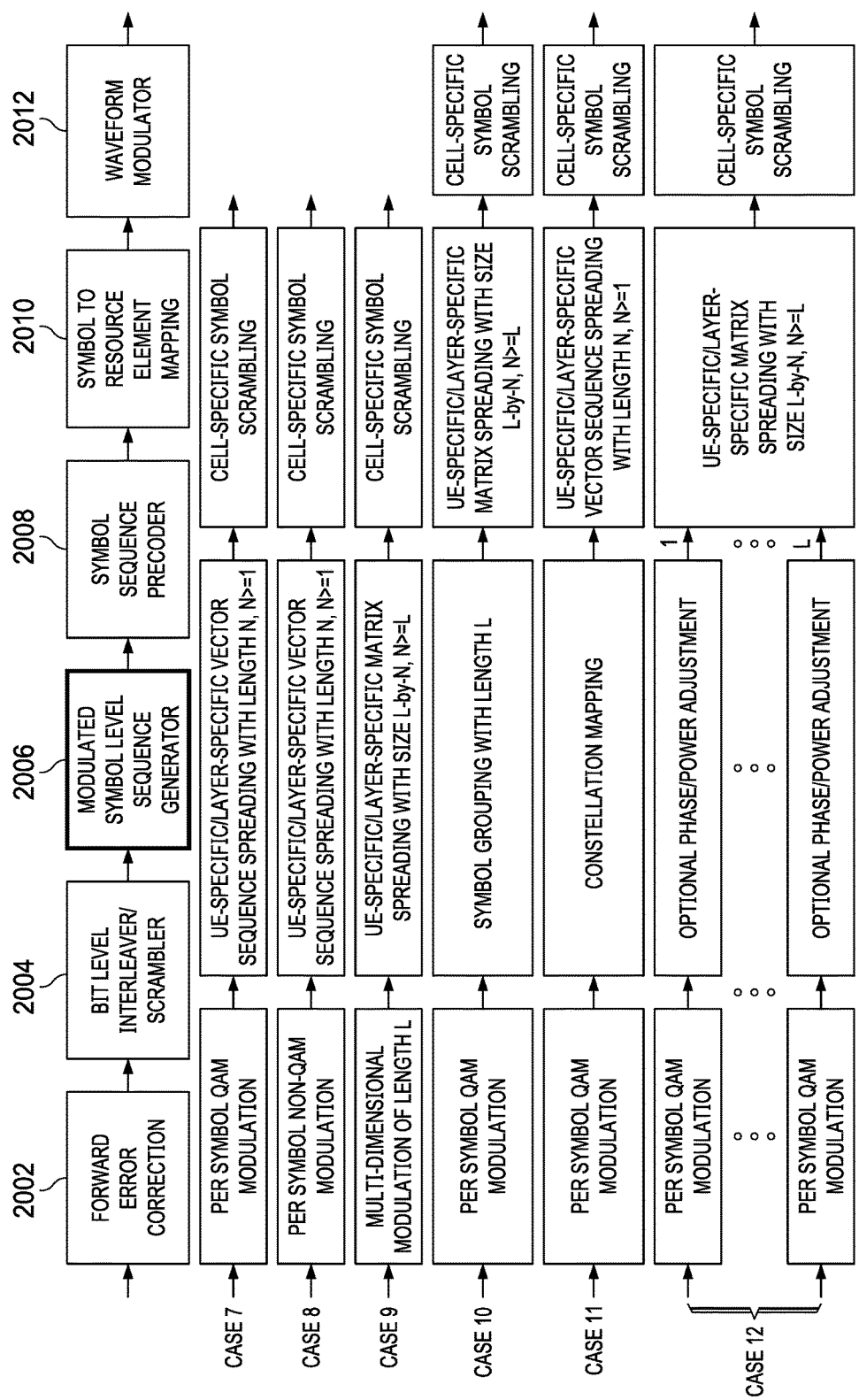

FIG. 26 shows different aspects for the modulated symbol level sequence generator block used in the framework.

In one aspect of the disclosure shown as case 7 in FIG. 26, modulated symbol level sequence generation is performed by QAM modulation, BPSK modulation, and/or $$\frac{\pi}{2} - BPSK$$

modulation to map each stream of input bits to a QAM and/or BPSK symbol followed by UE-specific vector sequence spreading with length N, N>=1. Then, cell-specific symbol scrambling is applied to the modulated symbol sequence. In some embodiments, vector sequence spreading and/or symbol scrambling can also be layer-specific.

In one aspect of the disclosure shown as case 8 in FIG. 26, modulated symbol level sequence generation is performed by non-QAM modulation, BPSK modulation, and/or $$\frac{\pi}{2} - BPSK$$

modulation to map each stream of input bits to a symbol followed by UE-specific vector sequence spreading with length N, N>=1. Then, cell-specific symbol scrambling is applied to the modulated symbol sequence. In some embodiments, vector sequence spreading and/or symbol scrambling can also be layer-specific.

In one aspect of the disclosure shown as case 9 in FIG. 26, modulated symbol level sequence generation is performed by multi-dimensional Modulation of length L to map each stream of input bits to L symbols and followed by UE-specific matrix spreading with size L-by-N, N>=L where N denotes the spreading length. Then, cell-specific symbol scrambling is applied to the modulated symbol sequence. In some embodiments, matrix spreading and/or symbol scrambling can also be layer-specific.

In one aspect of the disclosure shown as case 10 in FIG. 26, modulated symbol level sequence generation is performed by per symbol QAM modulation, BPSK modulation, and/or $$\frac{\pi}{2} - BPSK$$

modulation followed by grouping of the symbols in groups of size L. Then, the symbol groups are multiplied by UE-specific matrix spreading with size L-by-N, N>=L where N denotes the spreading length. Then, cell-specific symbol scrambling is applied to the modulated symbol sequence. In some embodiments, matrix spreading and/or symbol scrambling can also be layer-specific.

In one aspect of the disclosure shown as case 11 in FIG. 26, modulated symbol level sequence generation is performed by per symbol QAM modulation, BPSK modulation, and/or $$\frac{\pi}{2} - BPSK$$

modulation followed by constellation mapping to generate second modulated symbols. Then, the second modulated symbol is spread by UE-specific vector sequence spreading with length N, N>=1. Then, cell-specific symbol scrambling is applied to the modulated symbol sequence. In some embodiments, vector sequence spreading and/or symbol scrambling can also be layer-specific.

In one aspect of the disclosure shown as case 12 in FIG. 26, modulated symbol level sequence generation is performed by per symbol QAM modulation, BPSK modulation, and/or $$\frac{\pi}{2} - BPSK$$

modulation followed by applying optional phase and/or amplitude adjustment to each modulated symbol and then grouping of the symbols in groups of size L. Then, the symbol groups are multiplied by UE-specific matrix spreading with size L-by-N, N>=L where N denotes the spreading length. Then, cell-specific symbol scrambling is applied to the modulated symbol sequence. In some embodiments, matrix spreading and/or symbol scrambling can also be layer-specific.

Figure 27:
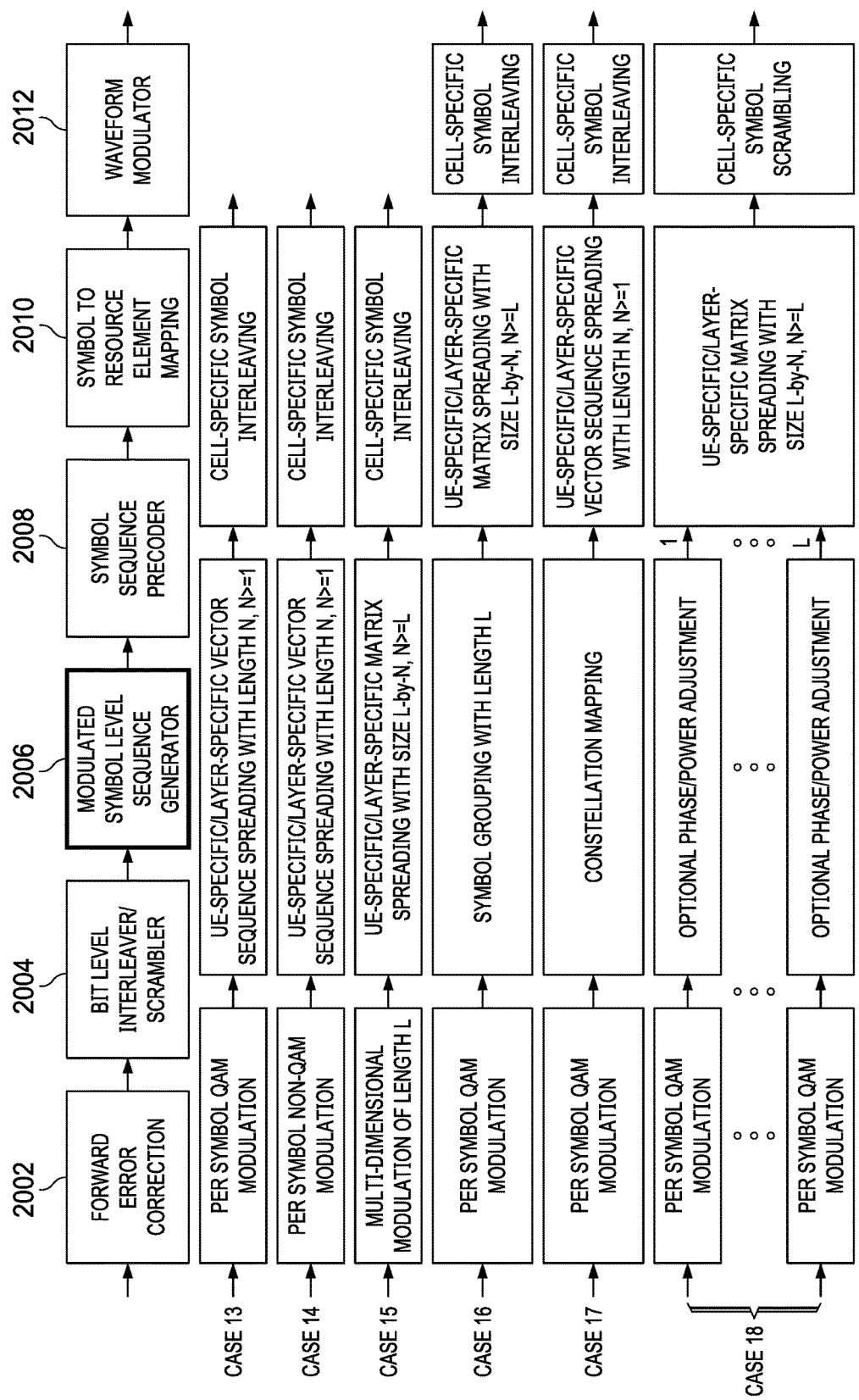

FIG. 27 shows different aspects for the modulated symbol level sequence generator block used in the framework.

In one aspect of the disclosure shown as case 13 in FIG. 27, modulated symbol level sequence generation is performed by QAM modulation, BPSK modulation, and/or $$\frac{\pi}{2} - BPSK$$

modulation to map each stream of input bits to a QAM symbol followed by UE-specific vector sequence spreading with length N, N>=1. Then, cell-specific symbol interleaving is applied to the modulated symbol sequence. In some embodiments, vector sequence spreading and/or symbol interleaving can also be layer-specific.

In one aspect of the disclosure shown as case 14 in FIG. 27, modulated symbol level sequence generation is performed by non-QAM modulation, BPSK modulation, and/or $$\frac{\pi}{2} - BPSK$$

modulation to map each stream of input bits to a symbol followed by UE-specific vector sequence spreading with length N, N>=1. Then, cell-specific symbol interleaving is applied to the modulated symbol sequence. In some embodiments, vector sequence spreading and/or symbol interleaving can also be layer-specific.

In one aspect of the disclosure shown as case 15 in FIG. 27, modulated symbol level sequence generation is performed by multi-dimensional Modulation of length L to map each stream of input bits to L symbols and followed by UE-specific matrix spreading with size L-by-N, N>=L where N denotes the spreading length. Then, cell-specific symbol interleaving is applied to the modulated symbol sequence. In some embodiments, matrix spreading and/or symbol interleaving can also be layer-specific.

In one aspect of the disclosure shown as case 16 in FIG. 27, modulated symbol level sequence generation is performed by per symbol QAM modulation, BPSK modulation, and/or $$\frac{\pi}{2} - BPSK$$

modulation followed by grouping of the symbols in groups of size L. Then, the symbol groups are multiplied by UE-specific matrix spreading with size L-by-N, N>=L where N denotes the spreading length. Then, cell-specific symbol interleaving is applied to the modulated symbol sequence. In some embodiments, matrix spreading and/or symbol interleaving can also be layer-specific.

In one aspect of the disclosure shown as case 17 in FIG. 27, modulated symbol level sequence generation is performed by per symbol QAM modulation, BPSK modulation, and/or $$\frac{\pi}{2} - BPSK$$

modulation followed by constellation mapping to generate second modulated symbols. Then, the second modulated symbol is spread by UE-specific vector sequence spreading with length N, N>=1. Then, cell-specific symbol interleaving is applied to the modulated symbol sequence. In some embodiments, vector sequence spreading and/or symbol interleaving can also be layer-specific.

In one aspect of the disclosure shown as case 18 in FIG. 27, modulated symbol level sequence generation is performed by per symbol QAM modulation, BPSK modulation, and/or $$\frac{\pi}{2} - BPSK$$

modulation followed by applying optional phase and/or amplitude adjustment to each modulated symbol and then grouping of the symbols in groups of size L. Then, the symbol groups are multiplied by UE-specific matrix spreading with size L-by-N, N>=L where N denotes the spreading length. Then, cell-specific symbol interleaving is applied to the modulated symbol sequence. In some embodiments, matrix spreading and/or symbol interleaving can also be layer-specific.

Figure 28:
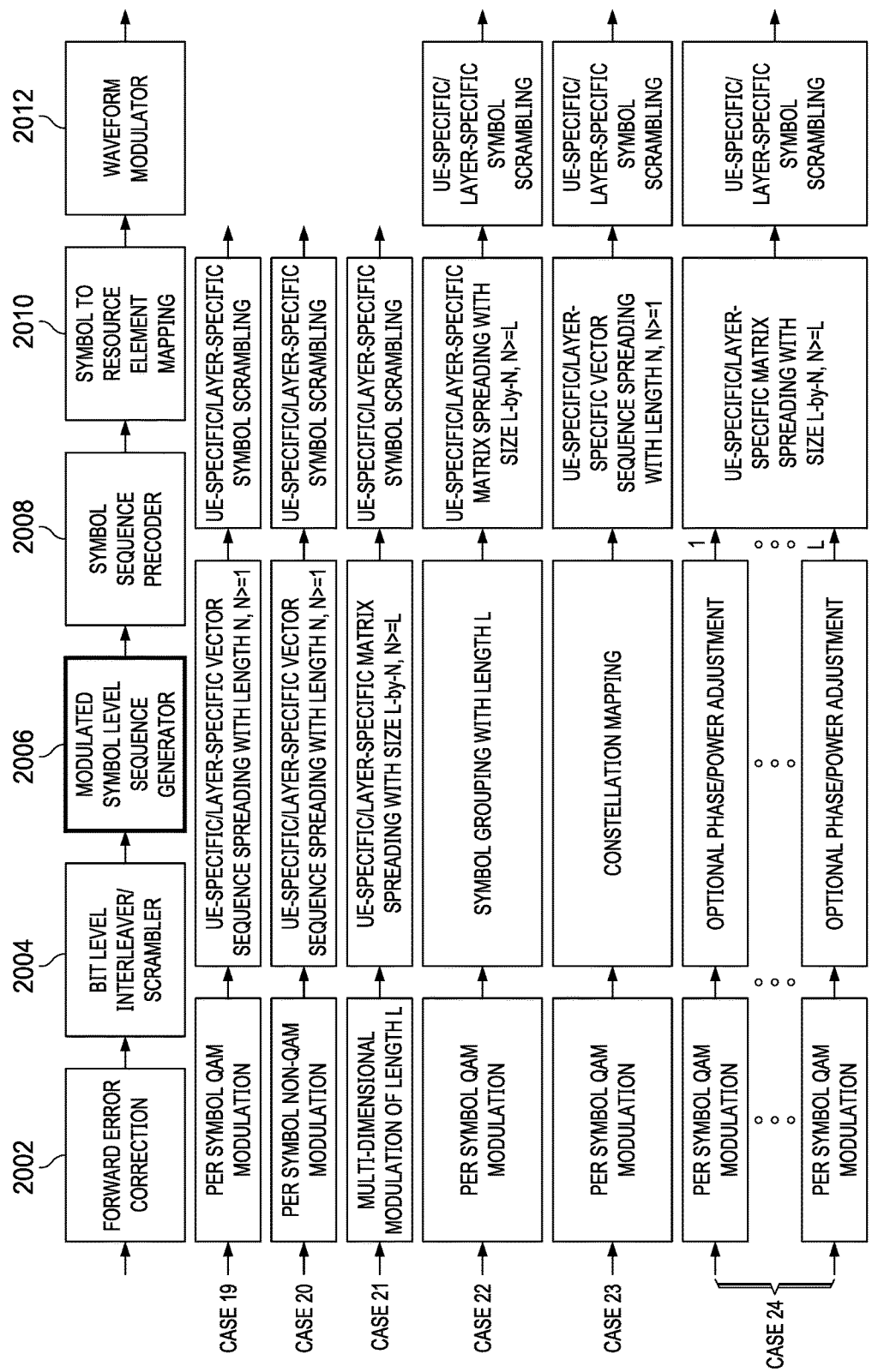

FIG. 28 shows different aspects for the modulated symbol level sequence generator block used in the framework.

In one aspect of the disclosure shown as case 19 in FIG. 28, modulated symbol level sequence generation is performed by QAM modulation, BPSK modulation, and/or $$\frac{\pi}{2} - BPSK$$

modulation to map each stream of input bits to a QAM and/or BPSK symbol followed by UE-specific vector sequence spreading and/or layer-specific vector sequence spreading with length N, N>=1. Then, UE-specific symbol scrambling and/or layer-specific symbol scrambling is applied to the modulated symbol sequence.

In another aspect of the disclosure shown as case 20 in FIG. 28, modulated symbol level sequence generation is performed by non-QAM modulation to map each stream of input bits to a symbol followed by UE-specific vector sequence spreading and/or layer-specific vector sequence spreading with length N, N>=1. Then, UE-specific symbol scrambling and/or layer-specific scrambling is applied to the modulated symbol sequence.

In another aspect of the disclosure shown as case 21 in FIG. 28, modulated symbol level sequence generation is performed by multi-dimensional Modulation of length L to map each stream of input bits to L symbols and followed by UE-specific matrix spreading and/or layer-specific matrix spreading with size L-by-N, N>=L where N denotes the spreading length. Then, UE-specific symbol scrambling and/or layer-specific symbol scrambling is applied to the modulated symbol sequence.

In yet another aspect of the disclosure shown as case 22 in FIG. 28, modulated symbol level sequence generation is performed by per symbol QAM modulation, BPSK modulation, and/or $$\frac{\pi}{2} - BPSK$$

modulation followed by grouping of the symbols in groups of size L. Then, the symbol groups are multiplied by UE-specific matrix spreading and/or layer-specific matrix spreading with size L-by-N, N>=L where N denotes the spreading length. Then, UE-specific symbol scrambling and/or layer-specific symbol scrambling is applied to the modulated symbol sequence.

In yet another aspect of the disclosure shown as case 23 in FIG. 28, modulated symbol level sequence generation is performed by per symbol QAM modulation, BPSK modulation, and/or $$\frac{\pi}{2} - BPSK$$

modulation followed by constellation mapping to generate second modulated symbols. Then, the second modulated symbol is spread by UE-specific vector sequence spreading and/or layer-specific vector sequence spreading with length N, N>=1. Then, UE-specific symbol scrambling and/or layer-specific symbol scrambling is applied to the modulated symbol sequence.

In yet another aspect of the disclosure shown as case 24 in FIG. 28, modulated symbol level sequence generation is performed by per symbol QAM modulation, BPSK modulation, and/or $$\frac{\pi}{2} - BPSK$$

modulation followed by applying optional phase and/or amplitude adjustment to each modulated symbol and then grouping of the symbols in groups of size L. Then, the symbol groups are multiplied by UE-specific matrix spreading and/or layer-specific matrix spreading with size L-by-N, N>=L where N denotes the spreading length. Then, UE-specific symbol scrambling and/or layer-specific symbol scrambling is applied to the modulated symbol sequence.

Figure 29:
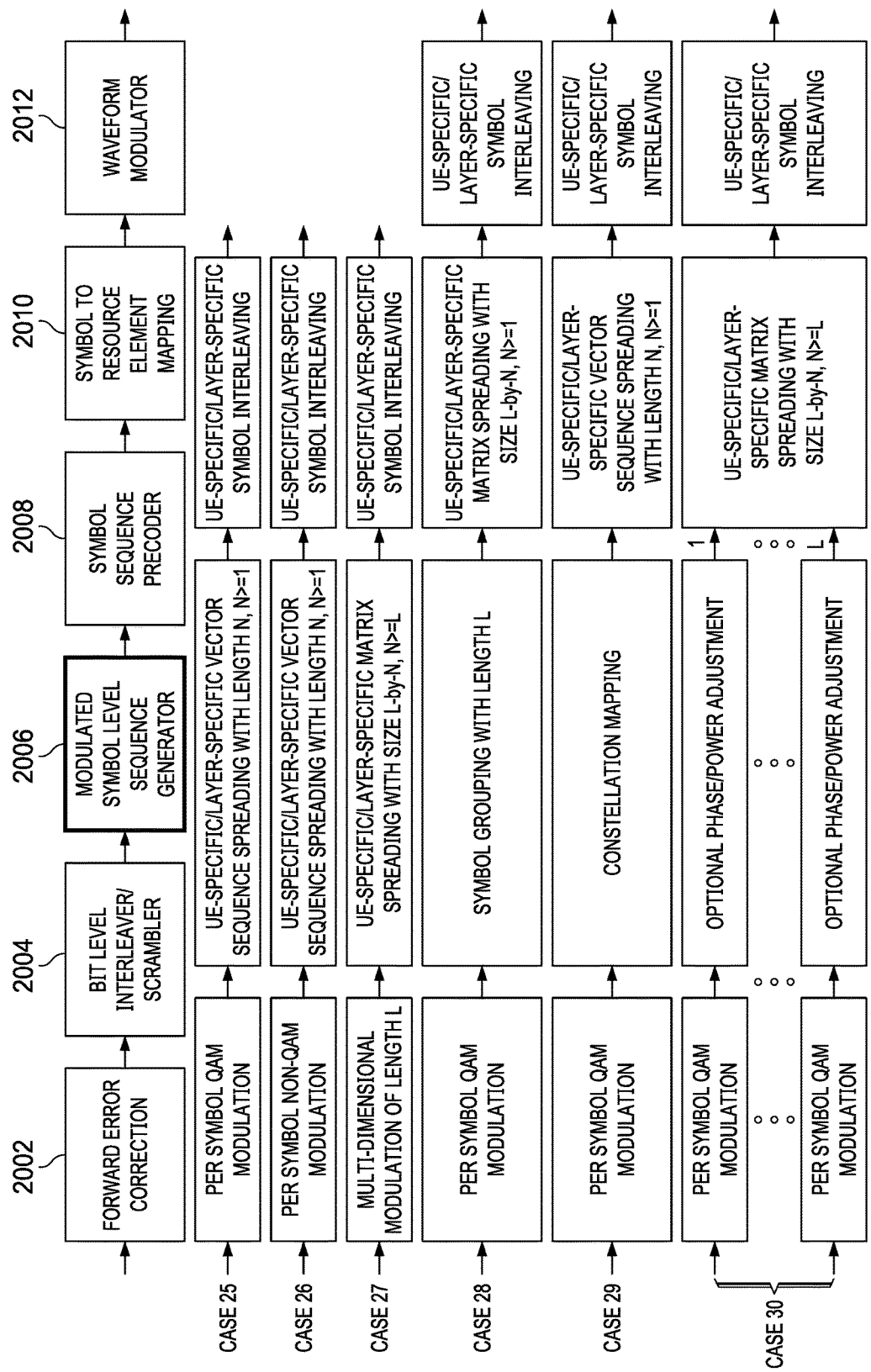

FIG. 29 shows different aspects for the modulated symbol level sequence generator block used in the framework.

In one aspect of the disclosure shown as case 25 in FIG. 29, modulated symbol level sequence generation is performed by QAM modulation, BPSK modulation, and/or $$\frac{\pi}{2} - BPSK$$

modulation to map each stream of input bits to a QAM and/or BPSK symbol followed by UE-specific vector sequence spreading and/or layer-specific vector sequence spreading with length N, N>=1. Then, UE-specific symbol interleaving and/or layer-specific symbol interleaving is applied to the modulated symbol sequence.

In another aspect of the disclosure shown as case 26 in FIG. 29, modulated symbol level sequence generation is performed by non-QAM modulation to map each stream of input bits to a symbol followed by UE-specific vector sequence spreading and/or layer-specific vector sequence spreading with length N, N>=1. Then, UE-specific symbol interleaving and/or layer-specific symbol interleaving is applied to the modulated symbol sequence.

In another aspect of the disclosure shown as case 27 in FIG. 29, modulated symbol level sequence generation is performed by multi-dimensional Modulation of length L to map each stream of input bits to L symbols and followed by UE-specific matrix spreading and/or layer-specific matrix spreading with size L-by-N, N>=L where N denotes the spreading length. Then, UE-specific symbol interleaving and/or layer-specific symbol interleaving is applied to the modulated symbol sequence.

In yet another aspect of the disclosure shown as case 28 in FIG. 29, modulated symbol level sequence generation is performed by per symbol QAM modulation, BPSK modulation, and/or $$\frac{\pi}{2} - BPSK$$

modulation followed by grouping of the symbols in groups of size L. Then, the symbol groups are multiplied by UE-specific matrix spreading and/or layer-specific matrix spreading with size L-by-N, N>=L where N denotes the spreading length. Then, UE-specific symbol interleaving and/or layer-specific symbol interleaving is applied to the modulated symbol sequence.

In yet another aspect of the disclosure shown as case 29 in FIG. 29, modulated symbol level sequence generation is performed by per symbol QAM modulation, BPSK modulation, and/or $$\frac{\pi}{2} - BPSK$$

modulation followed by constellation mapping to generate second modulated symbols. Then, the second modulated symbol is spread by UE-specific vector sequence spreading and/or layer-specific vector sequence spreading with length N, N>=1. Then, UE-specific symbol interleaving and/or layer-specific vector interleaving is applied to the modulated symbol sequence.

In yet another aspect of the disclosure shown as case 30 in FIG. 29, modulated symbol level sequence generation is performed by per symbol QAM modulation, BPSK modulation, and/or $$\frac{\pi}{2} - BPSK$$

modulation followed by applying optional phase and/or amplitude adjustment to each modulated symbol and then grouping of the symbols in groups of size L. Then, the symbol groups are multiplied by UE-specific matrix spreading and/or layer-specific matrix spreading with size L-by-N, N>=L where N denotes the spreading length. Then, UE-specific symbol interleaving and/or layer-specific symbol interleaving is applied to the modulated symbol sequence.

In some embodiments, there are both options of bit-level and symbol-level interleaving and or scrambling. In this case, the interleaver pattern and scrambling sequence can be UE-specific, layer-specific, cell-specific or a combination thereof.

Figure 30A:
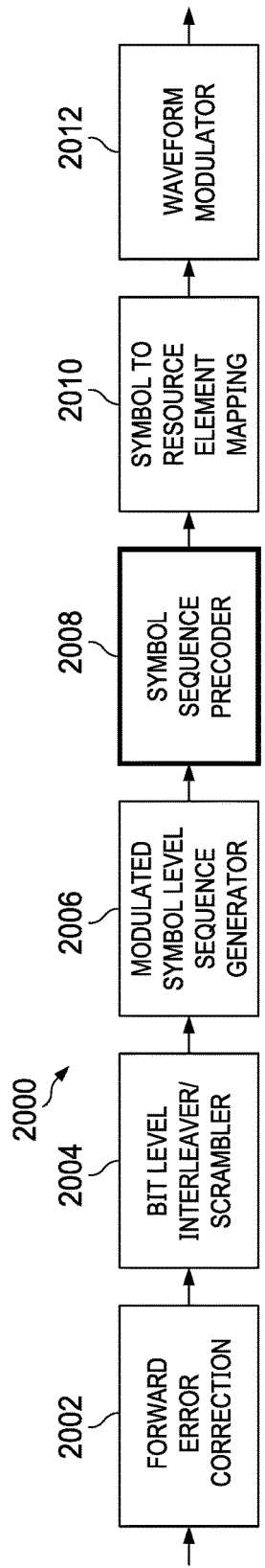
FIG. 30A-30C are schematic diagrams showing examples of symbol sequence precoder function unit in FIG. 21 according to aspects of the disclosure.
Figure 30B:
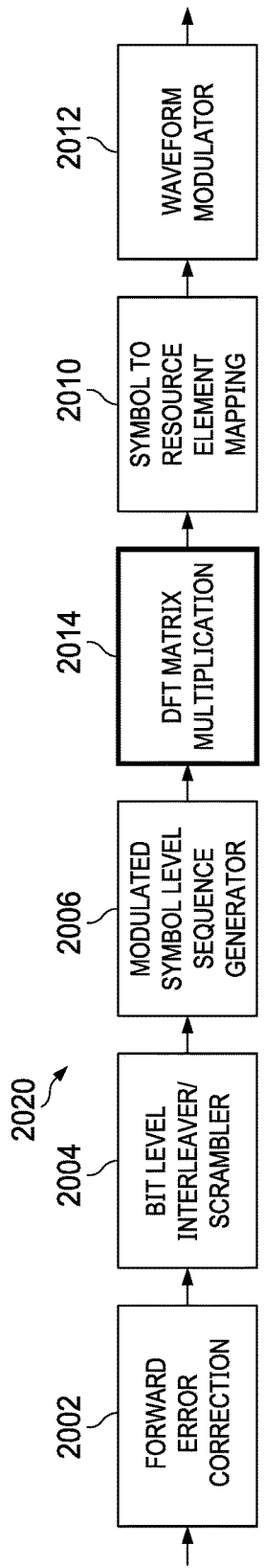
Figure 30C:
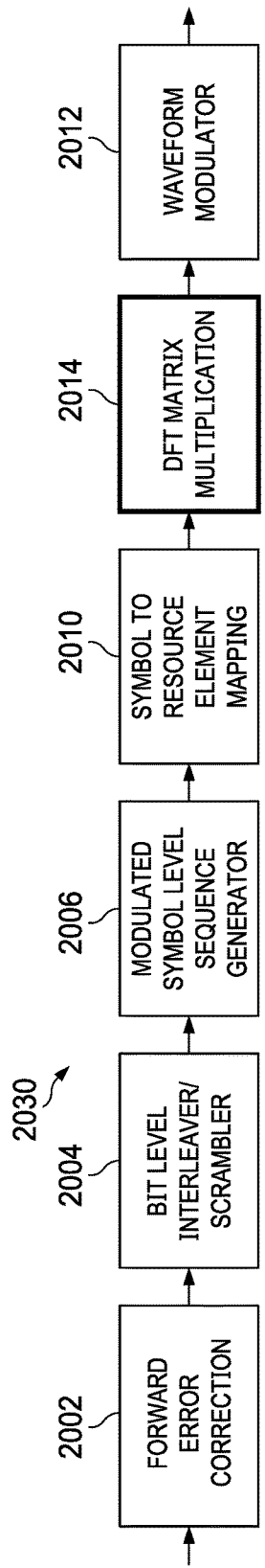

FIGS. 30A-30C show aspects for the symbol sequence precoder in the framework. FIG. 30A shows system 2000 which includes an FEC 2002, a bit level interleaver/scrambler 2004, a modulated symbol level sequence generator 2006, a symbol sequence precoder 2008, a symbol to RE mapping unit 2010, and a waveform modulator 2012. The system 2000 is the same as shown in FIG. 20 with the symbol sequence precoder 2008 highlighted to indicate that it can be replaced with other components as shown in FIGS. 30B and 30C.

In some embodiments, symbol precoding is performed for the sake of PAPR reduction. In this case, we have an optional block of symbol precoding before symbol to RE mapping. The precoding matrix used can be DFT matrix in the case of OFDM waveform. In some other scheme, the precoding can be used after the symbol to RE mapping.

In one aspect of the disclosure shown in FIG. 30B, the symbol sequence precoding is realized by DFT matrix multiplication 2014 before the symbol to RE mapping 2010.

In another aspect of the disclosure shown in FIG. 30C, the symbol sequence precoding is realized by DFT matrix multiplication 2014 after the symbol to RE mapping 2010.

Figure 31:
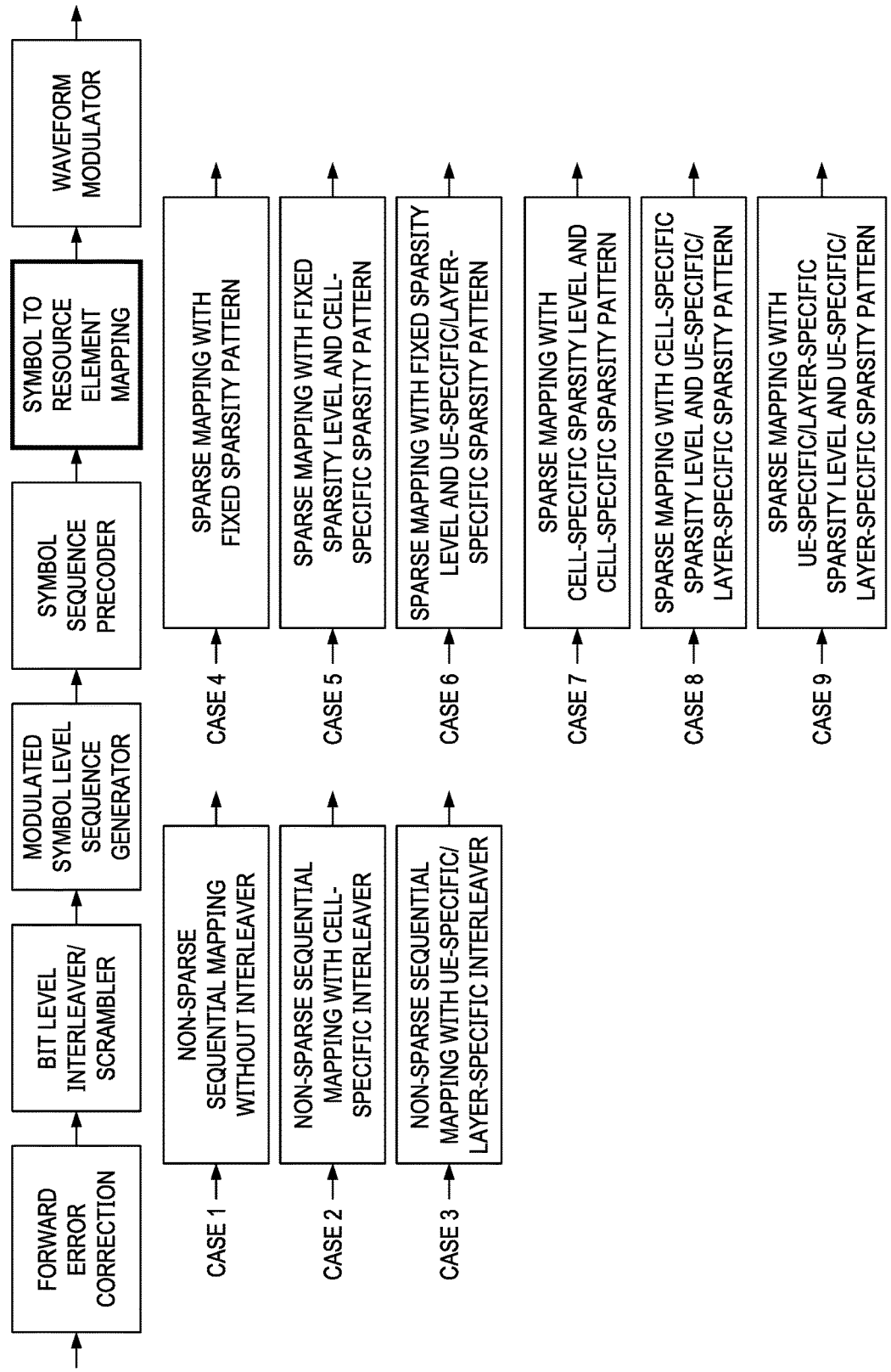
FIG. 31 is schematic diagram showing examples of symbol to RE mapping function unit in FIG. 20 according to an aspect of the application.

FIG. 31 shows embodiments for the symbol to RE mapping block in the framework. In some schemes, the RE to symbol mapping can be sparse meaning that the generated modulated symbol sequence are only mapped to a subset of available resources. The sparsity pattern as well as the sparsity level (the ratio of occupied REs to the total available REs) can be UE-specific, layer-specific, cell-specific or a combination thereof. In some schemes, the RE to symbol mapping can be non-sparse meaning that the generated modulated symbol sequence are mapped to the all available resource elements. The mapping pattern can be UE-specific, cell-specific or both.

In some aspects shown as case 1 in FIG. 31, the symbol to RE mapping is non-sparse (one-to-one mapping) where the mapping is sequential without any interleaver.

In another aspect of the disclosure shown as case 2 in FIG. 31, the symbol to RE mapping is non-sparse (one-to-one mapping) where there is a cell-specific interleaver is also used for the mapping.

In another aspect of the disclosure shown as case 3 in FIG. 31, the symbol to RE mapping is non-sparse (one-to-one mapping) where there is a UE-specific interleaver and/or a layer-specific interleaver is also used for the mapping.

In another aspect of the disclosure shown as case 4 in FIG. 31, the symbol to RE mapping is sparse, where the sparsity pattern is fixed (not UE-specific, layer-specific or cell-specific).

In another aspect of the disclosure shown as case 5 in FIG. 31, the symbol to RE mapping is sparse, where the sparsity level is fixed but the sparsity pattern is cell-specific.

In another aspect of the disclosure shown as case 6 in FIG. 31, the symbol to RE mapping is sparse, where the sparsity level is fixed but the sparsity pattern is UE-specific and/or layer-specific.

In another aspect of the disclosure shown as case 7 in FIG. 31, the symbol to RE mapping is sparse, with cell-specific sparsity level and cell-specific sparsity pattern.

In another aspect of the disclosure shown as case 8 in FIG. 31, the symbol to RE mapping is sparse, with cell-specific sparsity level and UE-specific and/or layer-specific sparsity pattern.

In another aspect of the disclosure shown as case 9 in FIG. 31, the symbol to RE mapping is sparse, with UE-specific and/or layer-specific sparsity level and UE-specific and/or layer-specific sparsity pattern.

In some embodiments, the information bits are divided into multiple streams. Each stream of bits is processed with step 1, 2, and 3. After step 3, the symbols are superposed together using power domain and/or spatial domain superposition before mapping to the REs.

In all the discussed embodiments, interleaving patterns, scrambling sequences, and the other operations can be dynamically configured by the network.

Figure 32:
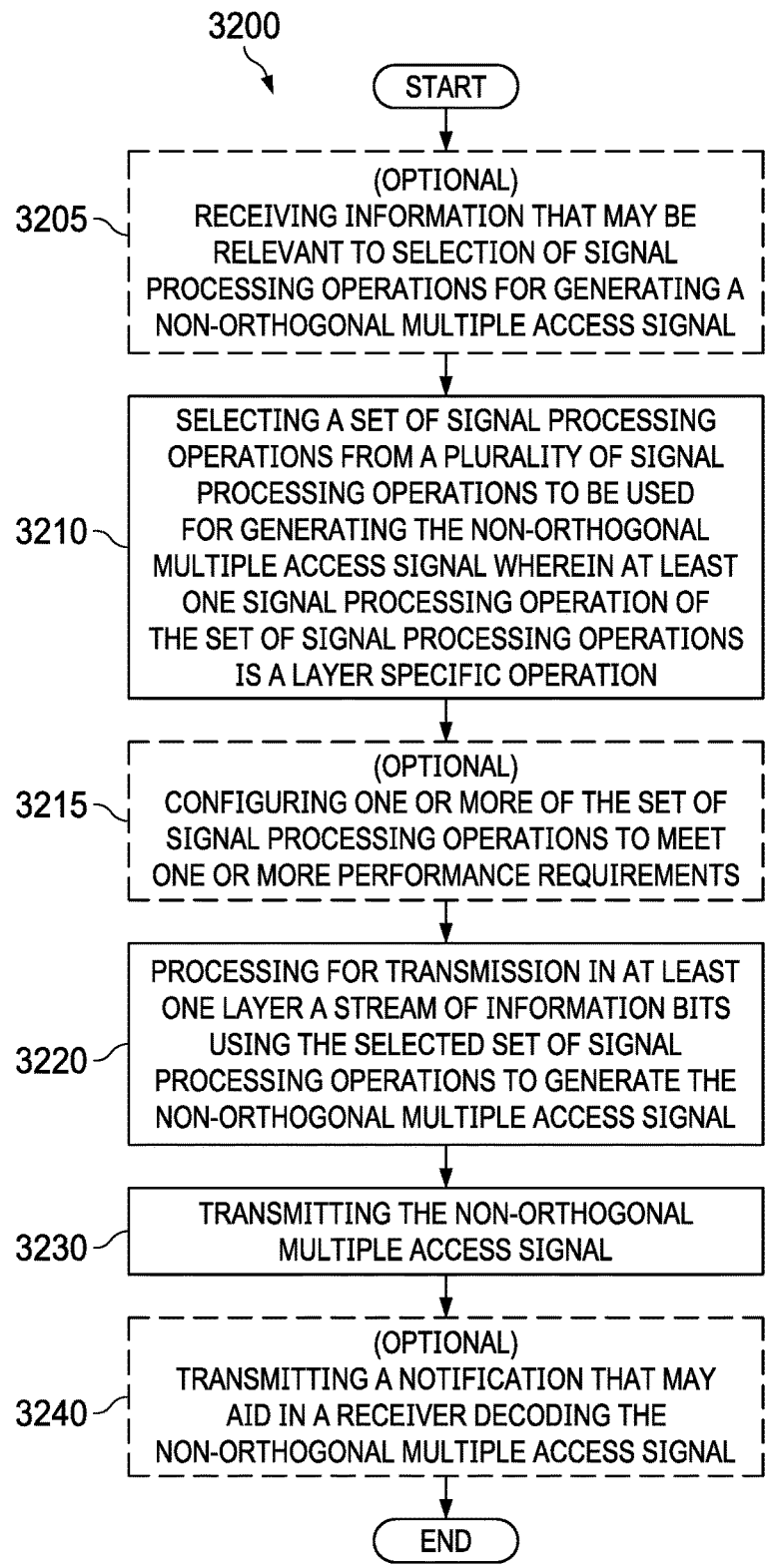
FIG. 32 is a flow diagram of an example method according to an embodiment of the application.

FIG. 32 is a flowchart 3200 that illustrates an example method for transmission of a NoMA signal. Step 3205 is an optional step in which information may be received by a transmitting device from a network. The network provides the transmitting device with information that may be relevant to selection of signal processing operations for generating a NoMA signal. When the NoMA signal is being transmitted in an uplink direction from a UE to a network side receiver, the transmitting device is the UE or terminal device.

Step 3210 involves the transmitting device selecting a set of signal processing operations from a plurality of signal processing operations to be used for generating the NoMA signal. Examples of signal processing operations may be referred to aspects of description for FIGS. 21 to 31. It is understandable that each aspects of a function unit or function block can be combined with aspects in another function unit or function block to make different variations or combinations. At least one signal processing operation of the set of signal processing operations is a layer-specific and/or UE-specific operation. Examples of signal processing operations may include at least one of bit-level interleaving, symbol level spreading, symbol level interleaving, symbol-to-tone mapping, symbol pre-coding, and constellation mapping.

An optional step 3215 includes the transmitting device configuring one or more of the set of signal processing operations so as to meet one or more performance requirements. Performance requirements may be related to factors such as, but not limited to, signal coverage, signal connection density and spectral efficiency.

Step 3220 involves the transmitting device processing a stream of information bits for transmission in at least one layer using the selected set of signal processing operations to generate the NoMA signal.

Step 3230 involves the transmitting device transmitting the NoMA signal.

A further optional step 3240 may include the transmitting device notifying a receiver of the NoMA signal of information that may aid in the receiver decoding the NoMA signal. This may include notifying the receiver of one or more of the signal processing operations, or a predefined multiple access scheme associated with a selected set of signal processing operations, used by the transmitting device to generate the NoMA signal. In some embodiments, such information is implicit and can be related to, for example, UE id, application type, and therefore, no additional signaling from UE is required.

The example method 3200 is intended for illustrative purposes. Steps that are identified in FIG. 32 as optional in the flow chart above may or may not be performed in a given implementation of the method. Other aspects could involve performing the illustrated operations in any of various ways, performing fewer or additional operations, and/or varying the order in which operations are performed. Other variations could be or become apparent to a skilled person based on the present disclosure.

Another particular aspect of the present application may be directed to a method for configuring different signal processing operations used within the framework to meet certain requirements. In some embodiments, this may be related to step 3215 of FIG. 32. The configuring of the signal processing operations may be based on one or more of the framework described above, a particular application scenario and physical (PHY) layer requirements. The requirements that the signal processing operations are being configured to meet may include, but are not limited to, signal coverage, connection density and spectral efficiency.

Signal coverage is mainly related to the PAPR of the transmission signal. Trying to implement a low PAPR may impose some constraints on the symbol spreading operation and symbol-to-tone mapping operation, or both.

Large scale connectivity can result in signal collisions at the receiver. In supporting large scale connectivity, signal processing operations that include layer-specific and/or UE-specific symbol-level operations can be beneficial for decoding the received signals. Examples of layer-specific and/or UE-specific symbol-level operations include layer-specific and/or UE-specific symbol interleaving/shuffling with a sparse spreading sequence and layer-specific and/or UE-specific sparse symbol-to-tone mapping.

To achieve high spectral efficiency, it is beneficial to use signal processing operations that include multi-dimensional spreading, instead of linear spreading, and layer-specific and/or UE-specific bit-level or layer-specific and/or UE-specific symbol-level interleaving.

The example framework described above is described with respect to UL NoMA, and it is considered that the framework is utilized by one or more UEs that are communicating with a network side receiver. Each UE may select different signal processing operations that the UE determines are best for the UE's respective application. The UEs can determine the signal processing operations based on one or more of: a) requirements imposed upon the UEs by the network, b) requirements established by the UEs c) measurements made by the UEs that define the UE environment and d) UE id or layer index The UE may receive information from the network that may be relevant to the decisions being made by the UE. For example, the network may indicate to the UE if the receiver is in a high density area to enable the UE to make an appropriate decision about which signal processing operations to select. Such information may be sent by the network in a high layer message, physical layer message or both. Physical conditions, such as signal density in a given area, may not change drastically over time and therefore may be less frequently updated.

Configuring the signal processing operations may include configuring spreading signatures for full spreading or partial spreading; selecting the type of modulation to be used, such as, but not limited to, QAM modulation, BPSK modulation $$\frac{\pi}{2} - BPSK$$

modulation, PSK modulation, multi-dimensional modulation; or selecting whether pre-coding is to be used or not.

Although the UE may be responsible for selecting the signal processing operations, the UE may receive information from the network side receiver and select signal processing operations based on the received information. The network side receiver may propose or assign different selections for different UEs based in the receiver's knowledge of the UEs. In some embodiments, the set of signal processing operations may be defined and stored in a look up table (LUT) accessible by the UEs and networks and a mapping rule can be specified by the network and communicated to the UEs about how to map each signal processing operation to the UE id, layer index, and the communication parameters including but not limited to application type, spectral efficiency, signal coverage and KPI requirements.

The UEs may also signal the receiver to inform the receiver of the type of NoMA signal being used, i.e. the types of signal processing operations it is using to generate the signal.

The receiver may be capable of using different types of decoding methods that best suit a given signal. For example, the receiver may be capable of using decoding methods such as maximum likelihood (ML), message passing algorithm (MPA) and successive interference cancellation (SIC). In some embodiments, the receiver can select the best decoding method to decode the signal based on knowledge the receiver has of the UE and the environment the UE is operating within and the application scenario. The environment that the UE is operating with may refer to physical layer requirements such as spectral efficiency, coverage, peak to average power ratio (PAPR) and system connectivity. In some embodiments, the receiver can select the best decoding method to decode the signal based on information received from the UE identifying the type of NoMA scheme the UE has selected for transmission.

Figure 33:
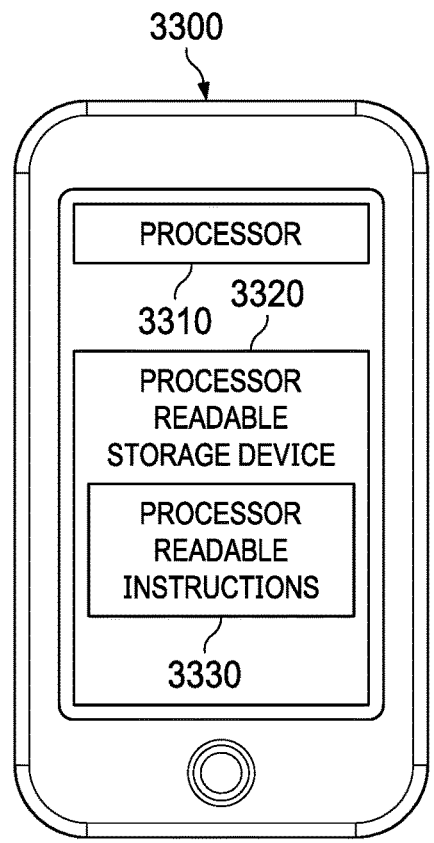
FIG. 33 is a block diagram of an example user equipment (UE) for transmitting a MA signal according to an aspect of the application.

FIG. 33 is a block diagram of an example apparatus 3300 for transmission of a MA signal or NoMA signal. The example apparatus 3300 may be a UE and thus may have various elements that would normally be a part of such an apparatus, such as a key pad, display screen, speaker, microphone, etc. However, it is understood that the apparatus 3300 may be implemented in many different ways using different units and/or components. In the example of FIG. 33, the apparatus 3300 includes a processor 3310 and a processor readable or non-transitory storage device 3320. The processor readable storage device 3320 has stored thereon processor executable instructions 3330 that when executed by the processor cause the processor to perform a method consistent with the methods described above. In another example (not shown), the apparatus 3300 may be implemented in hardware only (in circuitry, such as a processor, that is configured to perform the methods described herein and/or to otherwise control the execution of functionality and/or embodiments as disclosed herein. The apparatus could be configured to interface with a separate (Radio-Frequency—RF) transmission module. For example, the apparatus may be implemented in hardware or circuitry (e.g. in one or more chipsets, microprocessors, application-specific integrated circuits (ASIC), field-programmable gate arrays (FPGAs), dedicated logic circuitry, or combinations thereof) so as to select a set of signal processing operations as described herein to generate a NoMA signal for transmission by a separate (RF) unit (via an appropriate transmission interface).

Figure 34:
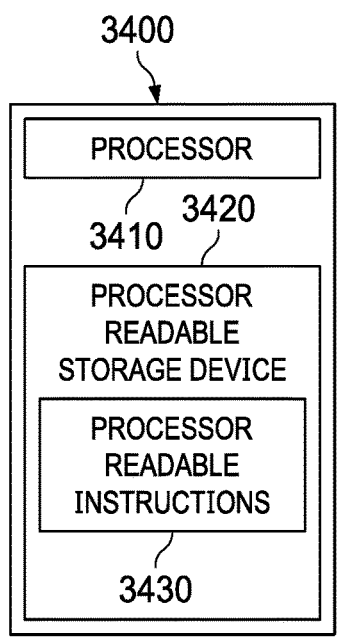
FIG. 34 is a block diagram of an example network side receiver for transmitting a MA signal according to an aspect of the application.

FIG. 34 is a block diagram of an example network (side) apparatus 3400 for generation and transmission of a MA signal. Such a network side device may include physical structure for performing other network side tasks and be located anywhere within the network that allows the device to operate accordingly. Similarly to the apparatus 3300 of FIG. 33, the apparatus 3400 of FIG. 34 may be implemented in many different ways using different units and/or components. The example apparatus 3400 includes a processor 3410 and a processor readable or non-transitory storage device 3420. The processor readable storage device 3420 has stored thereon processor executable instructions 3430 that when executed by the processor cause the processor to perform a method consistent with the methods described above. In another example (not shown), the apparatus 3400 may be implemented in hardware only (in circuitry, such as a processor, that is configured to perform the methods described herein and/or to otherwise control the execution of functionality and/or embodiments as disclosed herein and be configured to interface with a separate (Radio-Frequency—RF) transmission module. For example, the apparatus may be implemented in hardware or circuitry (e.g. in one or more chipsets, microprocessors, ASIC, FPGAs, dedicated logic circuitry, or combinations thereof) so as to select a set of signal processing operations as described herein to generate a NoMA signal for transmission by a separate (RF) unit (via an appropriate transmission interface).

Figure 35:
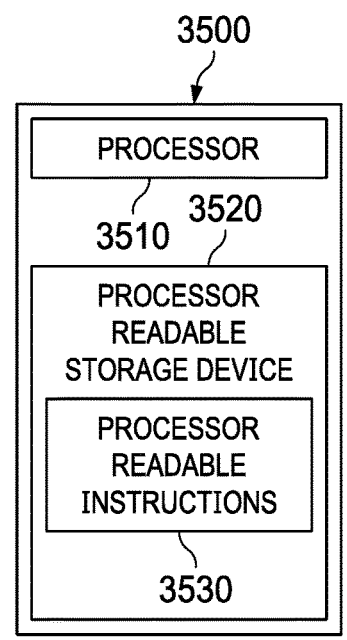
FIG. 35 is a block diagram of an example apparatus for receiving a MA signal according to an aspect of the application.

FIG. 35 is a block diagram of an example apparatus 3500 for receiving a MA signal or a NoMA signal. The example apparatus may be a network (side) device capable of receiving and decoding the MA signal or the NoMA signal. Such a network side device may include physical structure for performing other network side tasks and be located anywhere within the network that allows the device to operate accordingly. The example apparatus 3500 may be implemented in many different ways using different units or components. In the example of FIG. 35, the apparatus includes a processor 3510 and a processor readable or non-transitory storage device 3520. The processor readable storage device 3520 has stored thereon processor executable instructions 3530 that when executed by the processor cause the processor to implement a method for receiving one or more MA signals or one or more NoMA signals from one or more transmitters and decode the one or more MA signals or the one or more NoMA signals. In another example (not shown), the apparatus 3500 may be implemented in hardware only (in circuitry, such as a processor, that is configured to perform the methods described herein and/or to otherwise control the execution of functionality and/or embodiments as disclosed herein and be configured to interface with a separate (RF) reception module. For example, the apparatus 3500 may be implemented in hardware or circuitry (e.g. in one or more chipsets, microprocessors, ASIC, FPGAs, dedicated logic circuitry, or combinations thereof) so receive one or more MA or NoMA signals via a separate (RF) unit (and an appropriate interface) and decode the MA/NoMA signals as described herein.

In an embodiment, a method for transmission of a multiple access (MA) signal includes modulating at least one first stream of bits, each first stream of bits comprising at least one bit, using a first modulation type to generate at least one first modulated symbol from each of the at least one first stream of bits. The method also includes spreading each of the at least one first modulated symbols using a spreading sequence that is specific to a respective first stream of bits to generate a second set of modulated symbols. The method also includes mapping at least one of the second set of modulated symbols using a resource element mapping. The method also includes transmitting the mapped second sets of modulated symbols as a MA signal.

In an aspect of the disclosure, the spreading and the mapping are performed as a single operation.

In an aspect of the disclosure, the method further includes decomposing a second stream of bits into a plurality of first streams of bits.

In an aspect of the disclosure, the method further includes adjusting a phase or a power, or both, of at least one component of the modulated symbol.

In an aspect of the disclosure, the method further includes separating real and imaginary portions of at least one component of the modulated symbol.

In an aspect of the disclosure, the method further includes mapping of at least one component of the modulated symbol taken from the first constellation to the second symbol taken from the second constellation.

In an aspect of the disclosure, mapping of at least one component of the modulated symbol includes re-labelling of the first constellation points that the component of the modulated symbol is mapped on such that the second constellation has the same points as the first constellation but with different labels.

In an aspect of the disclosure, mapping of at least one component of the modulated symbol includes mapping a first constellation upon which the at least one component of the modulated symbol is mapped to a second constellation having a reduced number of constellation points than that of the first constellation.

In an aspect of the disclosure, the modulating at least one first stream of bits includes one of: a) Binary Phase Shift Keying (BPSK) modulation; b) π/2-BPSK; c) Quadrature Amplitude Modulation (QAM); and d) Quadrature Phase Shift Keying (QPSK) modulation.

In an aspect of the disclosure, mapping the at least one spread component to a resource element to generate the MA signal includes using sparse spreading.

In an aspect of the disclosure, sparsity of the sparse spreading is flexible to allow different levels of sparsity.

In an aspect of the disclosure, mapping at least one of the second set of modulated symbols using a resource element mapping to generate the MA signal includes using non-sparse spreading.

In an aspect of the disclosure, the component-specific spreading sequence includes a pseudo-random cover code whose elements are taken from a given alphabet or a structures cover code defined based on a certain criteria.

In an aspect of the disclosure, the method further includes selecting the first modulation type, the component-specific spreading sequence and the resource element mapping based upon one or more of: a) an application scenario; b) a physical layer requirements for the MA transmission; and c) a meeting key parameter indicators (KPI).

In an aspect of the disclosure, the physical layer requirements for the MA transmission include at least one of: a) spectral efficiency of the signal; b) modulation and coding scheme for the signal; c) peak-to-average power ratio (PAPR); and d) channel attributes of the signal including but not limited to channel quality indicator (CQI) and/or signal to noise ratio (SNR) measurements.

In an aspect of the disclosure, mapping at least one of the second set of modulated symbols using a resource element mapping to generate the MA signal includes using a user equipment (UE) specific resource mapping and/or a layer-specific resource mapping.

In an aspect of the disclosure, spreading each at least one component using a component-specific spreading sequence includes using at least one of: a layer-specific spreading sequence; and a layer-specific sparsity pattern.

In an embodiment, a transmitting device configured to transmit a multiple access (MA) signal includes a processor and computer readable storage media having stored thereon computer executable instructions, that when executed by the processor, perform a method. The method includes modulating at least one first stream of bits, each first stream of bits comprising at least one bit, using a first modulation type to generate at least one first modulated symbol from each of the at least one first stream of bits. The method also includes spreading each of the at least one first modulated symbols using a spreading sequence that is specific to a respective first stream of bits to generate a second set of modulated symbols. The method also includes mapping at least one of the second set of modulated symbols using a resource element mapping. The method also includes transmitting the mapped second sets of modulated symbols as a MA signal.

In an embodiment, a computer readable storage media is provided. The computer readable storage media having stored thereon computer executable instructions, that when executed by a processor, perform a method. The method includes modulating at least one first stream of bits, each first stream of bits comprising at least one bit, using a first modulation type to generate at least one first modulated symbol from each of the at least one first stream of bits. The method also includes spreading each of the at least one first modulated symbols using a spreading sequence that is specific to a respective first stream of bits to generate a second set of modulated symbols. The method also includes mapping at least one of the second set of modulated symbols using a resource element mapping. The method also includes transmitting the mapped second sets of modulated symbols as a VIA signal.

In an embodiment, a method for decoding a multiple access (MA) signal includes receiving the MA signal. The method also includes determining at least one set of a modulation type, a component-specific spreading sequence and a symbol to resource element mapping for decoding the MA signal. The method also includes decoding the MA signal.

In an aspect of the disclosure, determining the at least one set of the modulation type, the component-specific spreading sequence and the symbol to resource element mapping for decoding the MA signal includes determining based on an indication of the modulation type, the component-specific spreading sequence and the symbol to resource element mapping sent by the transmitter; or by blind detection; or a combination there of both.

In an embodiment, a method for transmission of a non-orthogonal multiple access (NoMA) signal includes selecting a set of signal processing operations from a plurality of signal processing operations to be used for generating the NoMA signal. At least one signal processing operation of the set of signal processing operations is a UE-specific and/or layer-specific operation. The method also includes processing at least one layer as a stream of information bits using the selected set of signal processing operations to generate the NoMA signal and transmitting the NoMA signal.

In an aspect of the disclosure, selecting the set of signal processing operations used for generating the signal for transmission includes selecting signal processing operations from the plurality of signal processing operations that perform at least one of a) UE-specific and/or layer-specific bit level multiplexing and b) UE-specific and/or layer-specific symbol level multiplexing.

In an aspect of the disclosure, selecting the set of signal processing operations used for generating the signal for transmission includes selecting signal processing operations from the plurality of signal processing operations that perform at least one of: a) bit-level interleaving and/or scrambling; b) symbol level spreading; c) symbol level interleaving; d) symbol-to-transmission unit mapping; and e) symbol pre-coding.

In an aspect of the disclosure, the NoMA transmission includes a transmission in an uplink direction from at least one user equipment (UE) to a network side receiver.

In an aspect of the disclosure, the at least one UE makes a decision of which signal processing operations to select without input from a network.

In an aspect of the disclosure, the at least one UE makes a decision of which signal processing operations to select based on input from a network.

In an aspect of the disclosure, the selected set of signal processing operations is UE specific and/or layer-specific.

In an aspect of the disclosure, selecting the set of signal processing operations used for generating the signal for transmission comprises selecting the set of signal processing operations from the plurality of signal processing operations based on at least one of: a) an application specific scenario; b) physical layer requirements for the NoMA transmission; and c) meeting key parameter indicators (KPI).

In an aspect of the disclosure, the physical layer requirements for the NoMA transmission include at least one of: a) spectral efficiency of the signal; b) modulation and coding scheme for the signal; c) peak-to-average power ratio (PAPR); and d) channel attributes of the signal including but not limited to channel quality indicator (CQI) and/or signal to noise ratio (SNR) measurements.

In an aspect of the disclosure, selecting the set of signal processing operations further comprises configuring one or more of the set of signal processing operations to meet one or more performance requirements.

In an aspect of the disclosure, the one or more performance requirements include performance requirements related to: a) signal coverage; b) system connection density; and c) spectral efficiency.

In an embodiment, user equipment (UE) is configured to transmit a non-orthogonal multiple access (NoMA) signal. The UE is configured to select a set of signal processing operations from a plurality of signal processing operations to be used for generating the NoMA signal. At least one signal processing operation of the set of operations being a code-domain UE-specific and/or layer-specific operation. The UE is also configured to process at least one layer as a stream of information bits using the selected set of signal processing operations to generate the NoMA signal. The UE is also configured to transmit the NoMA signal.

In an embodiment, a UE configured to transmit a non-orthogonal multiple access (NoMA) signal includes at least one antenna, a processor, and computer readable storage media having stored thereon computer executable instructions. The computer executable instructions, when executed by the processor, perform a method that includes selecting a set of signal processing operations from a plurality of signal processing operations to be used for generating the NoMA signal. At least one signal processing operation of the set of operations being a UE-specific and/or layer-specific operation. The method also includes processing at least one layer as a stream of information bits using the selected set of signal processing operations to generate the NoMA signal. The method also includes transmitting the NoMA signal on the at least one antenna.

In an embodiment, a computer readable storage media having stored thereon computer executable instructions, that when executed by a processor, perform a method that includes selecting a set of signal processing operations from a plurality of signal processing operations to be used for generating a NoMA signal. At least one signal processing operation of the set of operations being a UE-specific and/or layer-specific operation. The method also includes processing at least one layer as a stream of information bits using the selected set of signal processing operations to generate the NoMA signal for transmission.

In an embodiment, a method for non-orthogonal multiple access (NoMA) transmission includes selecting a NoMA scheme from a plurality of NoMA schemes based on one or more criterion to meet performance requirements. Each NoMA scheme of the plurality of NoMA schemes includes a set of signal processing operations. The method also includes configuring one or more of the set of signal processing operations to meet the performance requirements.

In an aspect of the disclosure, the one or more criterion include at least one of: a) channel conditions; b) physical layer requirements; and c) key parameter indicators (KPI).

In an aspect of the disclosure, the performance requirements include one or more of: a) signal coverage; b) signal connection density; c) peak-to-average power ratio (PAPR); and d) spectral efficiency.

In an aspect of the disclosure, configuring one or more of the set of signal processing operations includes determining whether there is a high connection density in the area of a receiver. If there is not a high connection density, the method determines if high spectral efficiency is to be used. If high spectral efficiency is to be used, the method includes configuring the signal processing operations by using one or more of multi-dimensional spreading, layer-specific bit-level interleaving and layer-specific symbol-level interleaving. If high spectral efficiency is not to be used, the method includes configuring the signal processing operations by using a predetermined default NoMA scheme. If there is a high connection density; the method includes determining if the NoMA signal is to have a high coverage area or a high spectral efficiency or neither. If neither, the method includes configuring the signal processing operations by using a predetermined default NoMA scheme. If the signal is to have a high coverage area, the method includes configuring the signal processing operations by using at least one of a low-PAPR modulation or codebook, low-PAPR sparse patterns, long spreading sequences, and symbol pre-coding. If the signal is to have a high spectral efficiency, the method includes configuring the signal processing operations by using one or more of multi-dimensional spreading, instead of linear spreading, layer-specific and/or UE-specific bit-level interleaving and layer-specific and/or UE-specific symbol-level interleaving.

In an embodiment, a user equipment (UE) configured for non-orthogonal multiple access (NoMA) transmission is configured to select a NoMA scheme from a plurality of NoMA schemes based on one or more criterion to meet performance requirements, each NoMA scheme of the plurality of NoMA schemes including a set of signal processing operations. The UE is also configured to configure one or more of the set of signal processing operations to meet the performance requirements.

In an embodiment, a computer readable storage media having stored thereon computer executable instructions, that when executed by a processor, perform a method that includes selecting a non-orthogonal multiple access (NoMA) scheme from a plurality of NoMA schemes based on one or more criterion to meet performance requirements. Each NoMA scheme of the plurality of NoMA schemes includes a set of signal processing operations. The method also includes configuring one or more of the set of signal processing operations to meet the performance requirements.

In an embodiment, a method for transmission of a non-orthogonal multiple access (NoMA) signal includes receiving the information bits and applying a set of data processing operations to generate the NoMA signal. At least one data processing operation is user equipment (UE)-specific, layer-specific, network-specific, or a combination thereof. The method also includes transmitting the NoMA signal.

In an aspect of the disclosure, the set of data processing operations used for generating the signal for transmission includes at least one of: a) a UE-specific bit level operation; b) a UE-specific symbol level operation; c) a network-specific bit level operation; and d) a network-specific symbol level operation.

In an aspect of the disclosure, the set of data processing operations used for generating the signal for transmission includes at least one of: a) bit-level interleaving and/or scrambling; b) bit-level scrambling; c) modulated symbol sequence generating; d) symbol to RE mapping; e) symbol sequence pre-coding; and f) waveform modulation.

In an aspect of the disclosure, the modulated symbol sequence generating includes per symbol QAM modulating, BPSK modulation, and/or $$\frac{\pi}{2} - BPSK$$

modulation.

In an aspect of the disclosure, the modulated symbol sequence generating includes per symbol non-QAM modulating, BPSK modulation, and/or $$\frac{\pi}{2} - BPSK$$

modulation.

In an aspect of the disclosure, the modulated symbol sequence generating includes multi-dimensional modulation.

In an aspect of the disclosure, the modulated symbol sequence generating further includes constellation mapping.

In an aspect of the disclosure, the modulated symbol sequence generating further includes first symbol level spreading and second symbol level spreading.

In an aspect of the disclosure, the of first and second symbol level spreading lengths are not the same.

In an aspect of the disclosure, modulated symbol sequence generating further includes symbol grouping followed by matrix spreading.

In an aspect of the disclosure, the modulated symbol sequence generating further includes phase/amplitude adjustment of modulated symbols.

In an aspect of the disclosure, modulated symbol sequence generating further includes symbol-level interleaving.

In an aspect of the disclosure, modulated symbol sequence generating further includes symbol-level scrambling.

In an aspect of the disclosure, modulated symbol sequence generating further includes at least one of: a) UE-specific and/or layer-specific symbol interleaving; b) UE-specific and/or layer-specific symbol scrambling; and c) UE-specific and/or layer-specific symbol spreading.

In an aspect of the disclosure, modulated symbol sequence generating further includes at least one of: a) layer-specific symbol interleaving; b) layer-specific symbol scrambling; and c) layer-specific symbol spreading.

In an aspect of the disclosure, modulated symbol sequence generating further includes at least one of: a) Network-specific symbol interleaving; b) Network-specific symbol scrambling; and c) Network-specific symbol spreading.

In an aspect of the disclosure, symbol sequence precoding is applied before the symbol to RE mapping.

In an aspect of the disclosure, symbol sequence precoding is applied after the symbol to RE mapping.

In an aspect of the disclosure, symbol sequence precoding includes DFT matrix multiplication.

In an aspect of the disclosure, symbol to RE mapping includes non-sparse sequential mapping without interleaver.

In an aspect of the disclosure, symbol to RE mapping includes non-sparse sequential mapping with UE-specific and/or layer-specific interleaver.

In an aspect of the disclosure, symbol to RE mapping includes non-sparse sequential mapping with network-specific interleaver.

In an aspect of the disclosure, symbol to RE mapping includes sparse mapping with fixed sparsity pattern.

In an aspect of the disclosure, symbol to RE mapping includes sparse mapping with fixed sparsity level and network specific sparsity pattern.

In an aspect of the disclosure, symbol to RE mapping includes sparse mapping with fixed sparsity level and UE-specific and/or layer-specific sparsity pattern.

In an aspect of the disclosure, symbol to RE mapping includes sparse mapping with network specific sparsity level and network specific sparsity pattern.

In an aspect of the disclosure, symbol to RE mapping includes sparse mapping with network specific sparsity level and UE-specific and/or layer-specific sparsity pattern.

In an aspect of the disclosure, symbol to RE mapping includes sparse mapping with UE specific sparsity level and UE-specific and/or layer-specific sparsity pattern.

In an aspect of the disclosure, the NoMA transmission includes a transmission in an uplink direction from at least one user equipment (UE) to a network side receiver.

In an aspect of the disclosure, the at least one UE makes a decision of which data processing operations to select without input from a network.

In an aspect of the disclosure, the at least one UE makes a decision of which data operations to select based on input from a network.

In an aspect of the disclosure, selecting the set of data processing operations used for generating the signal for transmission includes at least one of: a) an application specific scenario; b) physical layer requirements for the NoMA transmission; and c) meeting key parameter indicators (KPI).

In an aspect of the disclosure, the physical layer requirements for the NoMA transmission include at least one of: a) spectral efficiency of the signal; b) modulation and coding scheme for the signal; c) peak-to-average power ratio (PAPR); and d) channel attributes of the signal including but not limited to channel quality indicator (CQI) and/or signal to noise ratio (SNR) measurements.

In an aspect of the disclosure, selecting the set of signal processing operations further includes configuring one or more of the set of signal processing operations to meet one or more performance requirements.

In an aspect of the disclosure, the one or more performance requirements include performance requirements related to: a) signal coverage; b) system connection density; and c) spectral efficiency.

In an embodiment, a terminal device configured to transmit a non-orthogonal multiple access (NoMA) signal includes at least one antenna, a processor, and computer readable storage media having stored thereon computer executable instructions, that when executed by the processor, perform a method in accordance with any one of the above mentioned embodiments or aspects.

In an embodiment, a computer readable storage media is provided, the computer readable media having stored thereon computer executable instructions, that when executed by a processor, perform a method in accordance with any one of the above mentioned embodiments or aspects.

In an embodiment, a data stream of non-orthogonal multiple access (NoMA) signal is provided in accordance with a method in any one of the above mentioned embodiments or aspects.

An embodiment method in a network device for transmission of a NoMA signal includes receiving or otherwise obtaining information bits. The method also includes transmitting the NoMA signal. The NoMA signal includes one or more layers. The NoMA signal is generated according to the information bits and according to a set of signal processing operations selected from a plurality of signal processing operations. At least one of the set of signal processing operations is layer-specific, UE-specific, or a combination thereof.

An embodiment user equipment (UE) configured to transmit a non-orthogonal multiple access (NoMA) signal includes at least one antenna, a processor, and a computer readable storage media having stored thereon computer executable instructions, that when executed by the processor, perform a method. The method includes receiving or otherwise obtaining information bits. The method also includes transmitting the NoMA signal. The NoMA signal includes one or more layers. The NoMA signal is generated according to the information bits and according to a set of signal processing operations selected from a plurality of signal processing operations. At least one of the set of signal processing operations is layer-specific and/or UE-specific.

An embodiment user equipment (UE) configured to transmit a non-orthogonal multiple access (NoMA) signal is provided. The UE is configured to receive or otherwise obtain information bits. The UE is also configured to transmit the NoMA signal. The NoMA signal includes one or more layers. The NoMA signal is generated according to the information bits and according to a set of signal processing operations selected from a plurality of signal processing operations. At least one of the set of signal processing operations being layer-specific and/or UE-specific.

In one or more aspects of the disclosure, at least one set of signal processing operations is user equipment (UE)-specific, layer-specific, network specific, or a combination thereof.

In one or more aspects of the disclosure, the set of signal processing operations used for generating the NoMA signal comprises at least one of a layer-specific bit level multiplexing signal processing operation and a layer-specific symbol level multiplexing signal processing operation.

In one or more aspects of the disclosure, the set of signal processing operations include operations that perform at least one of: a) bit-level interleaving; b) bit-level scrambling; c) symbol level spreading; d) symbol level interleaving; e) symbol-to-transmission unit mapping; f) modulated symbol sequence generating; g) symbol to resource element (RE) mapping; h) symbol sequence pre-coding; and i) waveform modulation.

In one or more aspects of the disclosure, transmitting the NoMA signal comprises transmitting the NoMA signal in an uplink direction from at least one user equipment (UE) to a network side receiver.

In one or more aspects of the disclosure, the at least one UE makes a decision of which signal processing operations to select without input from a network.

In one or more aspects of the disclosure, transmitting a NoMA signal, the NoMA signal generated according to a set of signal processing operations selected from a plurality of signal processing operations to generate the NoMA signal includes selecting the set of signal processing operations from the plurality of signal processing operations based on at least one of: a) an application specific scenario; b) physical layer requirements for the NoMA transmission; and c) meeting key parameter indicators (KPI).

In one or more aspects of the disclosure, the physical layer requirements for the NoMA transmission include at least one of: a) spectral efficiency of the signal; b) modulation and coding scheme for the signal; c) peak-to-average power ratio (PAPR); and d) channel attributes of the signal including but not limited to channel quality indicator (CQI) and/or signal to noise ratio (SNR) measurements.

In one or more aspects of the disclosure, transmitting a NoMA signal, the NoMA signal generated according to a set of signal processing operations selected from a plurality of signal processing operations to generate the NoMA signal further includes configuring one or more of the set of signal processing operations to meet one or more performance requirements.

In one or more aspects of the disclosure, the one or more performance requirements include performance requirements related to: a) signal coverage; b) system connection density; and c) spectral efficiency.

In some embodiments, the processor may be a component of a general purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

Some embodiments of the disclosure may allow selection of appropriate MA schemes for particular application scenarios, depending on a required KPI based on the defined processing operators.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:
1. A method in a network device for transmission of a non-orthogonal multiple access (NoMA) signal comprising:
obtaining information bits; and
transmitting the NoMA signal, the NoMA signal comprising one or more layers, and the NoMA signal generated according to the information bits and according to a set of signal processing operations selected from a plurality of signal processing operations, wherein the set of signal processing operations comprises at least one layer-specific and user equipment (UE)-specific operation that performs:
at least one of bit-level interleaving or bit-level scrambling;
modulated symbol sequence generating;
symbol sequence pre-coding; and
waveform modulation.

2. The method of claim 1, wherein at least one of the set of signal processing operations is network specific.

3. The method of claim 1, wherein the set of signal processing operations used for generating the NoMA signal comprises at least one of a layer-specific bit level multiplexing signal processing operation or a layer-specific symbol level multiplexing signal processing operation.

4. The method of claim 1, wherein the transmitting of the NoMA signal comprises transmitting the NoMA signal in an uplink direction from at least one UE to a network receiver.

5. The method of claim 4, wherein the at least one UE makes a decision of which signal processing operations to select without input from a network.

6. The method of claim 1, wherein the transmitting of the NoMA signal comprises selecting the set of signal processing operations from the plurality of signal processing operations based on at least one of:
an application specific scenario;
a physical layer requirement for NoMA transmission; or
a key parameter indicator (KPI).

7. The method of claim 6, wherein the physical layer requirement for the NoMA transmission include at least one of:
a spectral efficiency of the NoMA signal;
a modulation and coding scheme for the NoMA signal;
a peak-to-average power ratio (PAPR); or
a channel attribute of the NoMA signal.

8. The method of claim 1, wherein the transmitting of the NoMA signal, further comprises configuring one or more of the set of signal processing operations to meet one or more performance requirements.

9. The method of claim 8, where the one or more performance requirements include at least one performance requirement related to:
a signal coverage;
a system connection density; or
a spectral efficiency.

10. The method of claim 1, wherein the set of signal processing operations further comprises at least one operation that performs at least one of symbol-to-transmission unit mapping or symbol to resource element (RE) mapping.

11. A user equipment (UE) configured to transmit a non-orthogonal multiple access (NoMA) signal, the UE comprising:
at least one antenna;
a processor; and
computer readable storage media having stored thereon computer executable instructions, that when executed by the processor, perform a method comprising:
obtaining information bits; and
transmitting the NoMA signal, the NoMA signal comprising one or more layers, and the NoMA signal generated according to the information bits and according to a set of signal processing operations selected from a plurality of signal processing operations, wherein the set of signal processing operations comprises at least one layer-specific and UE-specific operation that performs:
at least one of bit-level interleaving or bit-level scrambling;
modulated symbol sequence generating;
symbol sequence pre-coding; and
waveform modulation.

12. The UE of claim 11, wherein at least one of the set of signal processing operations is network specific.

13. The UE of claim 11, wherein the set of signal processing operations used for generating the NoMA signal comprises at least one of a layer-specific bit level multiplexing signal processing operation or a layer-specific symbol level multiplexing signal processing operation.

14. The UE of claim 11, wherein the transmitting of the NoMA signal comprises transmitting the NoMA signal in an uplink direction from at least one UE to a network receiver.

15. The UE of claim 14, wherein the at least one UE makes a decision of which signal processing operations to select without input from a network.

16. The UE of claim 11, wherein the transmitting of the NoMA signal comprises selecting the set of signal processing operations from the plurality of signal processing operations based on at least one of:
an application specific scenario;
a physical layer requirement for NoMA transmission; or
a key parameter indicator (KPI).

17. The UE of claim 16, wherein the physical layer requirement for the NoMA transmission include at least one of:
a spectral efficiency of the NoMA signal;
a modulation and coding scheme for the NoMA signal;
a peak-to-average power ratio (PAPR); or
a channel attribute of the NoMA signal.

18. The UE of claim 11, wherein the transmitting of the NoMA signal further comprises configuring one or more of the set of signal processing operations to meet one or more performance requirements.

19. The UE of claim 18, where the one or more performance requirements include at least one performance requirement related to:
a signal coverage;
a system connection density; or
a spectral efficiency.

20. The UE of claim 11, wherein the set of signal processing operations further comprises at least one operation that performs at least one of symbol-to-transmission unit mapping or symbol to resource element (RE) mapping.

* * * * *